US012612751B2

(12) United States Patent
French, Sr.

(10) Patent No.: US 12,612,751 B2
(45) Date of Patent: Apr. 28, 2026

(54) MODULAR PRECAST HYDRO DAM WITH POWERHOUSE

(71) Applicant: W.L. French Hydropower Holdings LLC, Chelmsford, MA (US)

(72) Inventor: William L. French, Sr., Lexington, MA (US)

(73) Assignee: W.L. FRENCH HYDROPOWER HOLDINGS LLC, Chelmsford, MA (US)

( * ) Notice: Subject to any disclaimer, the term of this patent is extended or adjusted under 35 U.S.C. 154(b) by 0 days.

(21) Appl. No.: 19/030,367

(22) Filed: Jan. 17, 2025

(65) Prior Publication Data

US 2025/0257538 A1 Aug. 14, 2025

Related U.S. Application Data

(60) Provisional application No. 63/712,974, filed on Oct. 28, 2024, provisional application No. 63/701,484, (Continued)

(51) Int. Cl.
*E02B 8/06* (2006.01)
*E02B 9/00* (2006.01)
*F03B 13/08* (2006.01)

(52) U.S. Cl.
CPC ................ *E02B 9/00* (2013.01); *F03B 13/08* (2013.01)

(58) Field of Classification Search
CPC ... E02B 9/00; E02B 9/02; F03B 13/08; Y02E 10/20
See application file for complete search history.

(56) References Cited

U.S. PATENT DOCUMENTS 198,939 A 1/1878 Herron
838,587 A 12/1906 Schon
(Continued)

FOREIGN PATENT DOCUMENTS

CA 2793904 A1 11/2011
CN 206052662 U 3/2017
(Continued)

OTHER PUBLICATIONS

International search Report and written opinion received for PCT application No. PCT/US2025/015139, mailed on Oct. 20, 2025, 19 pages.

*Primary Examiner* — Carib A Oquendo
(74) *Attorney, Agent, or Firm* — Hamilton, Brook, Smith & Reynolds, P.C.

(57) ABSTRACT

A power generation system may include a powerhouse. The powerhouse may include a flow path structure, a power generation support structure, and an access port. The flow path structure may define at least a portion of a flow path. The flow path structure may be configured to accept fluid at an input port to enter the powerhouse and direct the fluid to exit the powerhouse at an output port. A power generation support structure may be, at least partially, constructed of precast segments. The power generation support structure may be configured to support weight of a power generator in an arrangement operably disposed within the flow path. An access port may be different from the input port, and the access port may be aligned to enable removable coupling of the power generator to and from the power generation support structure.

53 Claims, 48 Drawing Sheets

Related U.S. Application Data filed on Sep. 30, 2024, provisional application No. 63/552,088, filed on Feb. 9, 2024.

(56) References Cited

U.S. PATENT DOCUMENTS

| | | | |
|---|---|---|---|
| 840,110 A | 1/1907 | Coburn | |
| 853,146 A | 5/1907 | Gerstenbergk-Zech | |
| 870,866 A | 11/1907 | Church | |
| 946,585 A | 1/1910 | Smith | |
| 1,594,578 A | 8/1926 | Thurlow | |
| 1,628,933 A | 5/1927 | Troiel | |
| 1,640,099 A | 8/1927 | Spencer | |
| 1,898,095 A | 2/1933 | Noetzli | |
| 2,138,070 A | 11/1938 | Harrison et al. | |
| 2,138,071 A | 11/1938 | Harrison et al. | |
| 2,515,059 A | 7/1950 | William | |
| 2,566,748 A | 9/1951 | Hall | |
| 2,922,282 A | 1/1960 | Dohrer | |
| 2,961,731 A | 11/1960 | Buzzell et al. | |
| 3,342,033 A | 9/1967 | Crouch et al. | |
| 3,854,291 A | 12/1974 | Perkins | |
| 4,031,676 A | 6/1977 | Dally | |
| 4,182,123 A | 1/1980 | Ueda | |
| 4,260,286 A | 4/1981 | Buchanan | |
| 4,279,539 A | 7/1981 | Gutierrez Atencio | |
| 4,290,246 A | 9/1981 | Hilsey | |
| 4,319,142 A | 3/1982 | Mayo, Jr. | |
| 4,352,593 A | 10/1982 | Iskra et al. | |
| 4,437,017 A | 3/1984 | Oesterberg | |
| 4,468,153 A | 8/1984 | Gutierrez Atencio | |
| 4,493,587 A | 1/1985 | Ferrari | |
| 4,540,313 A | 9/1985 | Broome | |
| 4,569,200 A | 2/1986 | Lamb | |
| 4,573,827 A | 3/1986 | Mayo, Jr. | |
| 4,740,105 A | 4/1988 | Wollander | |
| 4,772,157 A | 9/1988 | Obermeyer | |
| 4,804,855 A * | 2/1989 | Obermeyer | F03B 13/105 290/43 |
| 4,998,846 A | 3/1991 | Evstratov et al. | |
| 5,087,150 A | 2/1992 | McCreary | |
| 5,161,913 A | 11/1992 | Boylan | |
| 5,195,846 A | 3/1993 | Lemperiere | |
| 5,439,316 A | 8/1995 | Richardson | |
| 5,817,944 A | 10/1998 | Chung | |
| 6,012,872 A | 1/2000 | Perry et al. | |
| 6,042,301 A | 3/2000 | Sovran | |
| 6,155,746 A | 12/2000 | Peters | |
| 6,273,639 B1 | 8/2001 | Eikrem et al. | |
| 6,281,597 B1 | 8/2001 | Obermeyer et al. | |
| 6,672,799 B2 | 1/2004 | Earl | |
| 6,712,555 B1 | 3/2004 | Truebe et al. | |
| 6,942,423 B2 | 9/2005 | Davis | |
| 7,029,200 B1 | 4/2006 | Cravens | |
| 7,214,005 B1 | 5/2007 | Davis | |
| 7,422,392 B2 | 9/2008 | Obermeyer | |
| 7,478,974 B1 | 1/2009 | Kelly | |
| 7,651,298 B2 | 1/2010 | Boudreaux, Jr. | |
| 7,708,495 B1 | 5/2010 | Antee | |
| 8,066,449 B2 | 11/2011 | Lux, III | |
| 8,414,223 B2 | 4/2013 | French, Sr. | |
| 8,845,231 B2 | 9/2014 | Holstein et al. | |
| 9,034,454 B1 | 5/2015 | Bowman | |
| 9,103,084 B2 | 8/2015 | French, Sr. | |
| 9,730,431 B2 | 8/2017 | French | |
| 9,930,744 B2 | 3/2018 | Sills et al. | |
| 10,760,233 B2 | 9/2020 | French, Sr. | |
| 11,708,674 B2 | 7/2023 | French, Sr. | |
| 2002/0018696 A1 | 2/2002 | Robinson | |
| 2002/0031401 A1 | 3/2002 | Yang | |
| 2004/0009040 A1 | 1/2004 | Boylan | |
| 2004/0222641 A1 | 11/2004 | Panholzer | |
| 2004/0234218 A1 | 11/2004 | Tao et al. | |
| 2004/0265060 A1 | 12/2004 | Lee et al. | |
| 2005/0074289 A1 | 4/2005 | Tucker | |
| 2005/0207844 A1 | 9/2005 | Boccotti | |
| 2005/0286975 A1 | 12/2005 | Fonfrede et al. | |
| 2006/0007388 A1 | 1/2006 | James | |
| 2006/0078388 A1 | 4/2006 | Obermeyer | |
| 2007/0116522 A1 | 5/2007 | Boudreaux | |
| 2007/0154265 A1 | 7/2007 | Stauffacher et al. | |
| 2008/0075535 A1 | 3/2008 | Han | |
| 2008/0089743 A1 | 4/2008 | Han | |
| 2008/0175667 A1 | 7/2008 | Liou | |
| 2008/0213045 A1 | 9/2008 | Tappel | |
| 2008/0240861 A1 | 10/2008 | Phillips | |
| 2009/0041543 A1 | 2/2009 | Kroger | |
| 2009/0113910 A1 | 5/2009 | Shim | |
| 2009/0134623 A1 | 5/2009 | Krouse | |
| 2010/0045311 A1 | 2/2010 | Chung | |
| 2010/0074687 A1 | 3/2010 | Boudreaux, Jr. | |
| 2010/0129156 A1 | 5/2010 | Taylor | |
| 2010/0140934 A1* | 6/2010 | Nicoson | G05B 17/02 290/43 |
| 2010/0260548 A1 | 10/2010 | Shipley et al. | |
| 2010/0270811 A1 | 10/2010 | Angulo Valpreda et al. | |
| 2011/0089695 A1 | 4/2011 | Krouse et al. | |
| 2011/0146802 A1 | 6/2011 | Feher | |
| 2011/0225965 A1 | 9/2011 | Van Niekerk et al. | |
| 2012/0009018 A1 | 1/2012 | Marquis et al. | |
| 2012/0087733 A1* | 4/2012 | French, Sr. | E02B 8/06 405/114 |
| 2012/0237298 A1 | 9/2012 | Cook | |
| 2012/0327592 A1* | 12/2012 | Godrich | H05K 7/1492 361/679.48 |
| 2013/0140825 A1 | 6/2013 | Holstein et al. | |
| 2013/0236249 A1 | 9/2013 | Greif et al. | |
| 2013/0266378 A1 | 10/2013 | French, Sr. | |
| 2014/0053493 A1* | 2/2014 | Carey | E04C 1/40 52/604 |
| 2014/0088756 A1* | 3/2014 | Ciuperca | E04G 13/00 700/207 |
| 2014/0183122 A1 | 7/2014 | Canals et al. | |
| 2014/0197641 A1 | 7/2014 | Barakat | |
| 2014/0356070 A1 | 12/2014 | Stromotich | |
| 2015/0247300 A1 | 9/2015 | Seo | |
| 2016/0017558 A1 | 1/2016 | French, Sr. | |
| 2016/0273512 A1 | 9/2016 | Nanehkaran | |
| 2016/0286766 A1 | 10/2016 | French | |
| 2016/0369491 A1 | 12/2016 | Eftekharzadeh | |
| 2017/0370063 A1 | 12/2017 | French | |
| 2018/0291581 A1* | 10/2018 | Duquette | F03B 15/04 |
| 2019/0277000 A1 | 9/2019 | French, Sr. | |
| 2019/0316310 A1* | 10/2019 | Anders | F03B 13/08 |
| 2020/0370262 A1* | 11/2020 | Leighton | E02B 8/085 |
| 2022/0025739 A1 | 1/2022 | Kloster | |
| 2022/0154416 A1 | 5/2022 | French, Sr. | |
| 2022/0250723 A1 | 8/2022 | Hutcheson | |
| 2024/0076845 A1 | 3/2024 | French, Sr. | |
| 2024/0110350 A1 | 4/2024 | Vetsch et al. | |
| 2025/0020098 A1 | 1/2025 | Roberts et al. | |
| 2025/0257707 A1 | 8/2025 | French | |
| 2025/0257709 A1 | 8/2025 | French | |
| 2025/0376969 A1 | 12/2025 | French, Sr. | |

FOREIGN PATENT DOCUMENTS

| | | |
|---|---|---|
| CN | 211872914 U | 11/2020 |
| CN | 112523918 A | 3/2021 |
| DE | 3029087 A1 | 2/1981 |
| DE | 3241550 A1 | 5/1984 |
| DE | 3718805 A1 | 12/1988 |
| DE | 19959116 A1 | 6/2001 |
| DE | 102015115562 A1 | 3/2017 |
| EP | 0036453 B1 | 8/1984 |
| EP | 0399870 A1 | 11/1990 |
| EP | 2737203 B1 | 9/2015 |
| EP | 2971369 B1 | 8/2023 |
| ES | 2792178 A1 | 11/2020 |
| FR | 2289680 A1 | 5/1976 |
| FR | 2692298 A1 | 12/1993 |
| FR | 2865226 B1 | 4/2007 |
| GB | 2055933 A | 3/1981 |
| GB | 2412409 A | 9/2005 |

(56) References Cited

FOREIGN PATENT DOCUMENTS

| | | | |
|---|---|---|---|
| JP | 2005-090208 | A | 4/2005 |
| JP | 3172190 | U | 12/2011 |
| JP | 3175356 | U | 5/2012 |
| KR | 10-2003-0081909 | A | 10/2003 |
| KR | 20-0381909 | Y1 | 4/2005 |
| KR | 10-2006-0025314 | A | 3/2006 |
| KR | 10-0641826 | B1 | 11/2006 |
| KR | 10-2008-0077937 | A | 8/2008 |
| KR | 10-2009-0047190 | A | 5/2009 |
| KR | 10-0994578 | B1 | 11/2010 |
| KR | 10-1008839 | B1 | 1/2011 |
| WO | 2011/133913 | A2 | 10/2011 |
| WO | 2013/019117 | A1 | 2/2013 |
| WO | 2013/089958 | A1 | 6/2013 |
| WO | 2014/158876 | A1 | 10/2014 |
| WO | 2017/066655 | A1 | 4/2017 |
| WO | 2023/084249 | A2 | 5/2023 |

* cited by examiner

810

889

FIG. 28A
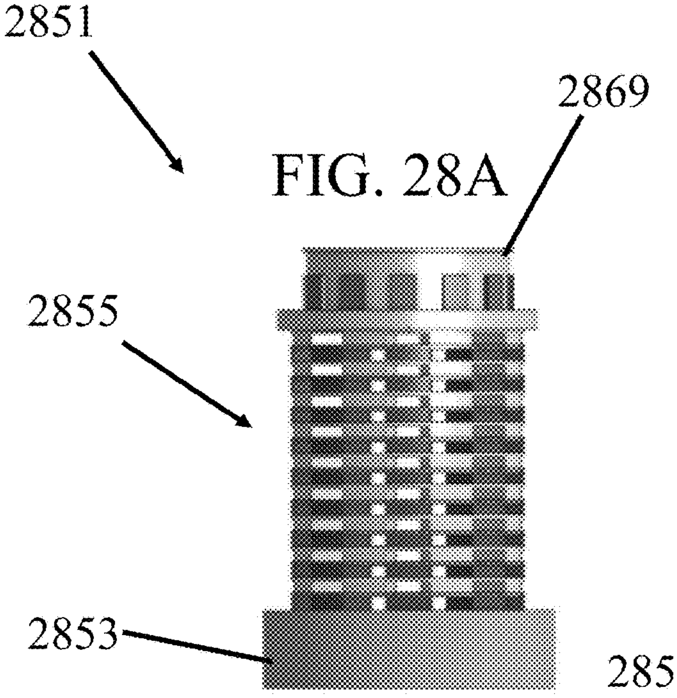
FIG. 28B
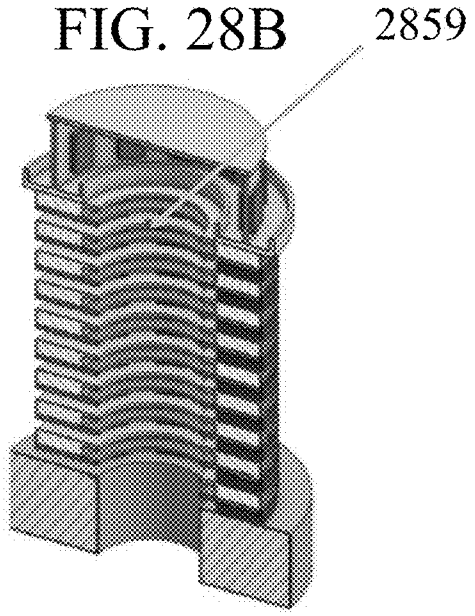
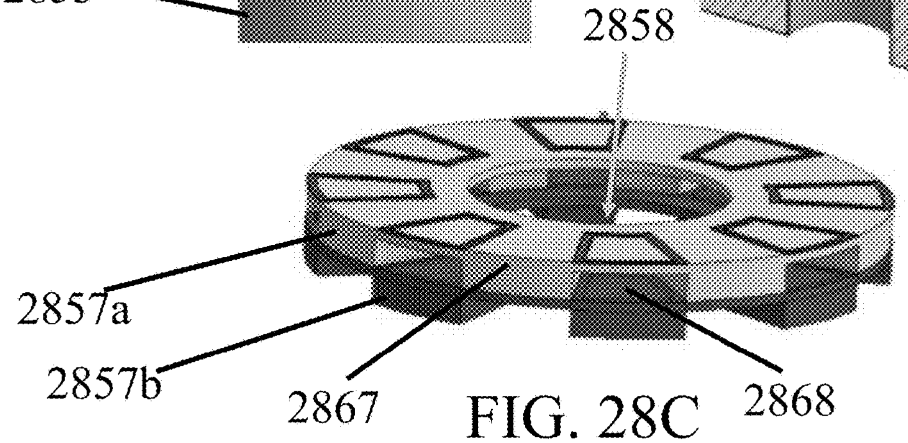
FIG. 28C

2900

3500

3591

3700

3800

3900

MODULAR PRECAST HYDRO DAM WITH POWERHOUSE

RELATED APPLICATIONS

This application claims the benefit of U.S. Provisional Application No. 63/552,088, filed on Feb. 9, 2024. This application claims the benefit of U.S. Provisional Application No. 63/701,484, filed on Sep. 30, 2024. This application claims the benefit of U.S. Provisional Application No. 63/712,974, filed on Oct. 28, 2024. The entire teachings of the above applications are incorporated herein by reference.

BACKGROUND

Hydroelectric dams and powerhouses may convert kinetic energy provided by a flowing fluid into electrical power, which may provide electricity to a local area. Maintenance or damage to the dam or powerhouse may disrupt the electricity available to the local area. There is a need for improved systems and methods for coordinating activity between a dam and powerhouse and facilitating maintenance or repair.

SUMMARY

The present application describes embodiments of a dam and functionally coupled powerhouse(s), where a powerhouse includes a turbine to convert water flow into electrical power. In an example embodiment, the dam and a powerhouse may be both mechanically and functionally coupled. Alternatively, the dam and powerhouse may be mechanically uncoupled but functionally coupled. Functionally coupled includes, for example, using a sensor in or at the powerhouse to notify or cause the dam to increase or decrease height of a water control gate, which results in an increase or decrease of water flowing into the powerhouse to the turbine.

A power generation system may include a powerhouse. A powerhouse may include a flow path structure, a power generation support structure, and an access port. The flow path structure may define at least a portion of a flow path, the flow path structure configured to accept fluid at an input port to enter the powerhouse and direct the fluid to exit the powerhouse at an output port. The power generation support structure may be at least partially constructed of precast segments, configured to support weight of a power generator in an arrangement operably disposed within the flow path. The access port may be different from the input port, the access port aligned to enable removable coupling of the power generator to and from the power generation support structure.

In various example embodiments, the power generation support structure may include precast forms and filler that define the precast segments and the precast forms may be filled with the filler on a layer-by-layer basis during a process of arranging the precast segments in vertical layers to define the power generation support structure.

In various example embodiments, the precast forms may include a port through a surface of the precast form that enables filler to flow from a given layer to a lower adjacent layer in a vertical direction.

In various example embodiments, the power generation support structure may define a lowest layer having a pattern of vertically offset portions or may further include a layer, having a pattern of vertically offset portions.

The power generation system may further include a dam functionally coupled with the powerhouse in a manner that maintains or discontinues fluid flow to the input port.

In various example embodiments, the powerhouse may be arranged in a vertical configuration, in which the power generator is arranged vertically; or a horizontal configuration, in which the power generator is arranged horizontally.

In various example embodiments, the flow path structure may define a bypass flow path from input port to output port or within a flow path to enable fluid flow to circumvent the power generator.

In various example embodiments, the powerhouse may include a flow control gate, and the flow path structure may define multiple flow paths at least one of which is operably controllable in combination with operation of the flow control gate.

In various example embodiments, the flow path structure may define multiple flow paths, at least a subset of the multiple flow paths being selectably configurable to enable fluid flow.

In various example embodiments, the powerhouse may include an icebreaker arranged to break ice prior to flowing into the input port.

The power generation system may further include a superstructure positioned above at least a portion of the powerhouse, wherein the superstructure is configured to support a functional element to perform maintenance at the powerhouse.

In various example embodiments, the superstructure may include at least one rail, located on or within the superstructure that enables coupling with the functional element.

In various example embodiments, the functional element may include a crane configured to be mechanically powered.

In various example embodiments, the powerhouse may further include a Faraday shield room or a room shielded with radiation hardened material.

The power generation system may further include at least one auxiliary power system.

The power generation system may further include at least one energy storage system.

In various example embodiments, at least one of the precast segments may be removably coupled with the power generation support structure.

In various example embodiments, the functional element may be a crane assembly configured to raise or lower at least one flow control gate in order to control a height of a reservoir.

In various example embodiments, the crane may include a combination of crane elements to lift the at least one waterflow restriction gate from multiple points to reduce a likelihood that a gate will cantilever during raising and lowering operations.

In various example embodiments, the powerhouse may further include an access channel, one end of the access channel being coupled to the access port.

In various example embodiments, the superstructure may include an enclosure positioned around the access port.

In various example embodiments, the access port may be defined by at least one precast segment.

In various example embodiments, the flow path structure may be configured to accept fluid at an input port to enter the powerhouse in a first direction and the access port is oriented in a second direction, the second direction being different than the first direction.

In various example embodiments, the power generator may include at least one turbine.

In various example embodiments, at least one of the precast forms may include at least one divider to define two or more compartments.

The power generation system may further include at least one water intake system. The water intake system may include at least one precast segment, the water intake system being functionally coupled to at least one of the powerhouse system or the dam system.

In various example embodiments, the powerhouse may include a flow control gate configured to communicate with the power generator.

A power generation system may include a powerhouse at least partially defined by a plurality of precast segments. At least one of the precast segments may include a precast form having disposed therein at least one precast infill block.

A power generation system may include a dam at least partially defined by a plurality of precast segments. At least one of the precast segments may include a precast form having disposed therein at least one precast infill block.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 28A shows a side view of an example embodiment of an intake module.

FIG. 28B shows a perspective sectional view of an example embodiment of an intake module.

FIG. 28C shows a perspective view of an example embodiment of a layer of an intake module.

DETAILED DESCRIPTION

A description of example embodiments follows.

Example embodiments of aspects of the inventive concepts are directed to dams and powerhouses. Example assemblies may include advanced structures and assembly techniques through use of precast forms to produce precast segments. The precast segments form various structures and features of the dams and powerhouses, and may further be used to form flowpaths, optionally having an inner or outer steel, composite, or other material liner that is applied at high pressure locations, such as at a lower region of a flowpath or at a turbine.

Systems, devices and methods described herein may involve components constructed from precast segments. As used herein, the term “precast segment” refers to precast modules of particular shape and size formed of a structural material, for example, concrete. Precast segments can include coupling elements to enable the segments to be interconnected during construction of a structure, such as a reservoir or impoundment module. Precast segments can be manufactured off-site, providing for increased control over manufacturing conditions, thereby providing for more robust and uniformly constructed segments for forming a structure, as compared with a structure formed by on-site concrete pouring. For some construction projects, a temporary facility may be constructed to manufacture precast segments on-site, whereby the temporary facility itself may be formed of precast segments.

Figure 1:
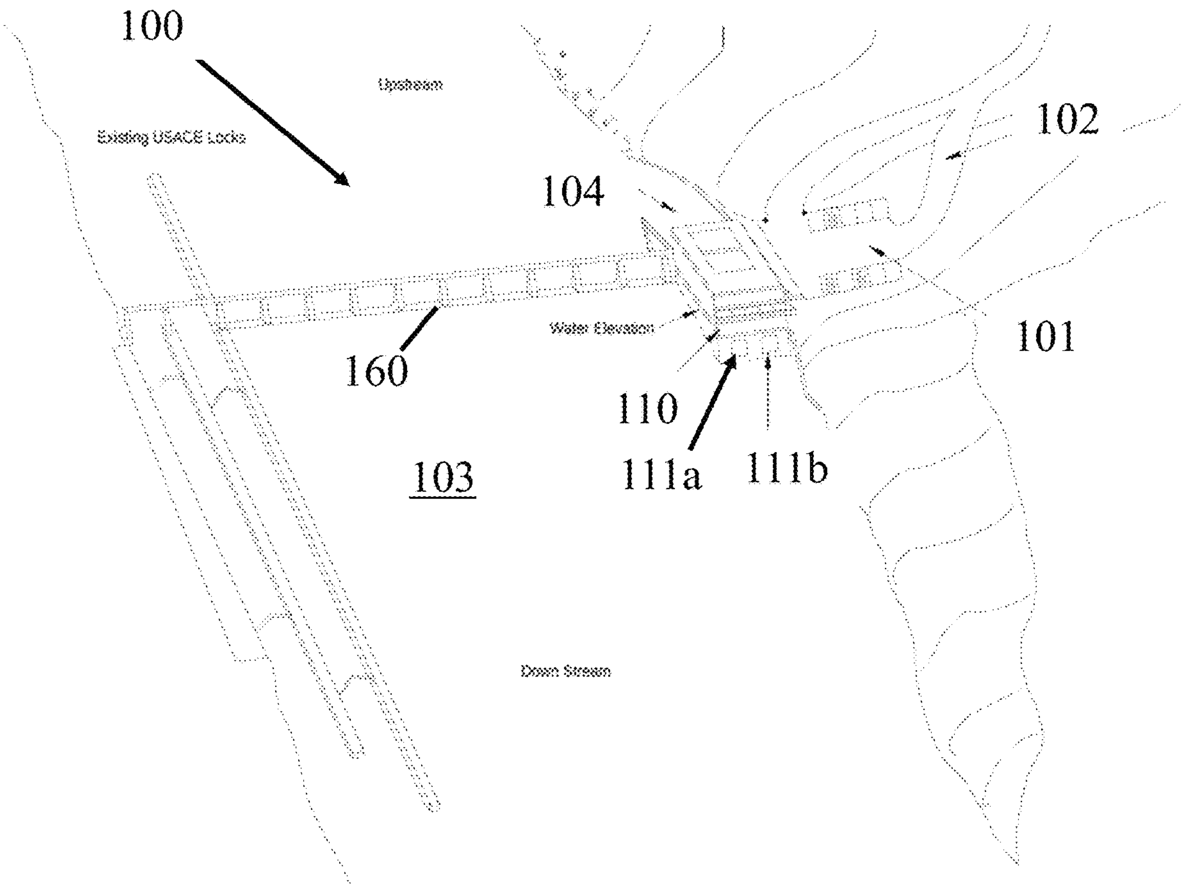
FIG. 1 is a perspective view of an example embodiment of a power generation system.

FIG. 1 is a perspective view of an example embodiment of a power generation system 100. In some embodiments, such as the one shown in FIG. 1 the power generation system 100 comprises a dam 160 and a powerhouse 110. FIG. 1 shows the power generation system 100 installed at a body of water 103. In some embodiments, such as the one shown in FIG. 1, a parking lot 101 and a road 102 may be located near the powerhouse 110. In this embodiment, water enters the powerhouse 110 along a flow path 104. Inside the powerhouse 110 the water interacts with a power generator to produce electrical power.

The fluid (e.g., water) may enter the powerhouse 110 via one or more input ports. In some embodiments, such as the one shown in FIG. 1, the water exits the powerhouse 110 via one or more output ports 111. In the embodiment shown in FIG. 1, the powerhouse 110 comprises two output ports 111*a*, 111*b*. In alternative embodiments, the powerhouse 110 may comprise a different number of output ports.

Figure 2A:
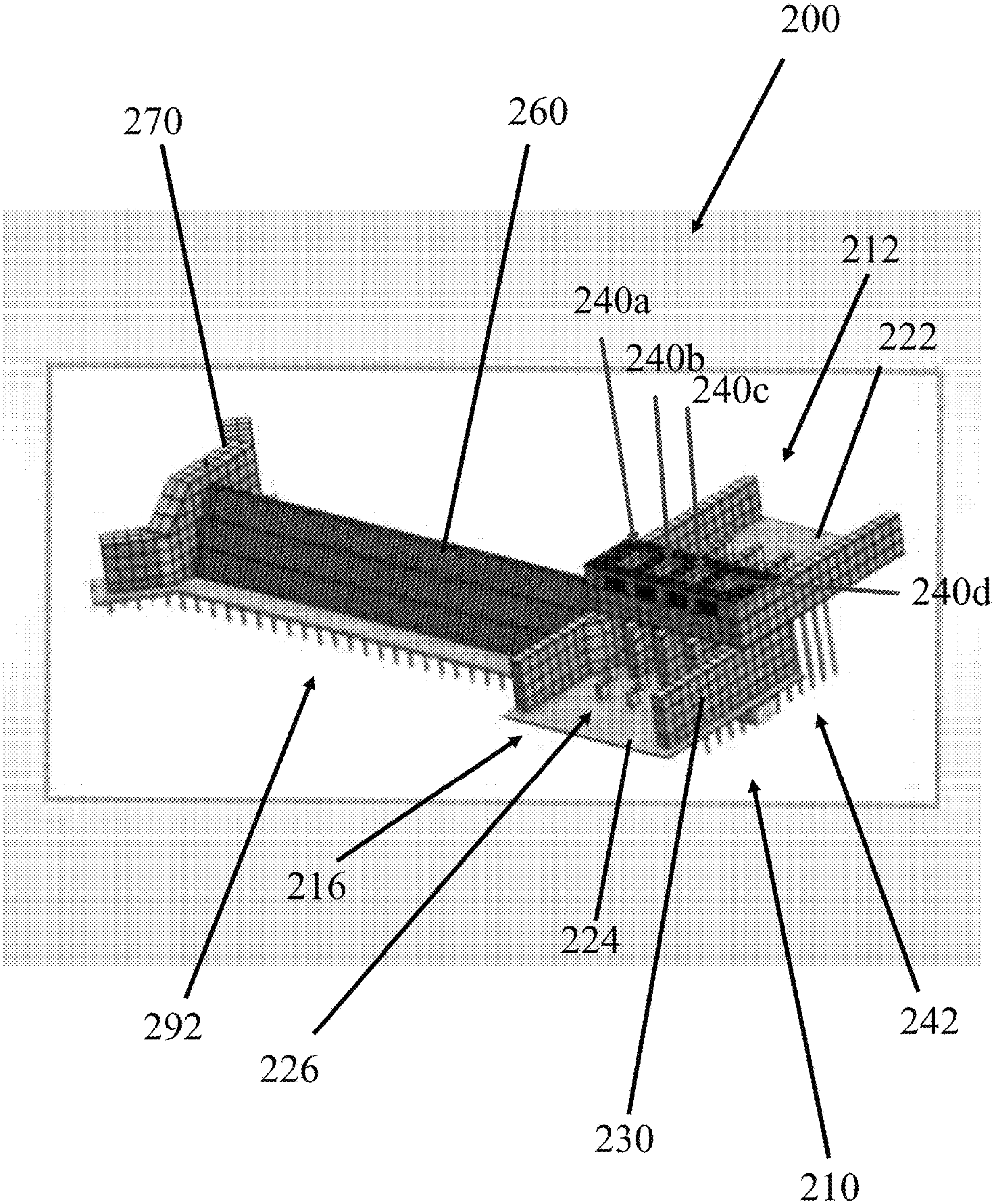
FIG. 2A is a perspective view of an example embodiment of a power generation system comprising a powerhouse and a dam.

FIG. 2A is a perspective view of an example embodiment of a power generation system 200 comprising a powerhouse 210 and a dam 260. In some embodiments, such as the one shown in FIG. 2, the powerhouse comprises a flow path structure 230 defining at least a portion of a flow path. In some embodiments, such as the one shown in FIG. 2A the flow path structure 230 comprises at least one precast segment. In some embodiments, the powerhouse 210 is constructed entirely of precast segments. In some embodiments, the powerhouse 210 is partially constructed using precast segments. In some embodiments, the powerhouse does not comprise precast segments.

The flow path structure 230 may be configured to accept fluid at an input port 212 to enter the powerhouse 210 and direct the fluid to exit the powerhouse 210 at an output port 216. In some embodiments, such as the one shown in FIG. 2A, the flow path structure 230 defines multiple flow paths.

In some embodiments, the flow path structure 230 defines multiple input ports 212. In the embodiment shown in FIG. 2A, the flow path structure 230 comprises four input ports. In alternative embodiments, the flow path structure 230 may comprise a different number of input ports. In some embodiments, each one of the multiple input ports is paired with a corresponding intake bay. In some embodiments, different intake bays are separated by dividers.

In some embodiments, the flow path structure 230 defines multiple output ports 216. In the embodiment shown in FIG. 2A, the flow path structure 230 comprises four output ports. In alternative embodiments, the flow path structure 230 may comprise a different number of output ports. In some embodiments, each one of the multiple output ports is paired with a corresponding output bay. In some embodiments, different output bays are separated by dividers.

In some embodiments, the powerhouse includes at least one flow control gate. The flow path structure may define multiple flow paths at least one of which is operably controllable in combination with operation of the flow control gate. The flow path structure may define multiple flow paths and at least a subset of the multiple flow paths may be selectively configurable to enable fluid flow. In some embodiments, at least one of the at least one flow control gate is configured to communicate with the power generator. In some embodiments, the power generation system further comprises a dam functionally coupled with the powerhouse in a manner that maintains or discontinues fluid flow to at least one input port.

The powerhouse 210 may comprise at least one power generator. In some embodiments, the power generator may comprise at least one turbine. The flow path structure may define a bypass flow path from an input port to output port or within a flow path to enable fluid flow to circumvent the power generator.

The powerhouse 210 may comprise at least one power generation support structure configured to support weight of a power generator in an arrangement operably disposed within the flow path. The power generation support structure may be, at least partially, constructed of precast segments. Each power generator may be paired with a unique power generation support structure. Alternatively, one or more power generators may be supported by the same power generation support structure.

In some embodiments, the power generation support structure includes at least one precast segment. In some embodiments, at least one of the at least one precast segment is removably coupled to the power generation support structure.

The power generation support structure may include precast forms and filler that define the precast segments and wherein the precast forms are filled with the filler on a layer-by-layer basis during a process of arranging the precast segments in vertical layers to define the power generation support structure.

The power generation system may include a power generation support structure that defines a lowest layer having a pattern of vertically offset portions. The power generation system may include a power generation support structure that includes a layer, having a pattern of vertically offset portions.

In some embodiments, such as the one shown in FIG. 2A, the powerhouse 210 is arranged in a vertical configuration, in which the power generator is arranged vertically. In some vertical configurations, the input port 212 and the output port 216 may be at different heights. In alternative embodiments, the powerhouse may be arranged in a horizontal configuration, in which the power generator is arranged horizontally.

The powerhouse 210 may comprise at least one access port 240 different from the input port 212. The access port 240 may be aligned to enable removable coupling of the power generator to and from the power generation support structure 230. In the embodiment shown in FIG. 2A, the powerhouse 210 comprises four access ports 240*a*, 240*b*, 240*c*, 240*d*. In alternative embodiments, the powerhouse 210 comprises a different number of access ports. The number of access ports may correspond to the number of power generators. Alternatively, in some embodiments, the number of access ports may not correspond to the number of power generators.

In some embodiments, such as the one shown in FIG. 2A, the access ports are oriented in a direction that is orthogonal to the direction at which the flow path enters the powerhouse 210. In alternative embodiments, the access ports are oriented in a different direction. In some embodiments, such as the one shown in FIG. 2A, the access ports are oriented in a direction that is orthogonal to the direction at which the flow path exits the powerhouse 210. In alternative embodiments, the access ports are oriented in a different direction. In some embodiments, the flow path structure is configured to accept fluid at an input port to enter the powerhouse in a first direction and the access port is oriented in a second direction, the second direction being different than the first direction.

In some embodiments, such as the one shown in FIG. 2A, the powerhouse defines four access ports. In alternative embodiments, the powerhouse may define a different number of access ports. At least one of the access ports may be defined by at least one precast segment.

The powerhouse may further define an access channel, one end of the access channel being an access port.

In some embodiments, such as the one shown in FIG. 2A, the power generation system 200 comprises at least one spillway. In some embodiments, the spillways are constructed of precast segments, optionally through use of precast forms that are used to produce the precast segments, as described herein. In some embodiments, the spillways are not constructed of precast segments. The advanced spillways may extend any length, such as tens or hundreds of feet upstream of or downstream from the dam or powerhouse.

In the embodiments shown in FIG. 2A the power generation system 200 comprises a spillway 222 associated with the input port 212. In alternative embodiments, the powerhouse 210 may not comprise a spillway associated with the input port 216.

In the embodiments shown in FIG. 2A the power generation system 200 comprises a spillway 222 associated with the output port 216. In alternative embodiments, the powerhouse 210 may not comprise a spillway associated with the output port 216.

In some embodiments, such as the one shown in FIG. 2A, the power generation system 200 comprises a spillway associated with the dam 260.

The power generation system 200 may comprise at least one diffuser 226. At least one of the at least one diffuser 226 may be constructed of precast segments, which may be formed as described herein. The diffusers 226 may be positioned upstream or downstream of a dam or powerhouse in order to diffuse water flow from damaging a feature of the dam 260 or powerhouse 210 over a period of time. The diffusers 226 may be mechanically inserted into corresponding coupling features in a spillway, for example. The diffusers 226 may be active in that they can be rotated relative to a water flow over a period of time, such as during a day or over longer periods of time, such as a season of the year. The corresponding coupling element may itself be operationally able to rotate or otherwise change an orientation of a diffuser 226 in coordination with other diffusers 226 to aid in steering a flow of water across, for example, a spillway in an effort to defuse water flow from damaging a feature of the dam 260 or powerhouse 210 over a long period of time.

In some embodiments, such as the one shown in FIG. 2A, diffusers 226 are coupled to the spillway 224 associated with the output ports 216. In alternative embodiments, the spillway 224 associated with the output port may not be coupled to diffusers 226. In alternative embodiments, diffusers may be coupled to the spillway 222 associated with the input port(s) 212.

The power generation system may comprise at least one abutment wall. In some embodiments, such as the one shown in FIG. 2A, the power generation system comprises an abutment wall 270 at one side of the dam 260.

The power generation system may comprise one or more rock bolts (every use of rock bolts herein also applies to rock anchors, and vice versa) configured to secure a portion of the power generation system to a surface. In some embodiments, such as the one shown in FIG. 2A multiple rock bolts 292 are coupled to a lower surface of the dam. In some embodiments, such as the one shown in FIG. 2A multiple rock bolts 242 are coupled to a lower surface of the powerhouse.

Figure 2B:
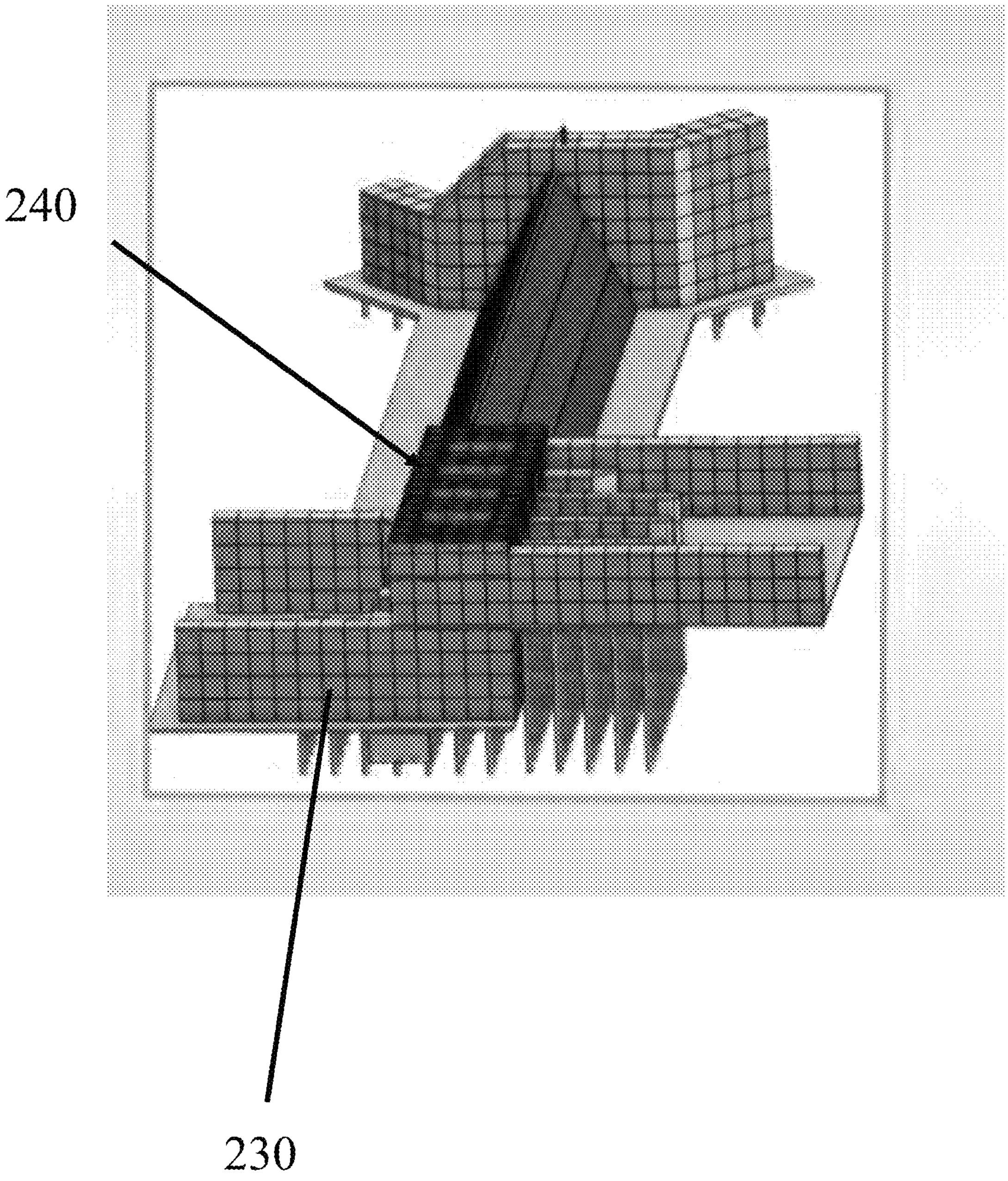
FIG. 2B shows the example embodiment of FIG. 2A from a side-perspective view.

FIG. 2B shows the example embodiment of FIG. 2A from a side-perspective view.

Figure 3A:
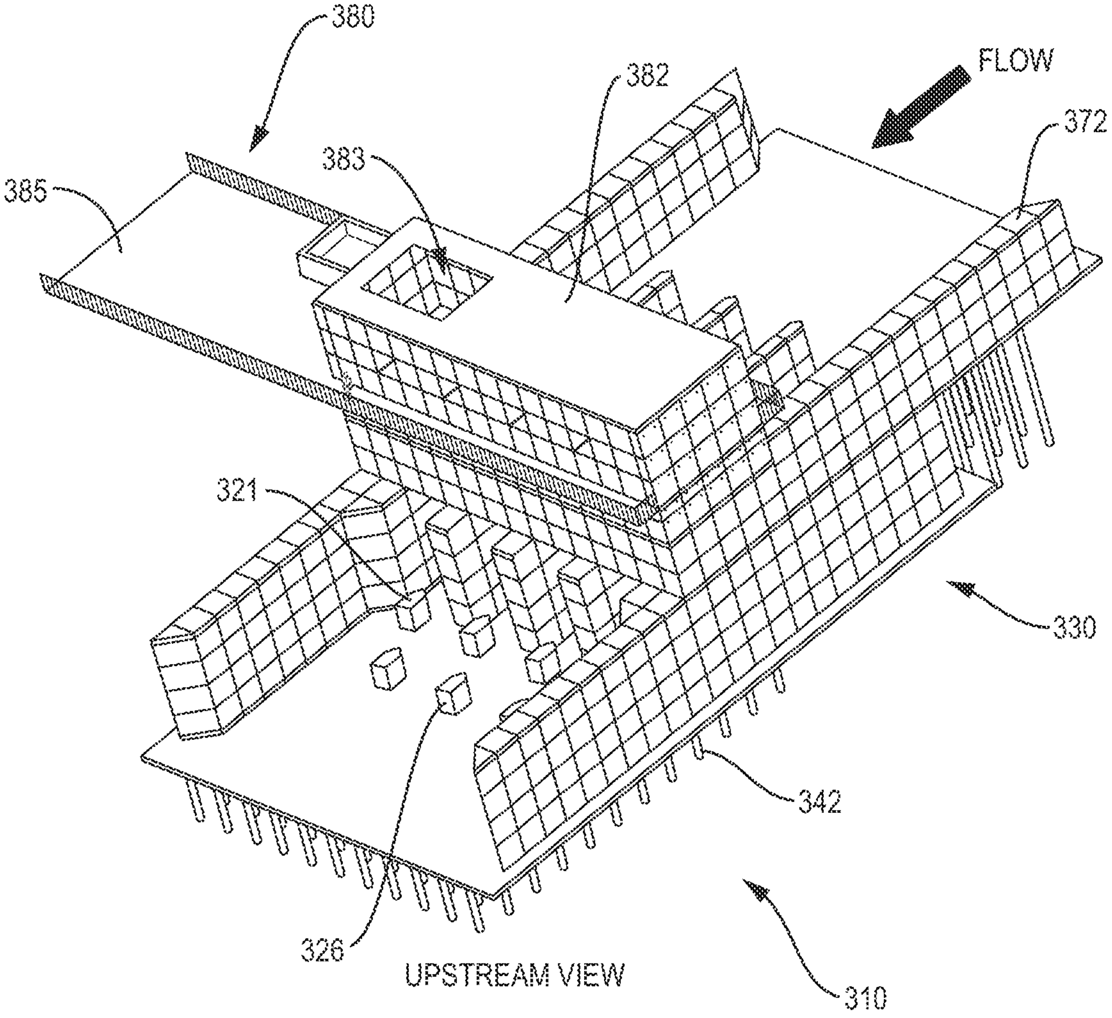
FIG. 3A shows a perspective view of an example embodiment of a powerhouse comprising a superstructure.

FIG. 3A shows a perspective view of an example embodiment of a powerhouse comprising a superstructure 380. The superstructure 380 may be positioned above at least a portion of the powerhouse. The superstructure 380 may comprise a platform 385 constructed and arranged to support people and/or equipment.

The superstructure 380 may comprise at least one enclosure 382. In some embodiments, such as the one shown in FIG. 3A, the superstructure 380 comprises one enclosure 382. In alternative embodiments, the superstructure comprises a different number of enclosures. In some embodiments, the superstructure 380 does not include an enclosure. In some embodiments, such as the one shown in FIG. 3A, the enclosure 382 is positioned around an access port.

At least one of the at least one enclosure may define at least one port 383. In the embodiment, shown in FIG. 3A, the enclosure defines one port 383. In alternative embodiments, the enclosure may define a different number of ports. In the embodiment shown in FIG. 3A, the port is at a top surface of the enclosure 382. In alternative embodiments, the port may be at a different location.

In some example embodiments the powerhouse system may further comprise a Faraday shield room or a room shielded with radiation hardened material. In some embodiments, the enclosure of the superstructure may serve as a Faraday shield room. In some embodiments of a dam or powerhouse, a Faraday shield room is constructed and configured to store electrical equipment, such as transformers, computer systems, electrical controllers, and/or even turbines that may be adversely affected by an energy spike, such as a lightning strike, power surge, electromagnetic pulse, or adverse weather event. The Faraday shield room may be positioned in a manner that enables a crane assembly at the superstructure assist with performing maintenance activities to return the dam or powerhouse back to operational status.

In some embodiments the superstructure is configured to support a functional element to perform maintenance at the powerhouse. The functional element may comprise a crane. The functional element may comprise a crane configured to be mechanically powered. The functional element may be a crane assembly configured to raise or lower at least one flow control gate in order to control a height of a reservoir. The crane may comprise a combination of crane elements to lift the at least one waterflow restriction gate from multiple points to reduce a likelihood that a gate will cantilever during raising and lowering operations.

The superstructure may comprise at least one rail, located on or within the superstructure that enables coupling with the functional element. In some embodiments, the superstructure may be composed of precast segments. In some embodiments, the superstructure may not be composed of precast segments.

A superstructure composed of pillars and a ceiling may be formed on the assembly of precast segments in order to provide for functional elements to be operating above the assembly of precast segments. An example of a functional element is a crane that is suspended from a rail mounted on the ceiling or movably coupled to a rail on the working platform. The crane or other functional elements may travel in various directions above the assembly of precast segments to perform a particular function, such as replacing worn precast segments, replacing a turbine, replacing a section of penstock, removing debris above or below the assembly of precast segments, or performing any number of other functions that may be of use in operation or maintenance of the dam or powerhouse.

Another example of a function performed by a functional element at the superstructure is the use of a crane assembly that travels along a dam and raises or lowers waterflow restriction gates in order to control a height of a reservoir created by the dam. The crane may be a combination of crane elements to lift the gate from multiple points to reduce a likelihood that a gate will cantilever during raising and lowering operations, which may require extended maintenance to fix.

In the embodiment shown in FIG. 3A, the flow path structure 330 is composed of at least one precast structure 372. In alternative embodiments, the flow path structure 330 may not be composed of precast structures.

In some embodiments, such as the one shown in FIG. 3A multiple rock bolts 342 are coupled to a lower surface of the powerhouse.

In some embodiments, such as the one shown in FIG. 3A, diffusers 326 are coupled to the spillway associated with the output bays 321. In alternative embodiments, the spillway 224 associated with the output bays or output ports may not be coupled to diffusers. In alternative embodiments, diffusers may be coupled to the spillway associated with the input ports.

Figure 3B:
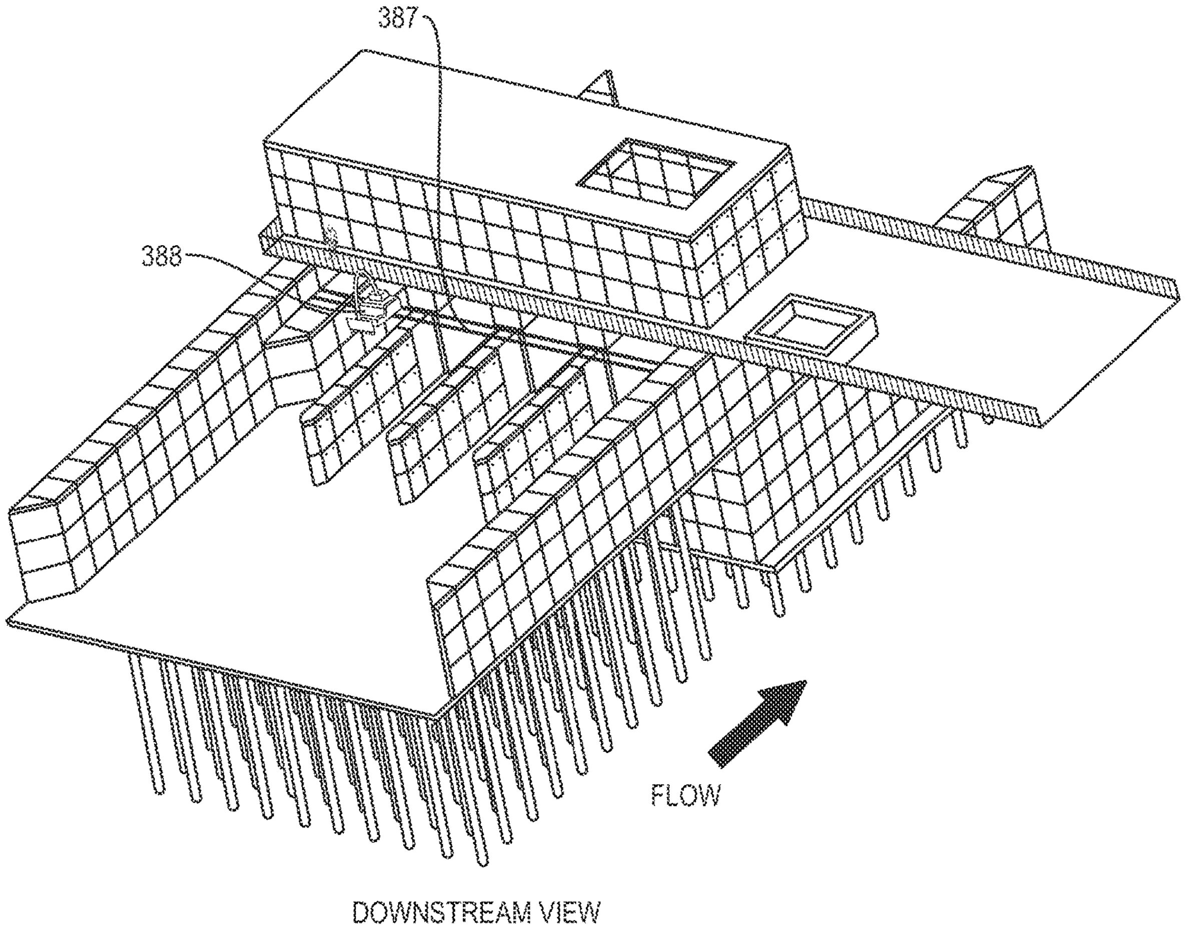
FIG. 3B is a perspective view from the upstream side of the embodiment of FIG. 3A.

FIG. 3B is a perspective view from the upstream side of the embodiment of FIG. 3A. In some embodiments, such as the one shown in FIG. 3B, the powerhouse comprises a rake system 388 configured to remove debris and other materials from fluid flowing into one of more input ports.

The powerhouse may comprise at least one flow-through bays 387. In the embodiment shown in FIG. 3B, the powerhouse comprises four flow-through bays 387. In alternative embodiments, the powerhouse may comprise a different number of flow-through bays.

Figure 4A:
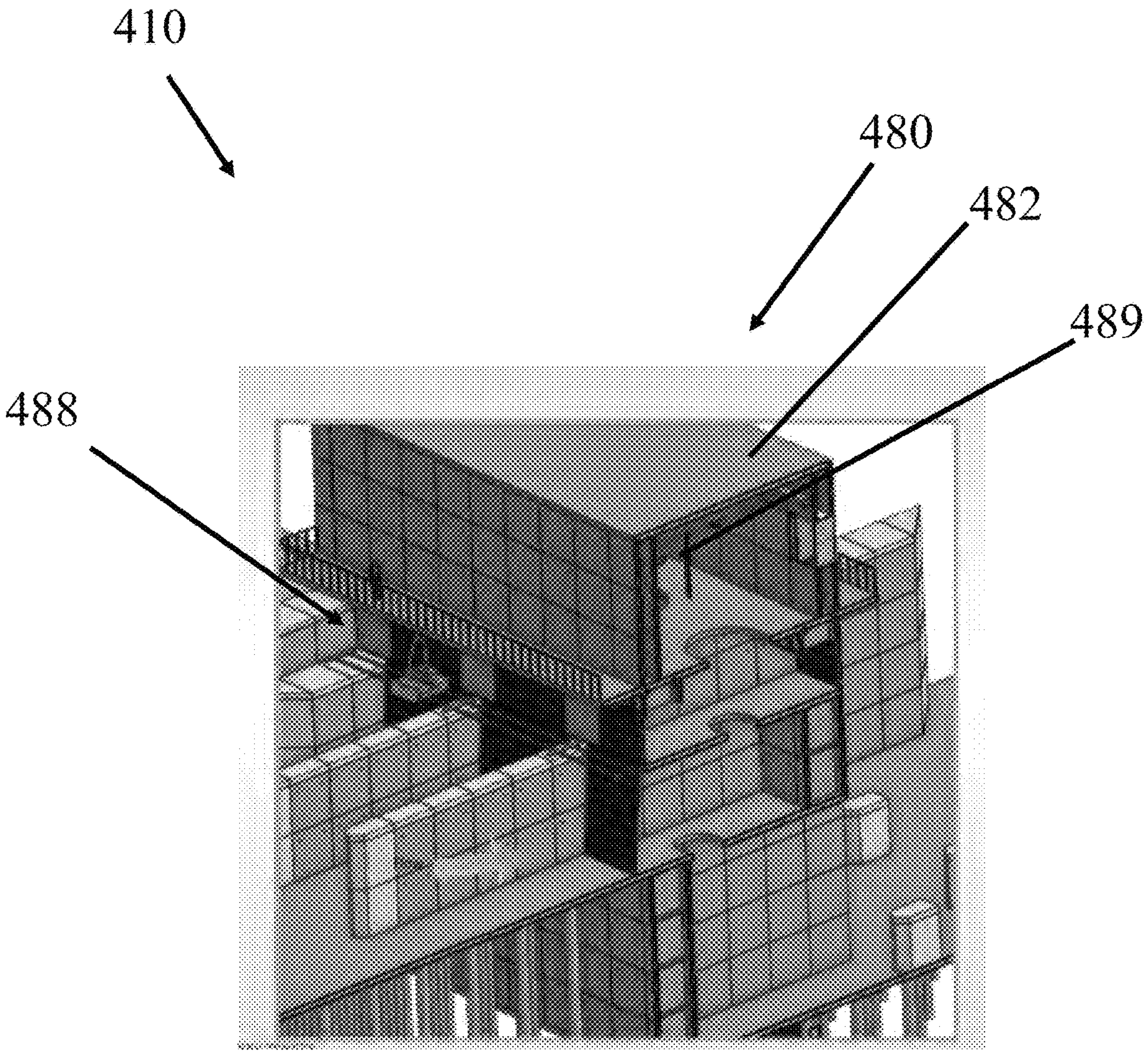
FIG. 4A show s sectional view of an example embodiment of a powerhouse and superstructure with an enclosure.

FIG. 4A show s sectional view of an example embodiment of a powerhouse and superstructure 480 with an enclosure 482. A rake system 488 is visible near the input ports. In this embodiment a functional element 489 is mounted at a surface of the enclosure 482.

Figure 4B:
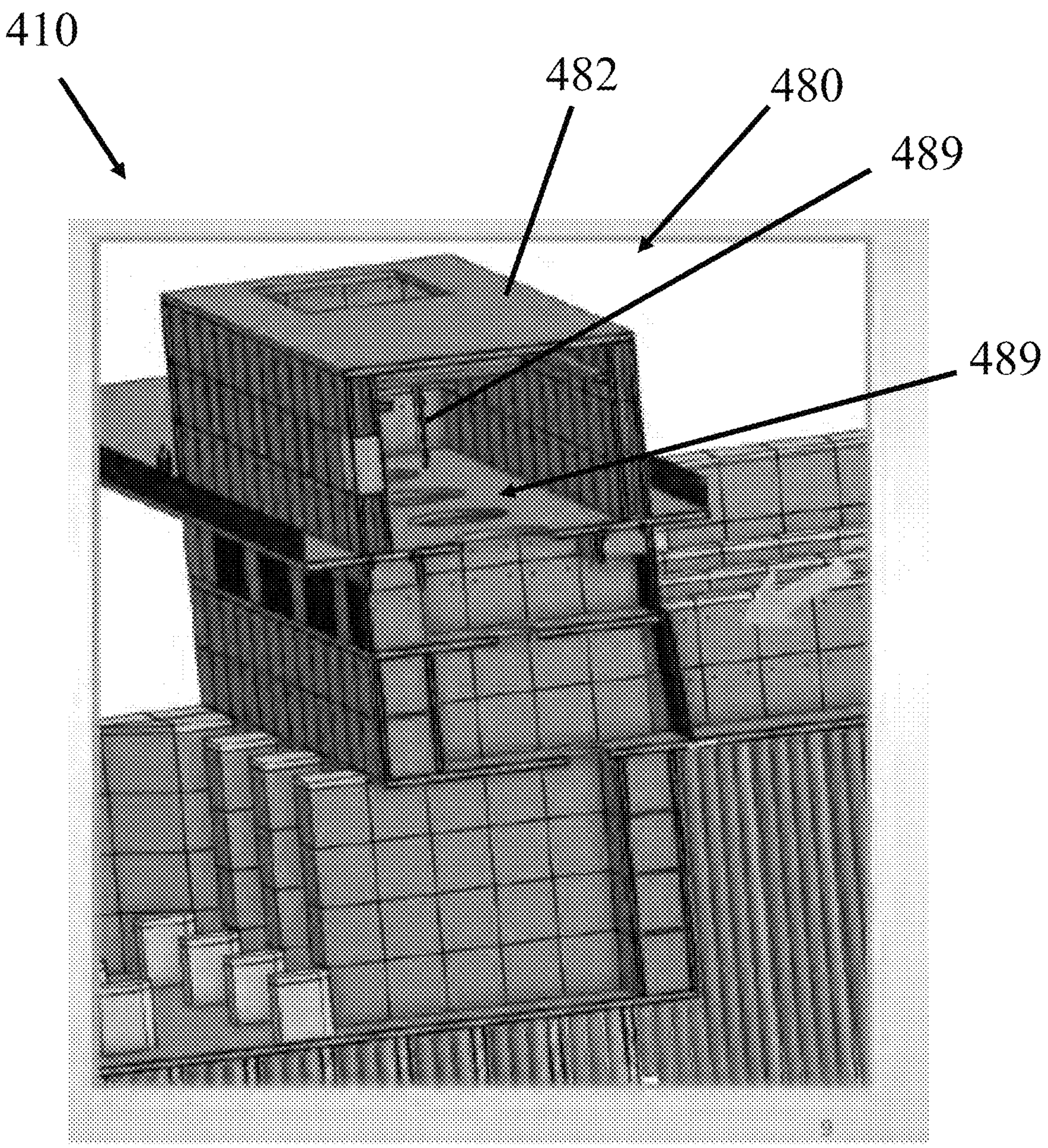
FIG. 4B is a different sectional view of the example embodiment of FIG. 4B.

FIG. 4B is a different sectional view of the example embodiment of FIG. 4B. In this embodiment, three access ports 489 are defined. These access ports 489 facilitate removal and insertion of power generators. The embodiment shown in FIG. 4B has three access ports. In alternative embodiments, the powerhouse 410 may define a different number of access ports. In the embodiment shown in FIG. 4B the access ports are arranged in a line. In alternative embodiments, the access ports may be arranged differently.

Figure 5A:
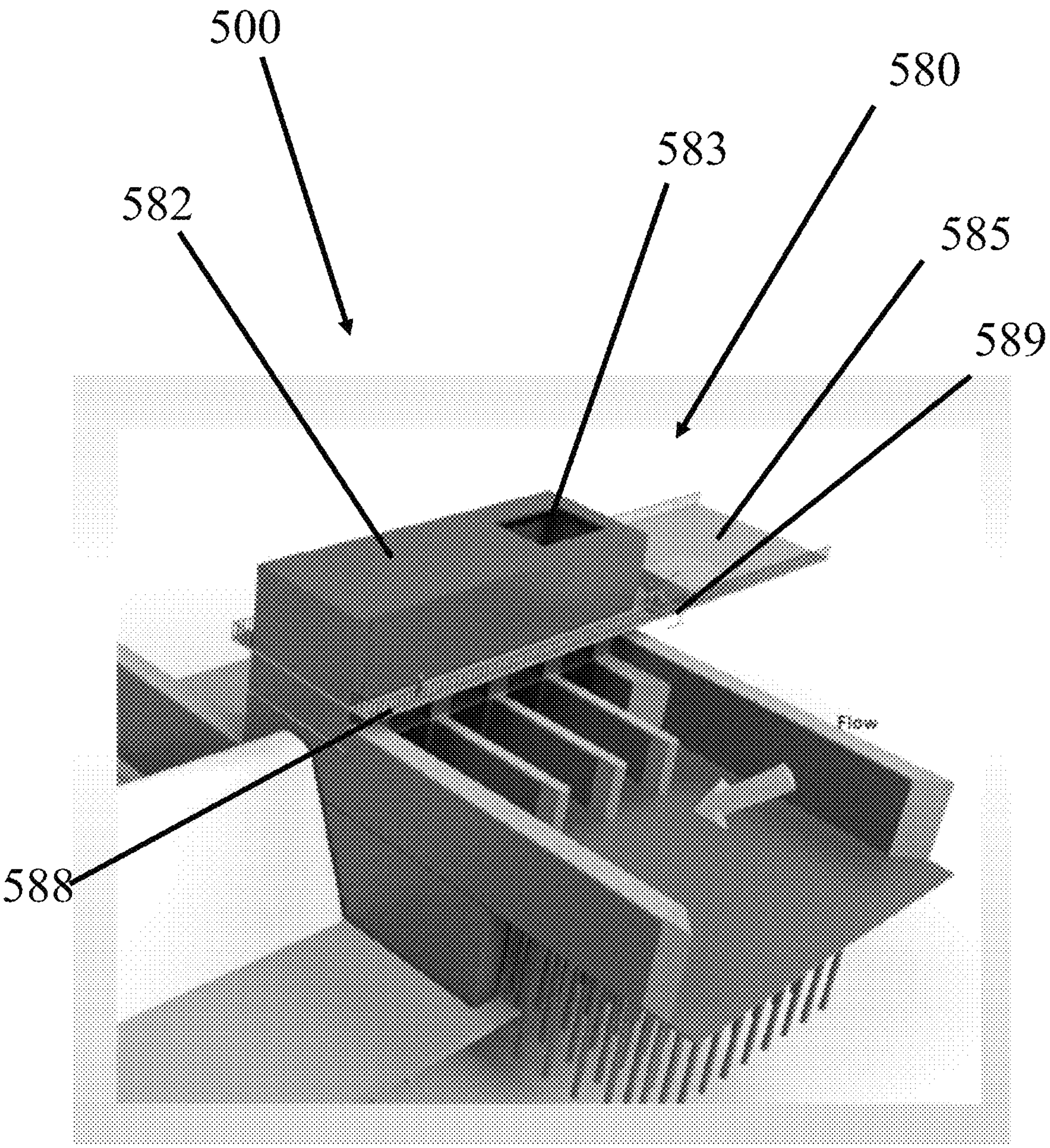
FIG. 5A is a perspective view of an example embodiment of a power generation system.

FIG. 5A is a perspective view of an example embodiment of a power generation system 500. As shown in FIG. 5A, the rake system 588 may comprise a functional element 589 configured to remove material from a fluid flow entering the powerhouse. In the embodiment shown in FIG. 5A, the functional element 589 is a crane. In alternative embodiments, the functional element may be different.

Figure 5B:
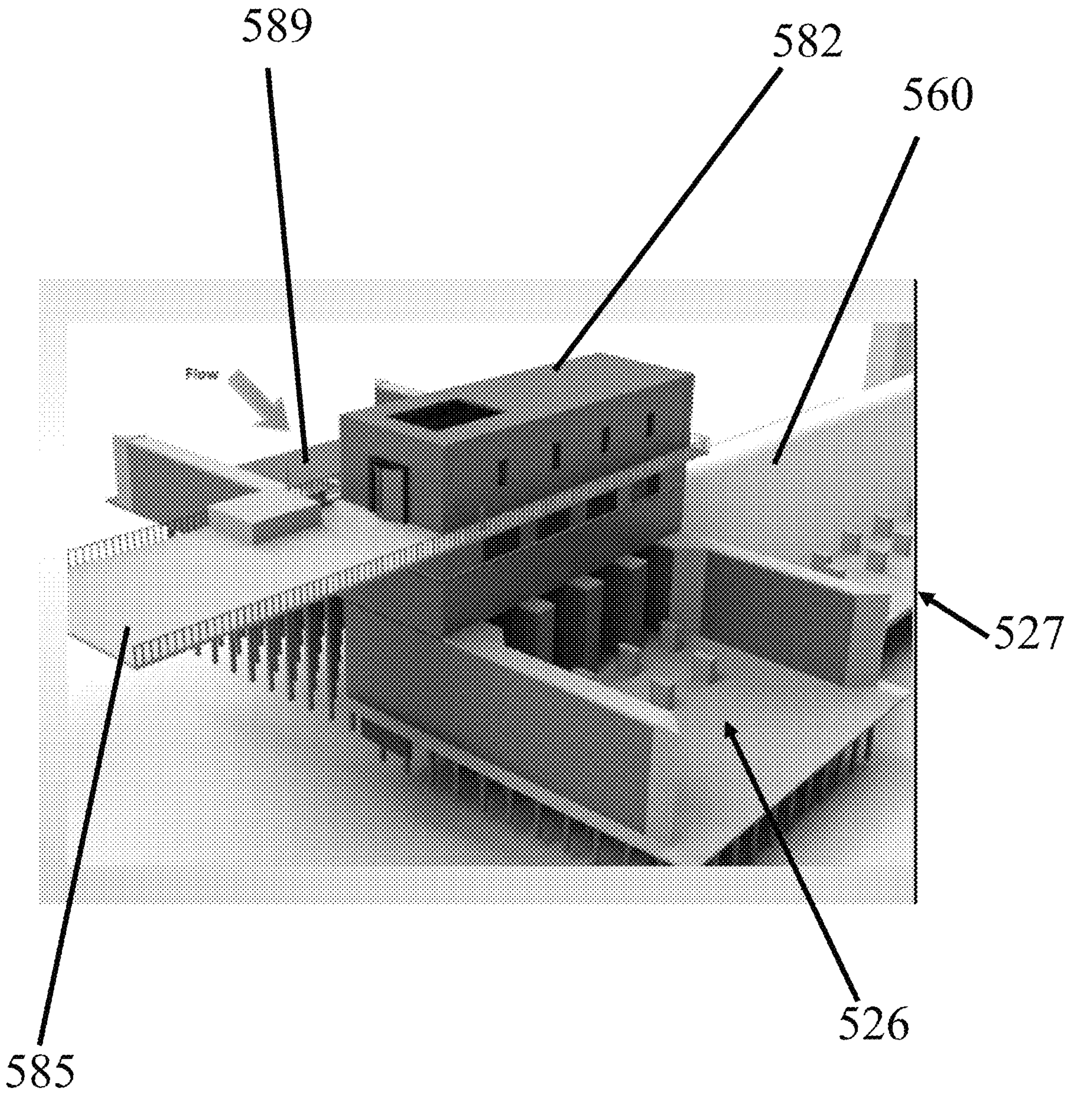
FIG. 5B is a different perspective view of the example embodiment shown in FIG. 5A.

FIG. 5B is a different perspective view of the example embodiment shown in FIG. 5A. In this embodiment diffusers are positioned near output ports of the powerhouse. In this embodiment, diffusers are also positioned at one side of the dam 560.

Figure 6:
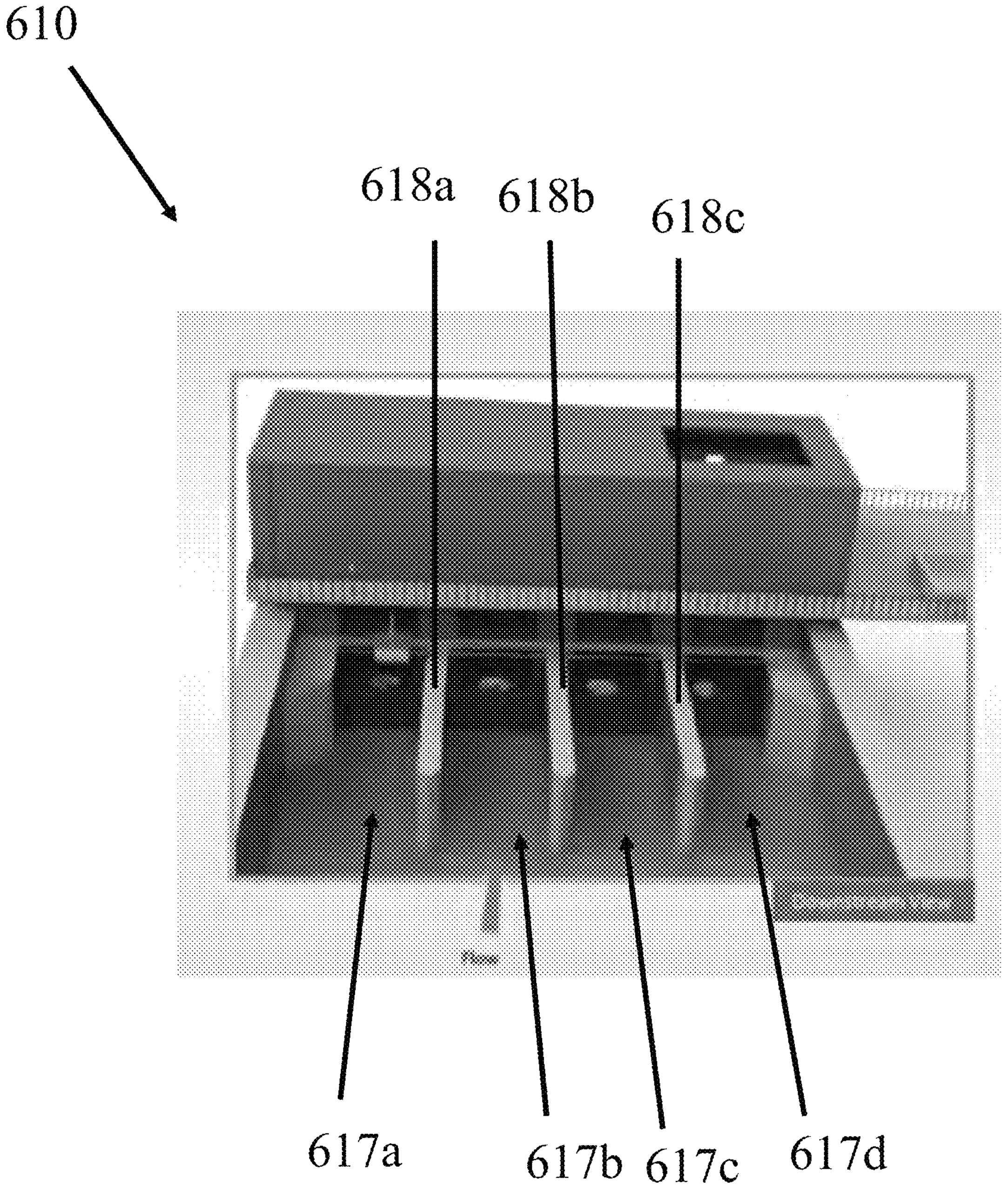
FIG. 6 is a perspective view of an example embodiment of a powerhouse 610.

FIG. 6 is a perspective view of an example embodiment of a powerhouse 610. In the embodiment shown in FIG. 6, the powerhouse 610 four intake bays 617*a*-617*d*, each corresponding to an input port. The intake bays 617 are separated by dividers 618*a*-618*d*. In alternative embodiments, the powerhouse may comprise a different number of intake bays and/or dividers.

Figure 7:
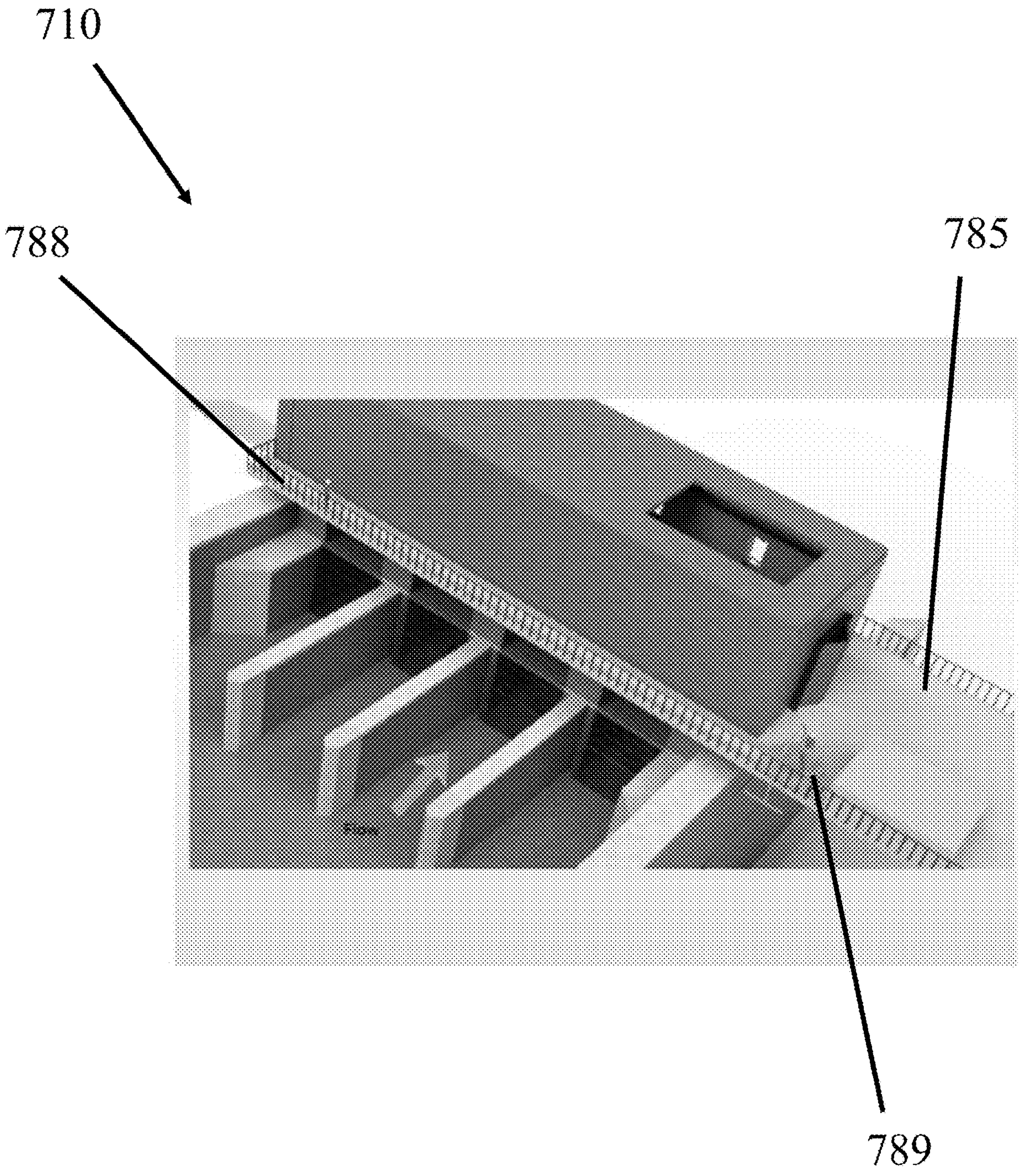
FIG. 7 is a perspective view of an example embodiment of a powerhouse comprising a rake system and a functional element.

FIG. 7 is a perspective view of an example embodiment of a powerhouse 710 comprising a rake system 788 and a functional element 789. In this embodiment, the functional element 789 is mounted at a platform 785.

Figure 8A:
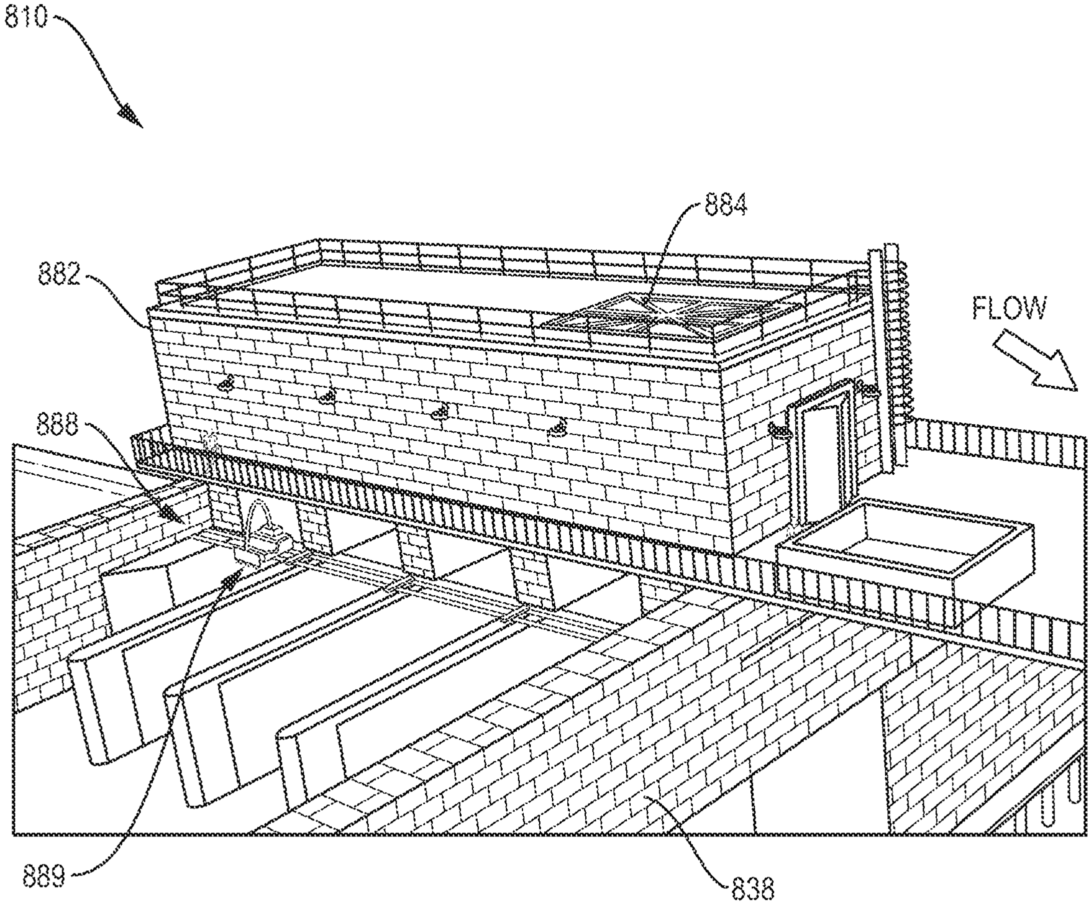
FIG. 8A is a perspective view of an example embodiment of a powerhouse comprising a rake system and a functional element.

FIG. 8A is a perspective view of an example embodiment of a powerhouse 810 comprising a rake system 888 and a functional element 889. In this embodiment, the functional element 889 is mounted at a rail. In some embodiments, such as the embodiment shown in FIG. 7A, the powerhouse 810 is covered with a liner 838. In this embodiment the powerhouse 810 includes an enclosure 882 and the enclosure 882 defines a port. In the embodiment shown in FIG. 8A, the port is blocked by a cover 884. In alternative embodiments, the cover 884 may only block a portion of the port.

Figure 8B:
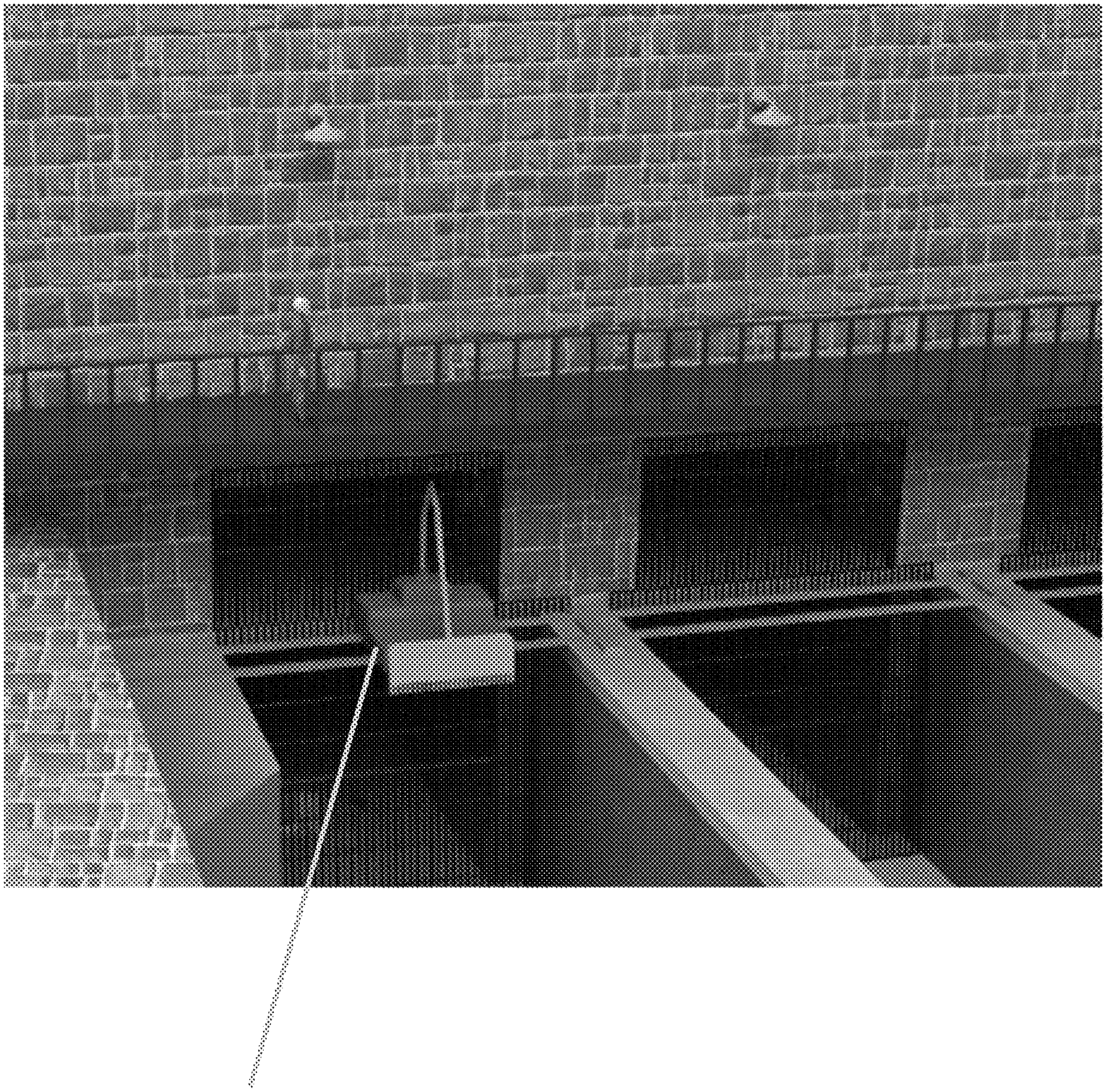
FIG. 8B shows a perspective view of an example embodiment of a powerhouse comprising a rake system and a functional element.

FIG. 8B shows a perspective view of an example embodiment of a powerhouse 810 comprising a rake system 888 and a functional element 889. In this embodiment, the functional element 889 is mounted at a rail.

Figure 9:
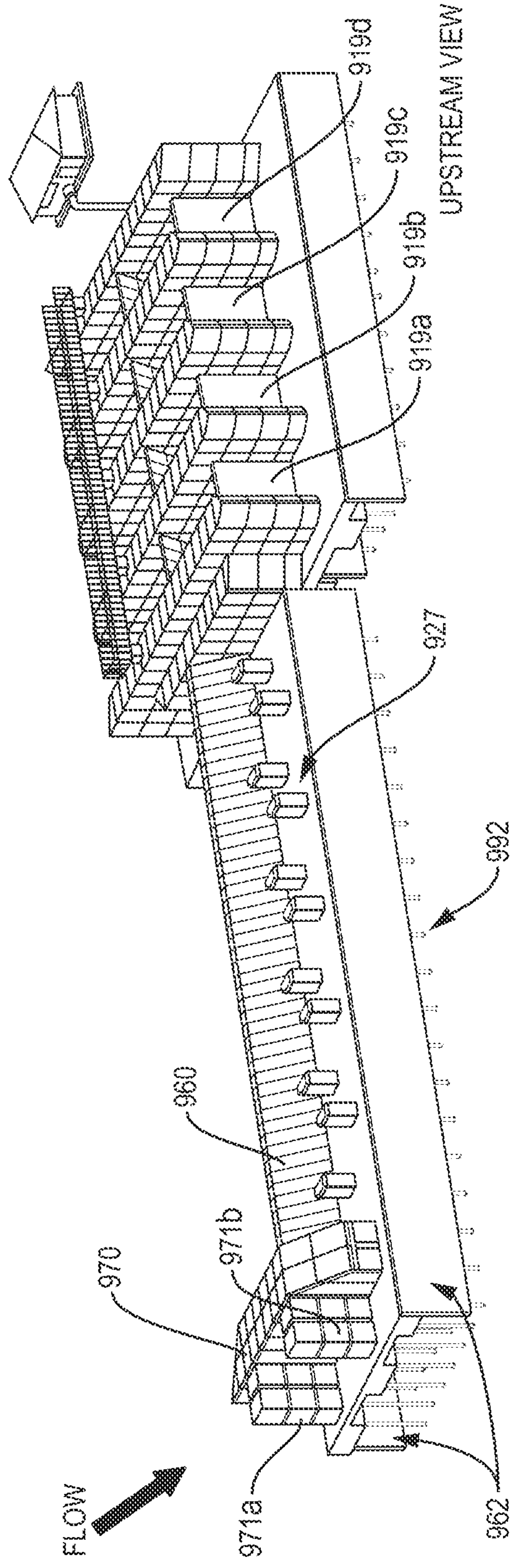
FIG. 9 is a perspective view of an example embodiment of a dam and a portion of a powerhouse.

FIG. 9 is a perspective view of an example embodiment of a dam 960 and a portion of a powerhouse. In this embodiment, a flow control gate 919*a*-919*d* is positioned at each intake bay. Each control gate may be configured to regulate the flow of fluid entering the intake bay. In alternative embodiments, one or more of the intake bays may not be associated with a flow control gate. In this embodiment the dam 960 is coupled to an abutment wall 970. As shown in FIG. 9, an abutment wall 970 may be coupled to one or more support abutment walls 971. In the embodiment shown in FIG. 9, there are two support abutment walls 971*a*, 971*b*. In alternative embodiments, there may be a different number of support abutment walls. In alternative embodiments, one or more of the one or more support abutment walls 971 may be arranged differently than the arrangement shown in FIG. 9.

In the embodiment shown in FIG. 9, diffusers 927 are located on the upstream side of the dam 960. In some embodiments, such as the one shown in FIG. 9, one or more rock bolts 992 may be coupled to the dam 960. In some embodiments, such as the one shown in FIG. 9, one or more cutoff walls 962 may be coupled to the dam 960 and/or the powerhouse. The cutoff walls may be configured to block the flow of fluid.

Figure 10:
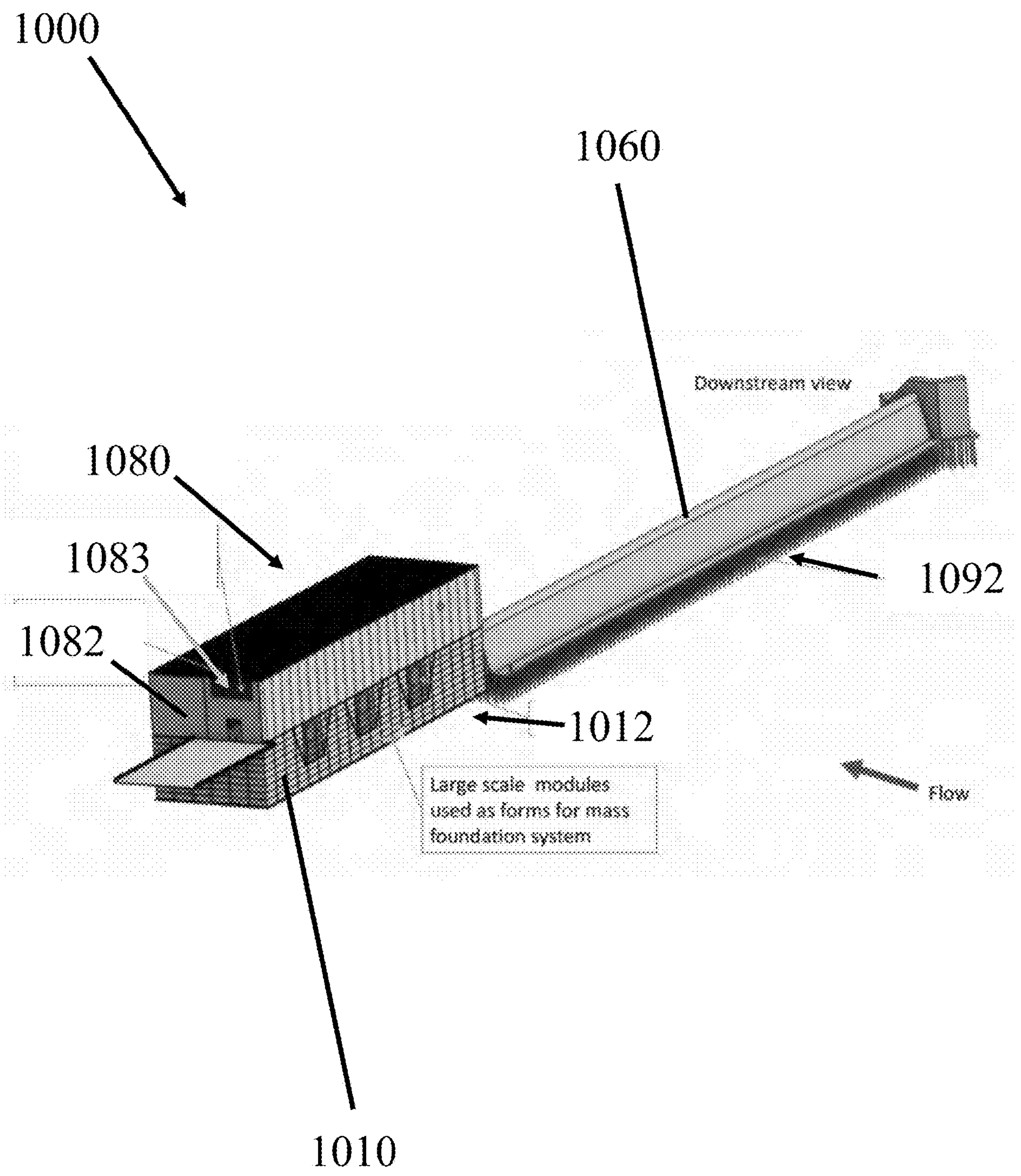
FIG. 10 is a perspective view of an example embodiment of a power generation system comprising a dam and a horizontal powerhouse.

FIG. 10 is a perspective view of an example embodiment of a power generation system 1000 comprising a dam 1060 and a horizontal powerhouse 1010. In this embodiment, the powerhouse 1010 comprises a superstructure 1080. In this embodiment, the superstructure comprises an enclosure 1082. In this embodiment the enclosure 1082 defines a port 1083. The embodiment shown in FIG. 10 comprises three intake ports 1012. Alternative embodiments may comprise a different number of intake ports.

In the embodiment shown in FIG. 10 the dam 1060 is coupled to rock bolts to secure it to natural material.

Figure 11:
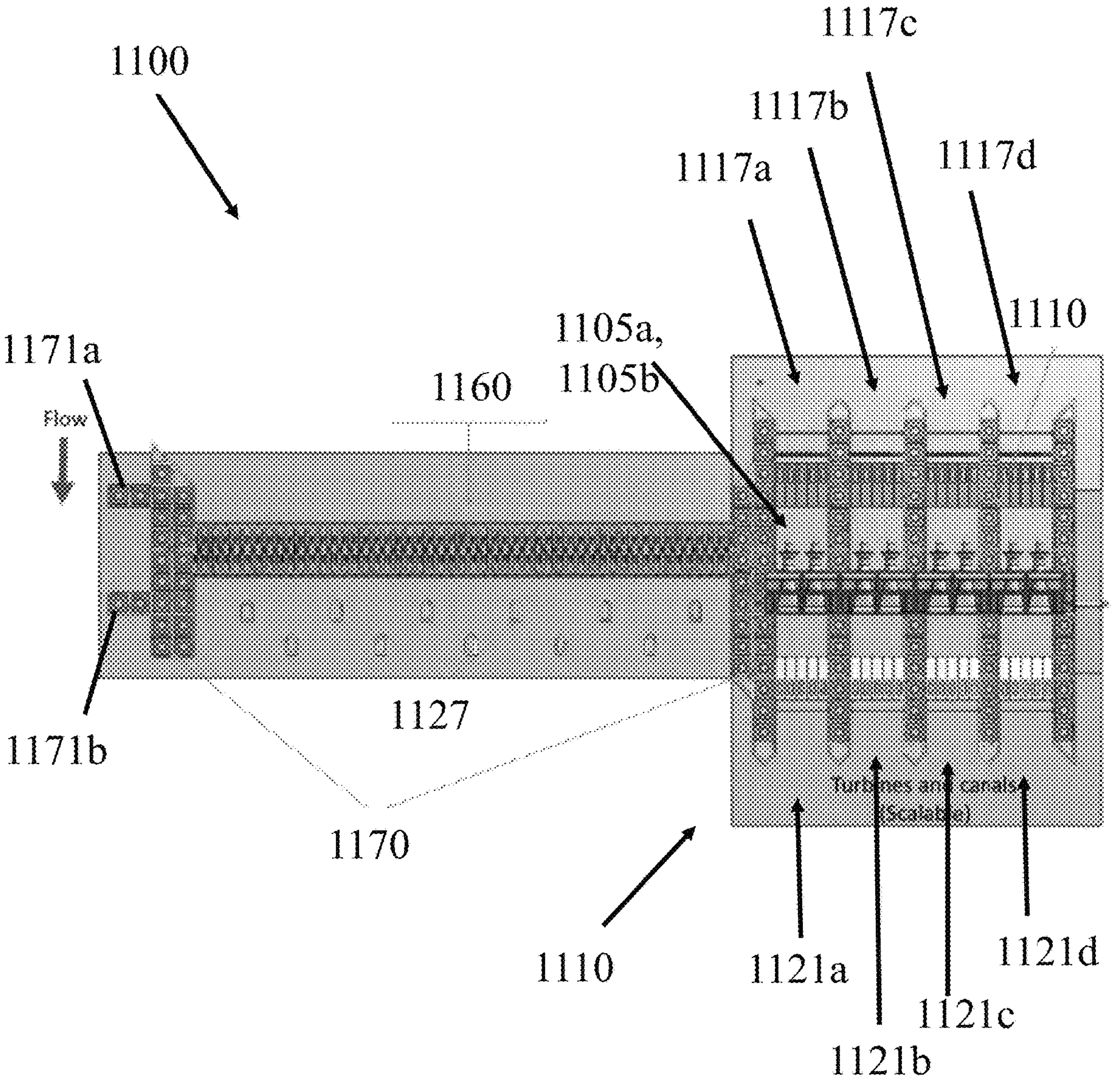
FIG. 11 is a top view of an example embodiment of a power generation system.

FIG. 11 is a top view of an example embodiment of a power generation system 1100. In this embodiment, the power generation system 1100 comprises a dam 1160 and a powerhouse 1110. Multiple diffusers 1127 are located at the downstream side of the dam 1160. In the embodiment shown in FIG. 11 the power generation system 1100 comprises two abutment walls 1170—one on each side of the dam 1160. In the embodiment shown in FIG. 11, the power generation system 1100 comprises two support abutment walls 1171*a*, 1171*b*. In alternative embodiments, the power generation system 1100 may comprise a different number and/or arrangement of support abutment walls.

In the embodiment shown in FIG. 11, the powerhouse 1110 comprises four intake bays 1117*a*-1117*d* and four output bays 1121*a*-1121*d*. In alternative embodiments, the powerhouse 1110 may comprise a different number of intake and/or output bays.

In some embodiments, such as the embodiment shown in FIG. 11, each intake bay corresponds to two power generators 1105 (two power generators 1005*a*, 1005*b* are labeled in FIG. 11). In alternative embodiments, a different number of power generators may be aligned with each intake bay and/or each input port.

In some embodiments, such as the embodiment shown in FIG. 11, each output bay corresponds to two power generators 1105 (two power generators 1105*a*, 1105*b* are labeled in FIG. 11). In alternative embodiments, a different number of power generators may be aligned with each output bay and/or each output port.

In some embodiments, the power generator comprises at least one turbine. Turbines may be arranged vertically or horizontally within the dam or associated powerhouse. The turbines may be encapsulated within precast segments to form a turbine assembly and positioned and oriented within the corresponding structure housing same in a manner that enables maintenance or interchangeability. Above the structure housing the turbine assembly may be a superstructure. The turbine assemblies may be located beneath a part of the superstructure that has a crane assembly in order to perform maintenance of features of the structure, maintenance of a turbine or turbine assembly, or exchange a turbine.

The dam or powerhouse may also include penstocks (large tubes or flow paths) that feed fluid to the turbines in a manner that enables efficient conversion of fluid flow to electrical power through use of the turbines. The penstocks may be supported by large numbers of precast segments, which may be constructed through use of precast forms and poured cement or other slurry filler, in order to support weight of penstocks with water flowing therein during operation. Because the precast segments may be various sizes, shapes, and thicknesses, the penstocks may be held in stable positions, optionally with additional layers of supporting materials, such as rubber or composites between the penstocks and the precast segments.

Figure 12:
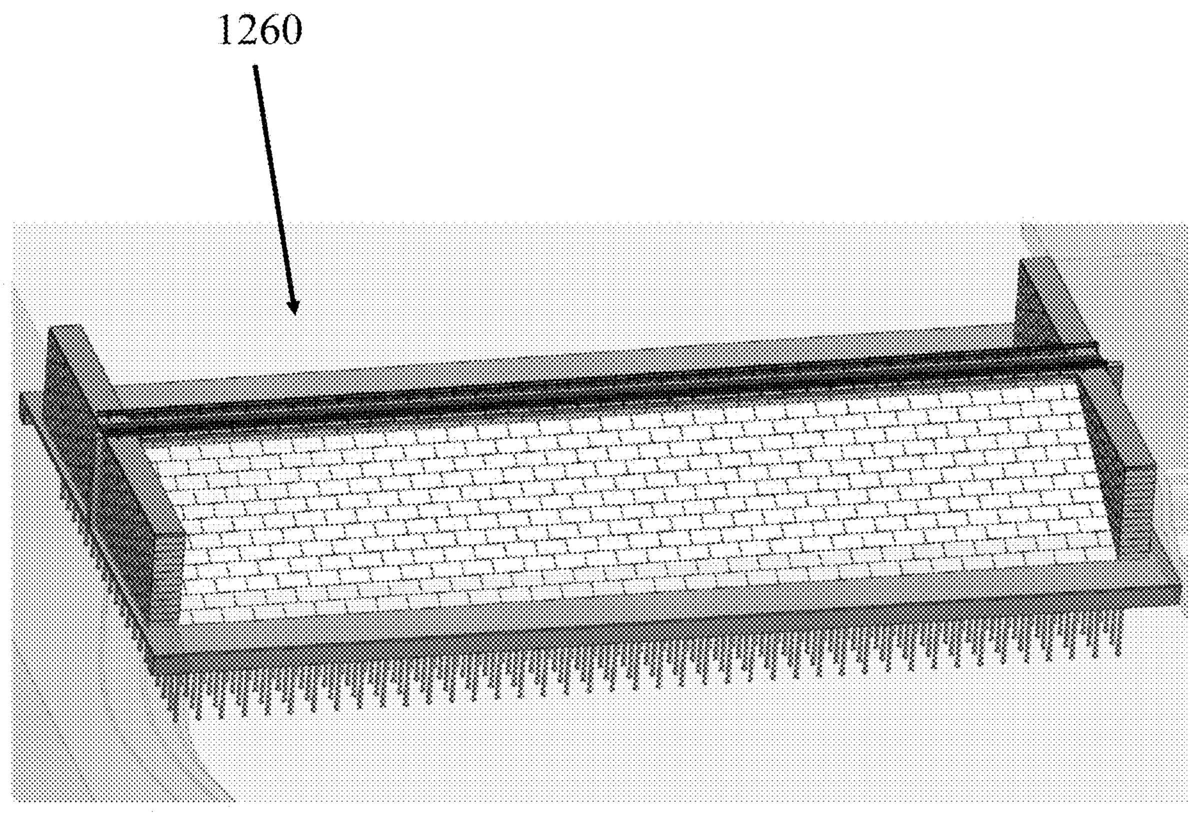
FIG. 12 shows a perspective view of an example embodiment of a dam comprising precast segments.

FIG. 12 shows a perspective view of an example embodiment of a dam 1260 comprising precast segments.

Figure 13:
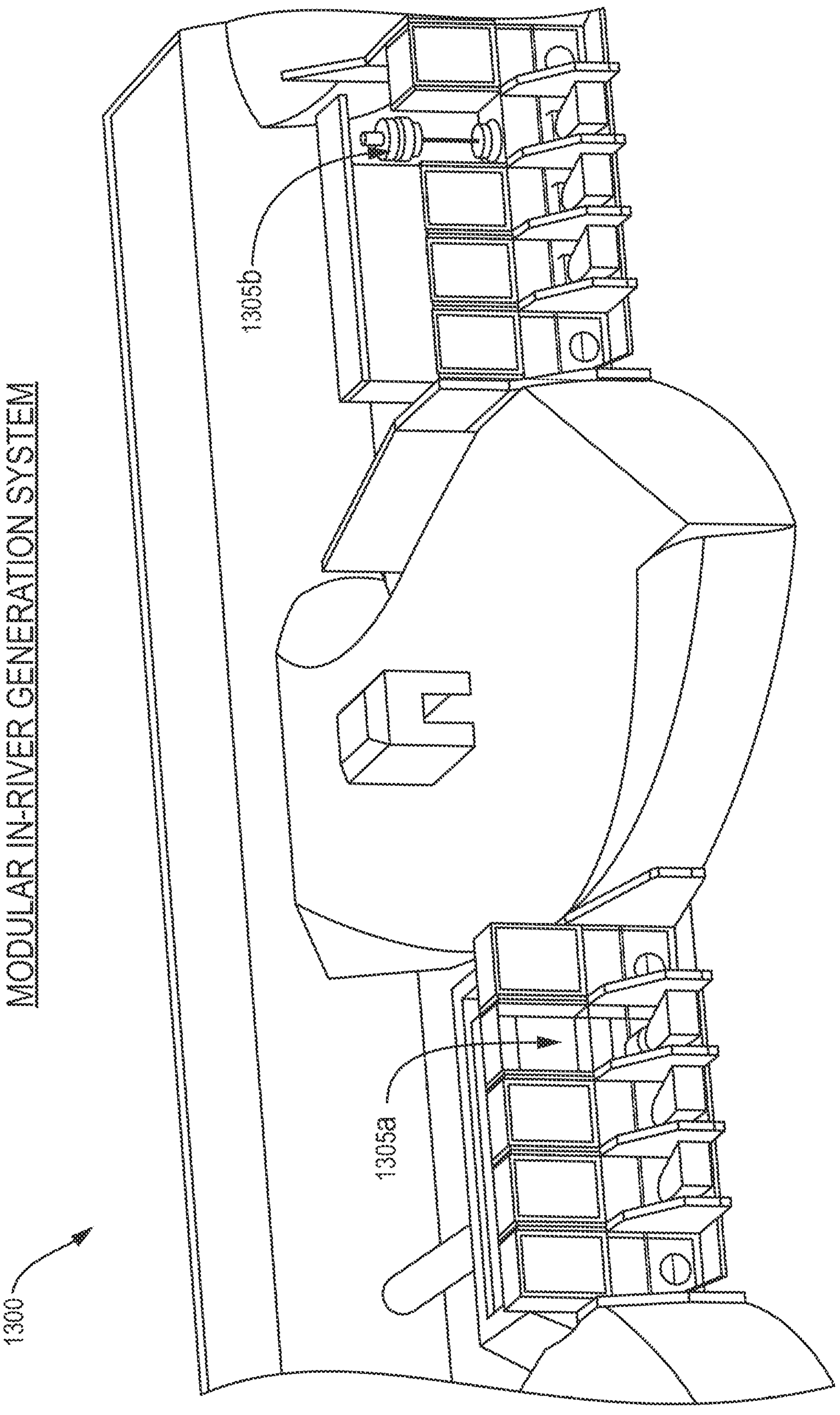
FIG. 13 shows a perspective view of an example embodiment of a power generation system that comprises a horizontal power generator and a vertical power generator.

FIG. 13 shows a perspective view of an example embodiment of a power generation system 1100 that comprises a horizontal power generator 1305*a* and a vertical power generator 1305*b*.

Figure 14:
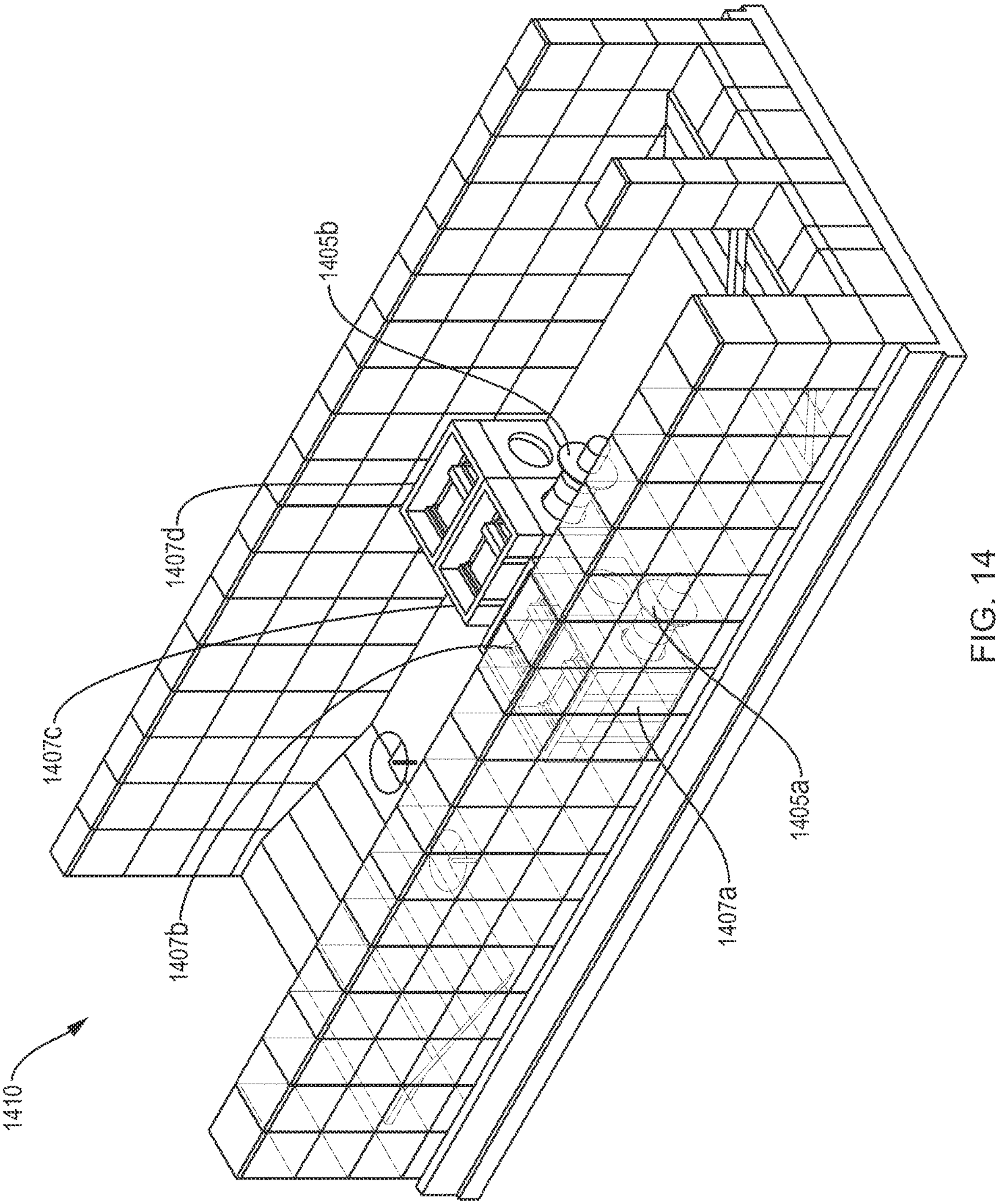
FIG. 14 shows a perspective sectional view of a portion of an example embodiment of a powerhouse.

FIG. 14 shows a perspective sectional view of a portion of an example embodiment of a powerhouse 1410. In the embodiment shown in FIG. 14, the powerhouse 1410 comprises four power generator support structures 1407*a*-1407*d*. In this embodiment, two power generators 1405*a*, 1405*b* are shown. In some example embodiments, a wall (not shown) may be positioned between one or more of the power generator support structures. In some example embodiments, a wall (not shown) may be positioned between one or more of the power generators.

Figure 15:
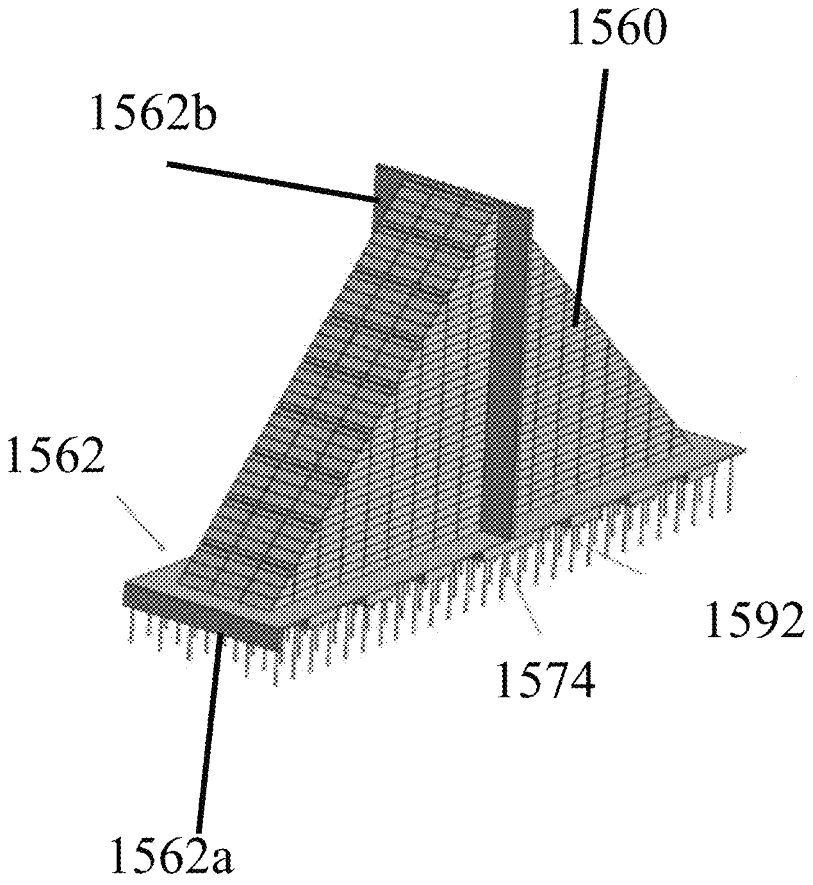
FIG. 15 shows a perspective view of an example embodiment of a dam.

FIG. 15 shows a perspective view of an example embodiment of a dam 1560. In some embodiments, such as the one shown in FIG. 15 the dam 1560 is composed of one or more precast segments. The dam 1560 may be coupled with a working platform 1562. In the embodiment shown in FIG. 15 the dam 1560 is coupled to two cutoff walls 1563*a*, 1563*b*. In alternative embodiments, the dam 1560 may be coupled to a different number of cutoff walls 1563.

In the embodiment shown in FIG. 13, the dam 1560 is coupled to a first cutoff wall 1562*a* that is oriented vertically under a lower portion of a dam 1560. In some embodiments, such as the embodiment shown in FIG. 15, the first cutoff wall 1562*a* may comprise a portion that extends vertically from an end of the working platform 1562.

In some embodiments, such as the embodiment shown in FIG. 15, the dam 1560 is coupled to a second cutoff wall 1562*b* that is oriented vertically relative to the working platform 1562.

The power generation system may comprise one or more cleats coupled to a lower surface of the dam and/or powerhouse. In some embodiments, such as the one shown in FIG. 15, one or more cleats 1574 are indirectly coupled to a lower surface of the dam 1560. In this embodiment, the one or more cleats 1574 are directly coupled to the working platform 1562. In alternative embodiments, the one or more cleats 1574 may be directly coupled to a lower surface of the dam. Different cleats may have different dimensions and/or material characteristics. In some embodiments, such as the embodiment shown in FIG. 15, the dam 1560 may be coupled to one or more rock bolts 1592.

In constructing an assembly of precast segments for use in constructing a dam or powerhouse, the assembly may provide for ground stabilizing, such as by forming a shape of a cleating system 1574 between the assembly and the ground in order to have additional stability beyond the dead weight of the assembly. The cleating system 1574, for example, may have alternating extending and non-extending precast segments on a footprint of the dam to have extended depth in certain locations of the footprint versus other locations of the footprint. Underpinning systems, rock bolts 1592 and other construction elements may also be employed.

The assembly of precast segments may also include seismic construction elements, such as the cleats described above, insulators between precast segments or various subassemblies of precast segments, seismic relief features, water stops between precast segments, other features encapsulated by precast segments, or any additional water stops in order to maintain structural integrity over extended periods of time, such as 50, 100, or a greater number of years.

Figure 16:
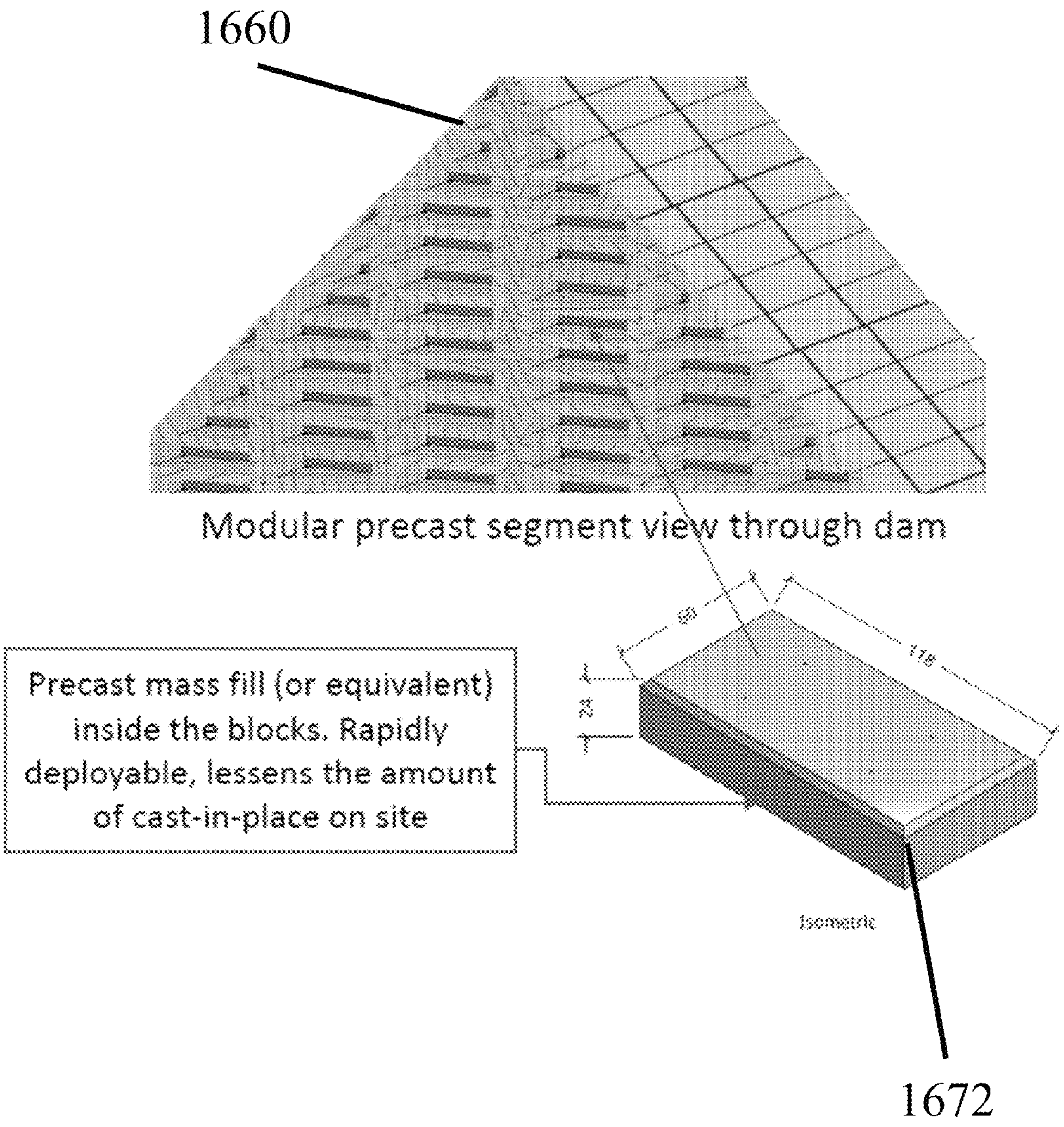
FIG. 16 is a perspective view of an example embodiment of a dam with multiple slots for precast mass fills. In alternative embodiments, the dam may have a different number of slots.

FIG. 16 is a perspective view of an example embodiment of a dam 1660 with multiple slots for precast mass fills. In alternative embodiments, the dam may have a different number of slots.

In the example embodiment shown in FIG. 16, the precast infill block 1672 is defined by a rectangular shape. In alternative embodiments, one or more of the precast infill blocks may be defined by a different shape. The dimensions shown in FIG. 16 are example dimensions. In alternative embodiments, the dimensions of the precast infill block and/or the slots may be different.

Figures 17A, 17B:
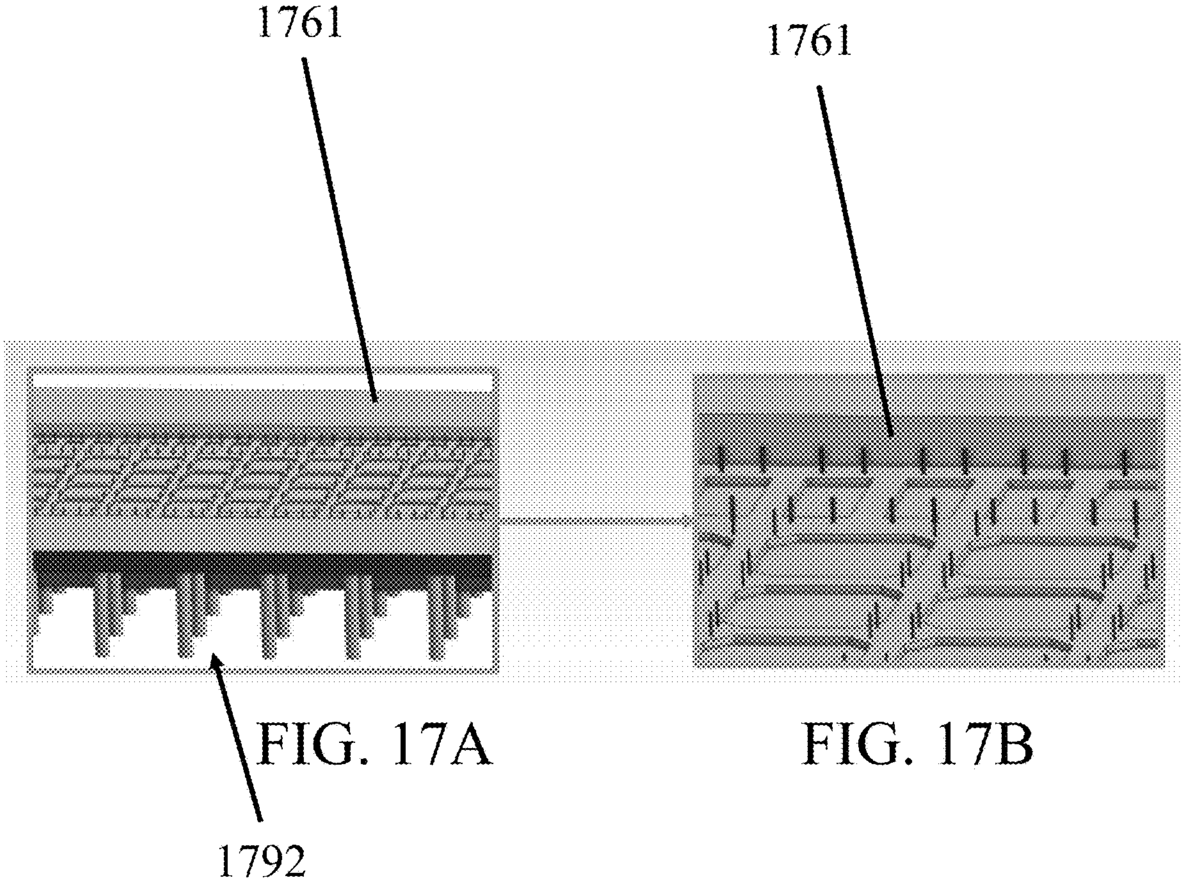
FIG. 17A shows a perspective of an example embodiment of a working platform coupled to rock anchors.
FIG. 17B shows a close-up view of the working platform of FIG. 17A.

FIG. 17A shows a perspective of an example embodiment of a working platform 1761 coupled to rock anchors 1492.

FIG. 17B shows a close-up view of the working platform 1761 of FIG. 17A. In some embodiments, such we the one shown in FIG. 17B, the working platform 1761 comprises pleats and/or grooves configured to couple with segments of a dam/or powerhouse. In alternative embodiments the working platform may not comprise grooves.

In some embodiments, such we the one shown in FIG. 17B, the working platform 1761 is coupled to connectors (for example, bolts) to couple with segments of a dam. In alternative embodiments, the working platform may not be coupled to connectors.

Figure 18A:
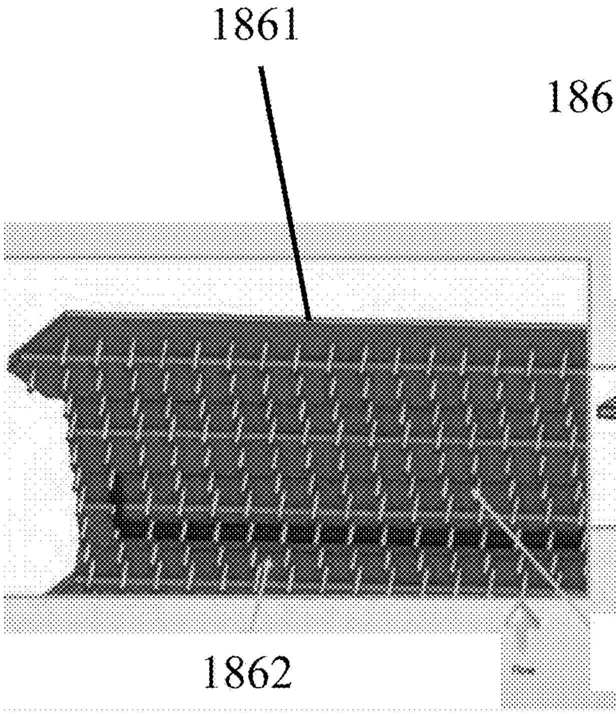
FIG. 18A shows a perspective view of an example embodiment of a working platform coupled to multiple rock anchors.

FIG. 18A shows a perspective view of an example embodiment of a working platform 1861 coupled to multiple rock anchors 1892. In the example embodiment shown in FIG. 18A a cutoff wall 1862 is coupled to a lower surface of the working platform 1861.

Figure 18B:
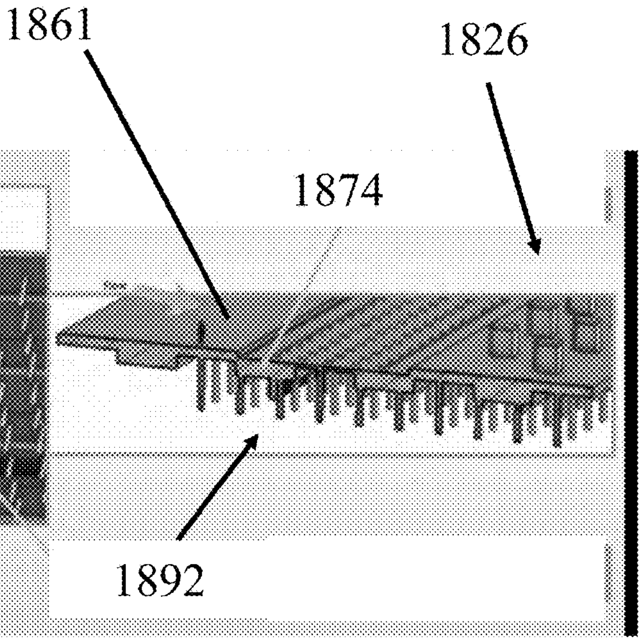
FIG. 18B shows a perspective view of an example embodiment of a working platform coupled to multiple cleats, rock anchors, and diffusers.

FIG. 18B shows a perspective view of a working platform coupled to multiple cleats 1874, rock anchors 1892, and diffusers 1826. In the example embodiment shown in FIG. 18B the diffusers being coupled to a downstream side of the working platform 1861. In alternative embodiments, the working platform may be coupled to diffusers at the upstream side of the working platform. In alternative embodiments, the working platform may not be coupled to cleats. In alternative embodiments, the working platform may not be coupled to rock anchors. In alternative embodiments, the working platform may not be coupled to diffusers.

Figure 19A:
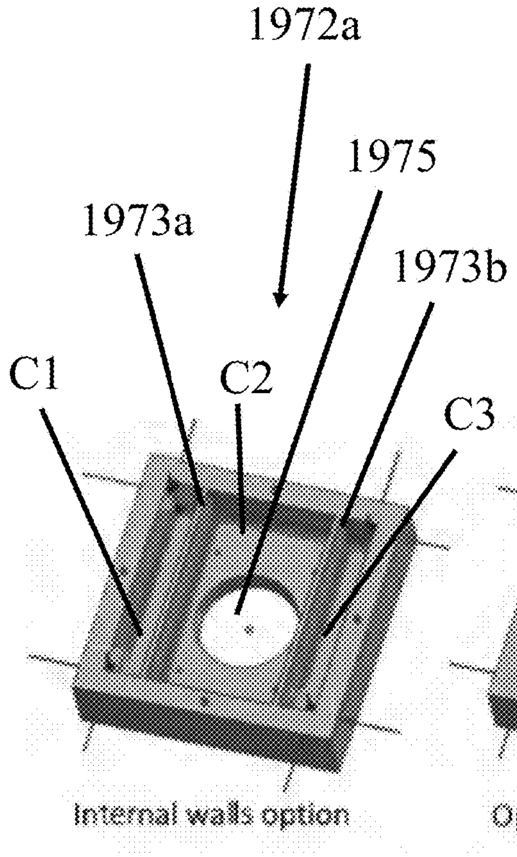
FIG. 19A shows a perspective view of an example embodiment of a square precast segment comprising dividers.

FIG. 19A shows a perspective view of an example embodiment of a square precast segment 1972 comprising dividers 1973*a*, 1973*b*. In some embodiments, such as the one shown in FIG. 19A the precast segment is defined by a form configured to be filled with filler. In some embodiments, such as the one shown in FIG. 19A the form includes two dividers 1973*a* and 1973*b* arranged at different sides of the form. In alternative embodiments, the form may comprise a different number of dividers. In alternative embodiments, the forms may be arranged differently. In alternative embodiments, the forms may not comprise dividers.

In some embodiments, such as the embodiment shown in FIG. 19A, the precast form 1972 may include a port through a surface of the precast form that enables filler to flow from a given layer to a lower adjacent layer in a vertical direction. In some embodiments, the precast form does not comprise a port.

An example of a precast form is a precast cement form of any size defined in a rectangular or other geometric shape. Features, such as a bottom, side, or top, may define port(s) through which filler, such as cement, may flow. Some embodiments of the precast form define an opening instead of a top or have a top that defines at least one port at a top surface. The precast forms are individually lightweight; however, when coupled together in lateral and vertical arrangements, serve as deadweight for use as a base for the dam, powerhouse, or any other structure.

In the process of constructing a wall or other aspect of a precast dam structure, the precast forms with may be filled with various materials, such as cement, grout, stones, materials to be removed from the environment, and the like. The materials will be sealed within an assembly of precast segments. Ports in the surfaces of the precast forms enable cement and other filler to flow between adjacent forms.

A typical process of constructing a wall or other shape through use of precast forms is typically done by filling a layer of precast forms with, for example, cement, or by filling compartments of the precast forms, where compartments are separated by dividers. By using a technique of precast forms with or without compartments, curing times of filler material (e.g., cement) are significantly reduced relative to cast in place cement dam structures.

Moreover, the precast forms may be various sizes, shapes, thicknesses for unique assembled dam shapes and sizes for aspects of the dam. It should be understood that descriptions herein of various shapes and sizes of the dam also pertain to a powerhouse that is constructed of precast segments, which may start as precast forms that are interconnected together as disclosed herein.

In some embodiments, such as the one shown in FIG. 19A a precast form defines different compartments, each compartment being separated by one or more internal walls (also referred to as dividers). The embodiment shown in FIG. 19A defines three compartments C1, C2, C3. In alternative embodiments, the precast form may define a different number of compartments. In the embodiment shown in FIG. 19A, a first compartment C1 includes about the same volume as a third compartment C3. A second compartment C2 includes substantially more volume than the first compartment C1 or third compartment C3. In alternative embodiments all of the compartments may include about the same volume. In alternative embodiments, the compartments each include a different volume.

Figure 19B:
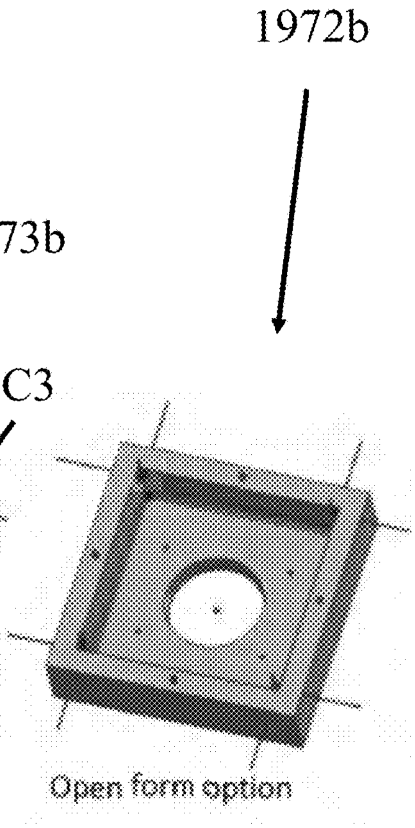
FIG. 19B shows a perspective view of an example embodiment of a square precast segment defined by a form without internal walls.

FIG. 19B shows a perspective view of an example embodiment of a square precast segment 1972*b* defined by a form without internal walls.

Figure 19C:
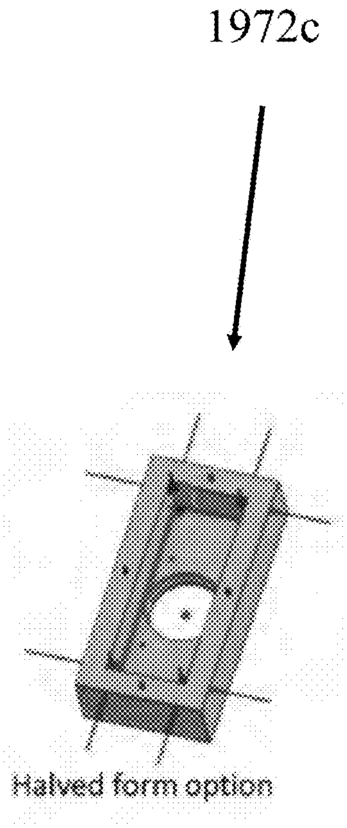
FIG. 19C shows a perspective view of an example embodiment of a rectangular precast segment defined by a form without internal walls.

FIG. 19C shows a perspective view of an example embodiment of a rectangular precast segment 1972*b* defined by a form without internal walls.

Figure 20A:
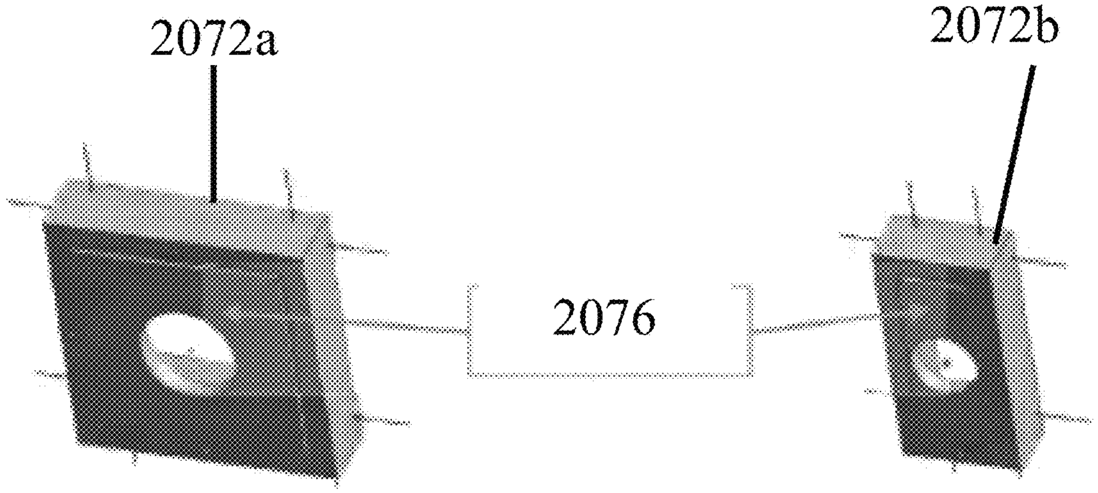
FIG. 20A shows example embodiments of two different precast segments that each define a keyway. Each precast segment shown in FIG. 20A also includes dowels configured to couple with neighboring precast segments or other materials.

FIG. 20A shows example embodiments of two different precast segments 2072*a*, 2072*b* that each define a keyway 2076. Each precast segment shown in FIG. 20A also includes dowels configured to couple with neighboring precast segments or other materials.

Figure 20B:
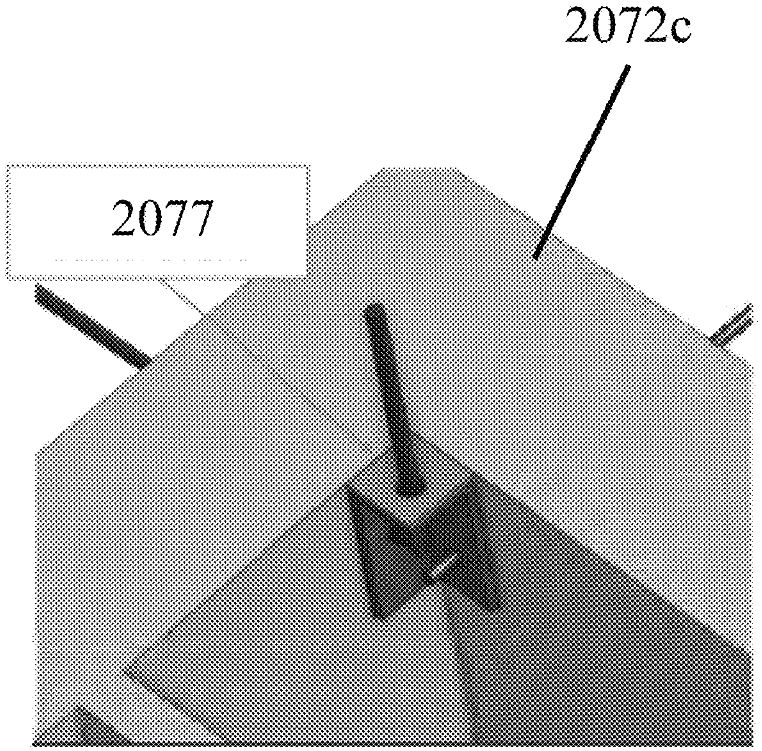
FIG. 20B shows an example embodiment of a precast segment that includes a snubber.

FIG. 20B shows an example embodiment of a precast segment 2072*c* that includes a snubber 2077.

Figure 21:
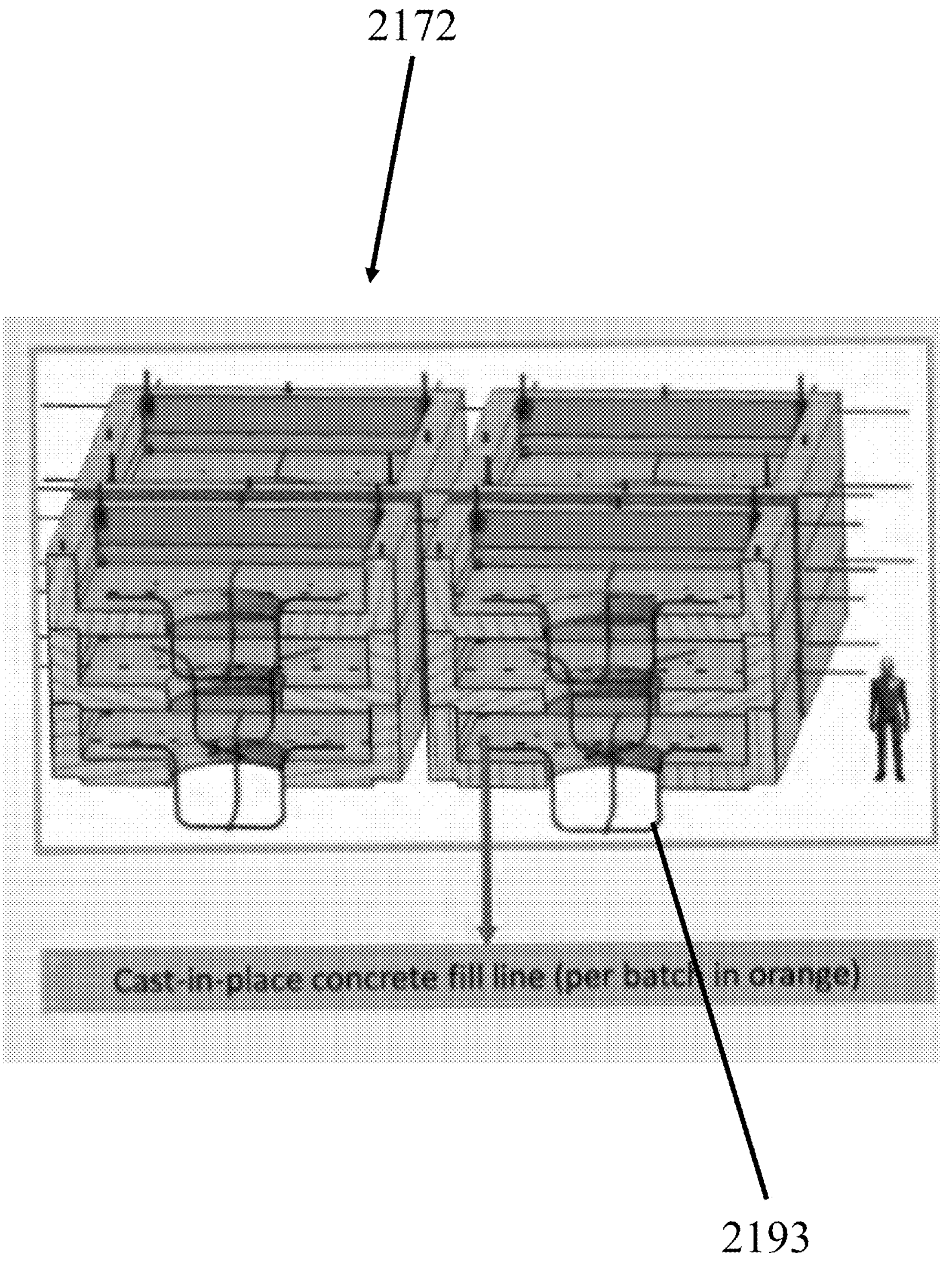
FIG. 21 is a sectional perspective view of an example embodiment of precast segments stacked and coupled together using a coupling mechanism.

FIG. 21 is a sectional perspective view of an example embodiment of precast segments 2172 stacked and coupled together using a coupling mechanism 2193. Described herein are advanced interlocking techniques for use with precast segments, optionally constructed of precast forms that are filled with materials, such as cement. For example, there may be unique keyways applied, shear and tension resisting linkages that interconnect adjacent precast segments during a process of filling layers of precast segments adjacent to other precast segments, wherein the shear and tension resisting linkages may pass between ports at the time of filling precast forms. As the precast forms are filled, the ports enable additional cement or other slurry-type fillers to flow from one precast form to an adjacent precast form to fill any air gaps that may have formed during a cooling process of the previously poured filler material, slurry, cement, or otherwise. Through this process, the form produced by the precast segments is increased in strength and also increased in dead weight.

Between adjacent precast segments, materials such as grout, rubber, and other materials known in the art may be used to fill gaps between adjacent precast segments and, depending on the material used, to make watertight seals between adjacent precast segments.

In some embodiments, such as the embodiment shown in FIG. 21 one or more precast segments 2172 may be coupled together using a coupling mechanism 2193. In this embodiment, precast segments are stacked, and a coupling mechanism extends through the port of a first precast segment to a lower precast segment. Filler may be applied to the precast segments and such filler may secure the coupling mechanism in place, thereby securing two precast segments to each other. Coupling mechanisms also couple one stack of precast segments to a neighboring stack of precast segments. In some embodiments, the coupling mechanism may comprise rebar or any such suitable material.

Figure 22A:
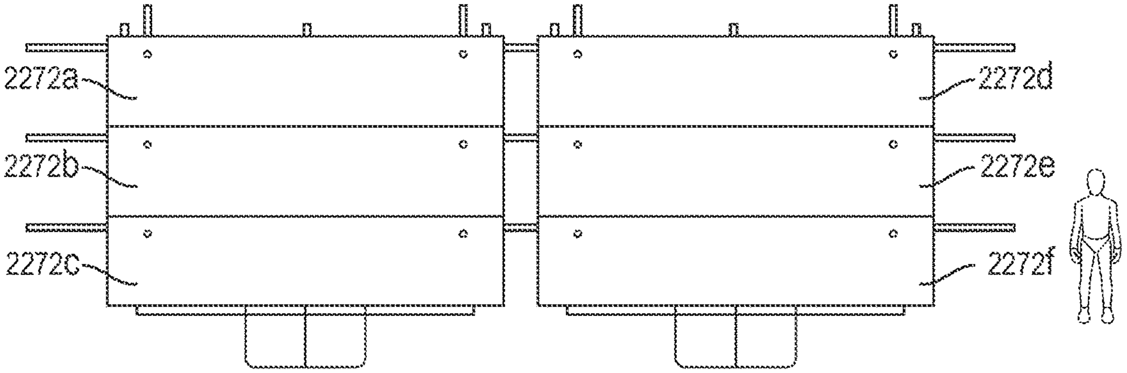
FIG. 22A is a side view of an example embodiment of two stacks of precast segments coupled together.

FIG. 22A is a side view of an example embodiment of two stacks of precast segments coupled together. In this embodiment a first stack includes three precast segments 2272*a*-2272*c* and a second stack includes three precast segments 2272*d*-2272*f*. In alternative embodiments, more than two stacks of precast segments may be couped together. One or more of the stacks may be coupled to a structure rather than another stack of precast segments.

Figure 22B:
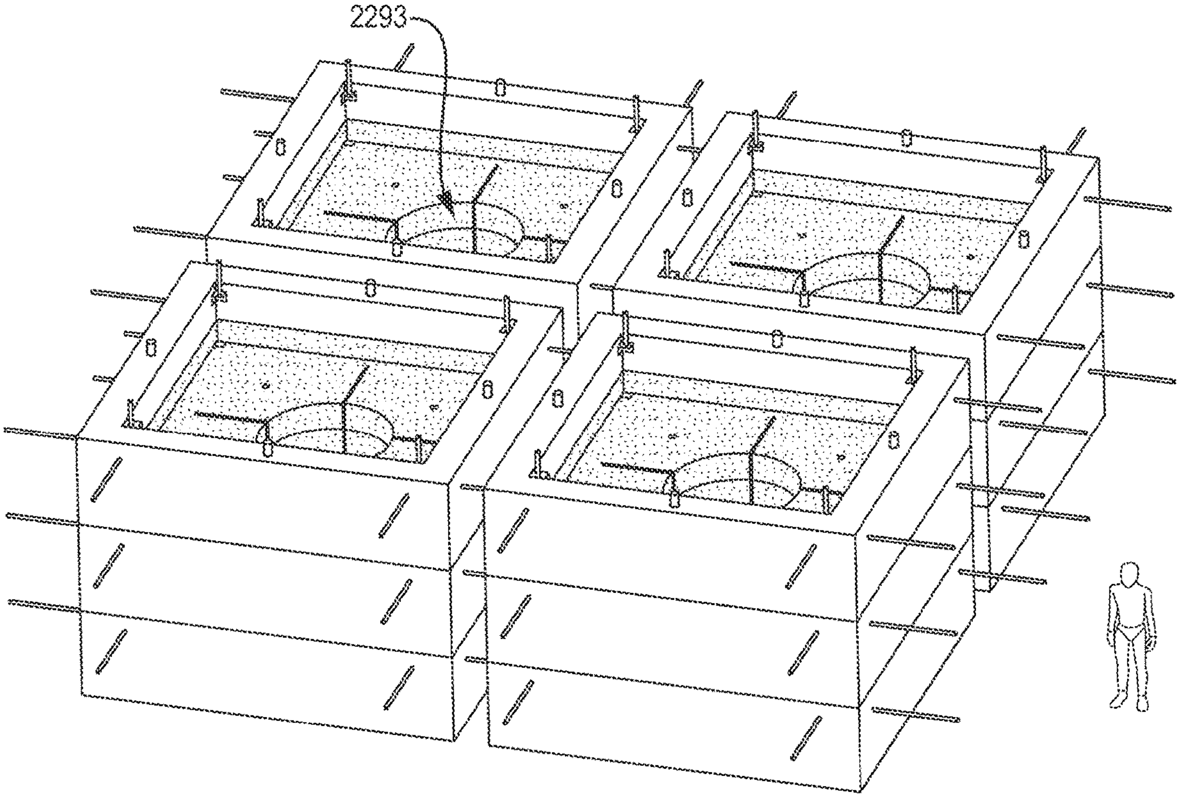
FIG. 22B is a perspective view of an example embodiment of four stacks of precast segments coupled together with a coupling mechanism.

FIG. 22B is a perspective view of an example embodiment of four stacks of precast segments coupled together with a coupling mechanism 2293.

Figure 23:
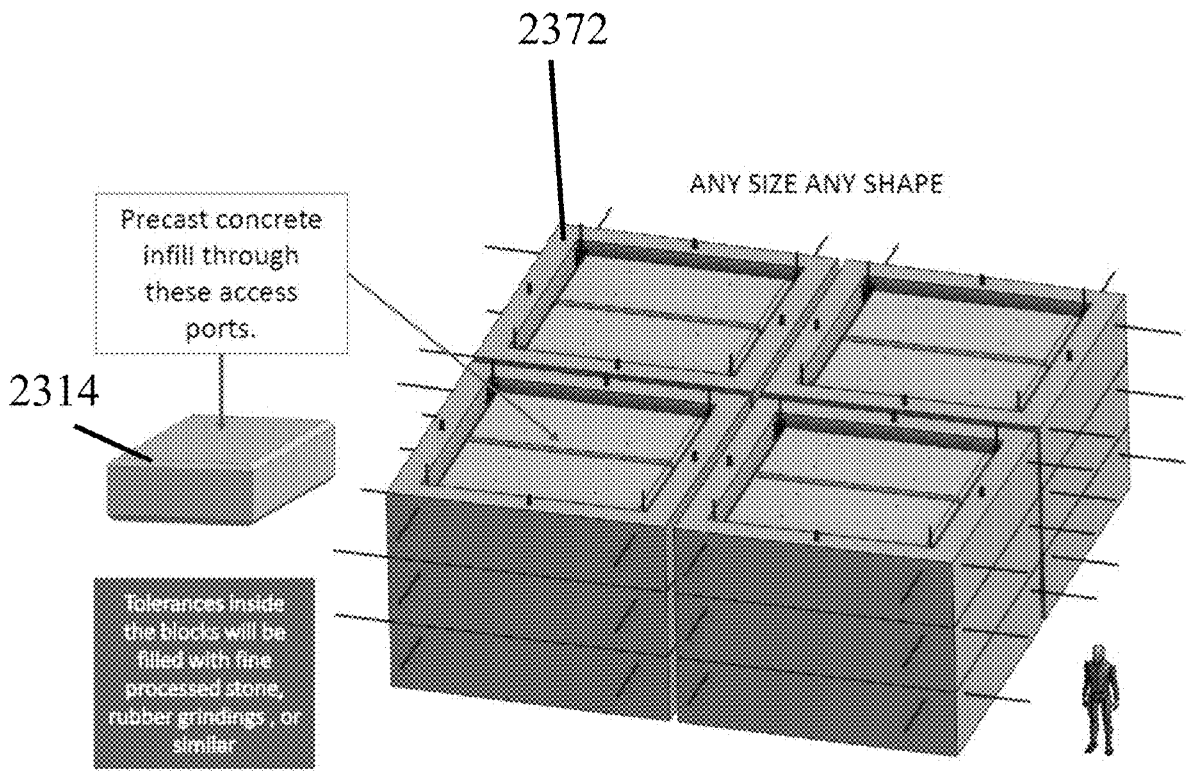
FIG. 23 shows an example embodiment of four stacks of modular blocks filled with precast concrete infill blocks.

FIG. 23 shows an example embodiment of four stacks of modular blocks 2372 filled with precast concrete infill blocks 2314. In some example embodiments a precast segment includes a precast form and at least one precast infill block 2314. The precast form may be sized and shaped to accept one or more precast infill blocks 2314. In some example embodiments, the tolerances (i.e., spaces) inside modular blocks 2372 may be filled with fine processed stone, rubber grindings, or any such similar or suitable material, for example other materials described herein.

In the example embodiment shown in FIG. 23, precast infill blocks 2314 are defined by a rectangular shape. In alternative embodiments, one or more of the precast infill blocks may be defined by a different shape.

In the example embodiment shown in FIG. 23, two precast infill blocks 2314 are positioned in a modular block 2372. In alternative embodiments, a different number of precast infill blocks may be positioned in a modular block 2372.

In the example embodiment shown in FIG. 23, for each modular block 2372, two precast infill blocks 1214 are oriented next to each other. Alternatively or additionally, in some example embodiments precast infill blocks 1214 may be stacked on each other.

In some example embodiments, one or more of the precast infill blocks are fixedly coupled to a precast segment. In alternative embodiments, one or more of the precast infill blocks may not be fixedly coupled to a precast segment.

Figures 24A, 24B, 24C:
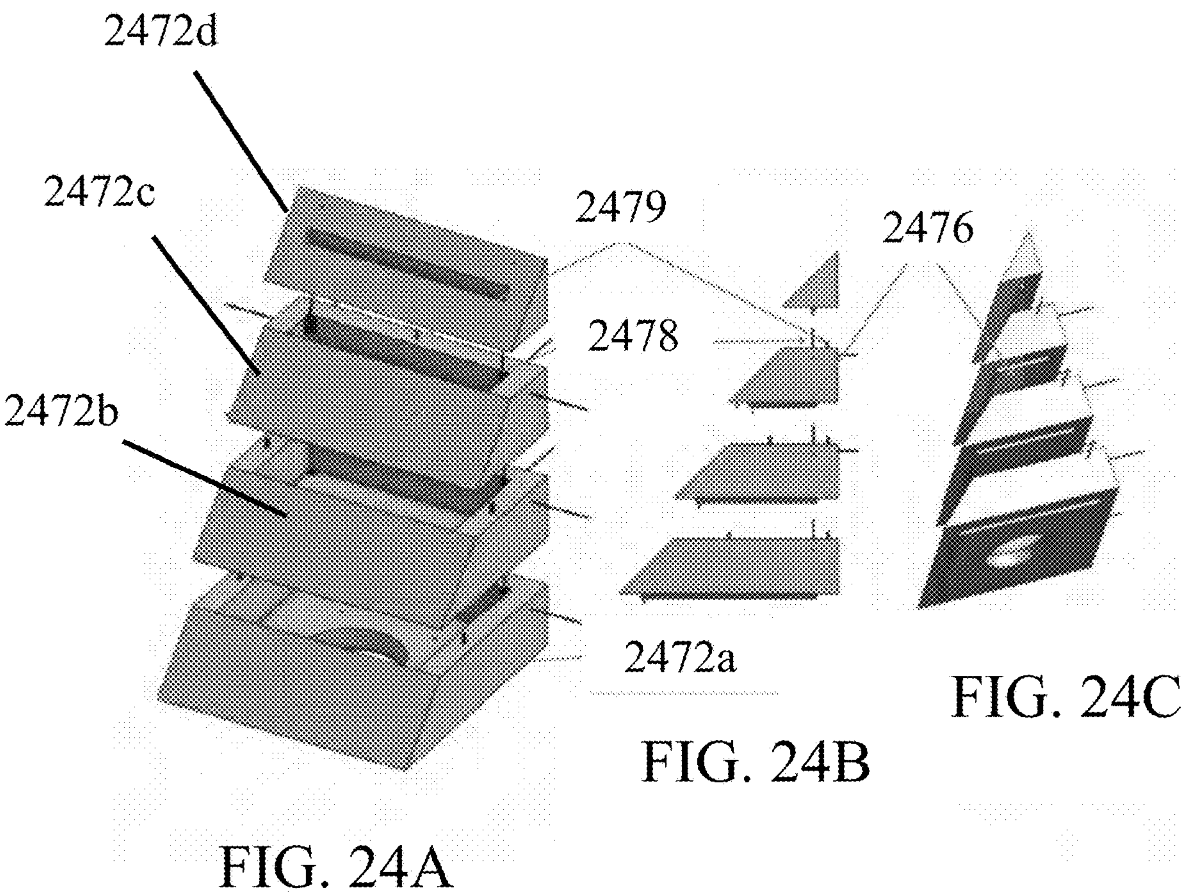
FIG. 24A shows a perspective view of example embodiments of angled precast segments.
FIG. 24B shows a side view of the example embodiments of angled precast segments of FIG. 24A.
FIG. 24C shows a side view of the example embodiments of angled precast segments of FIG. 24A.

FIG. 24A shows a perspective view of example embodiments of angled precast segments 2472*a*-2472*d*. The angled precast segments are defined by forms, similar to other precast segments described herein. In some embodiments, such as the one shown in FIG. 24A, the precast segments may be coupled via one or more linkages 2478. In some embodiments, such as the one shown in FIG. 24A, the precast segments may be coupled via one or more dowels 2479. In some embodiments, such as the one shown in FIG. 24A, the precast segments may be coupled via one or more keyways 2476.

FIG. 24B shows a side view of the example embodiments of angled precast segments of FIG. 24A.

FIG. 24C shows a side view of the example embodiments of angled precast segments of FIG. 24A.

Figure 25:
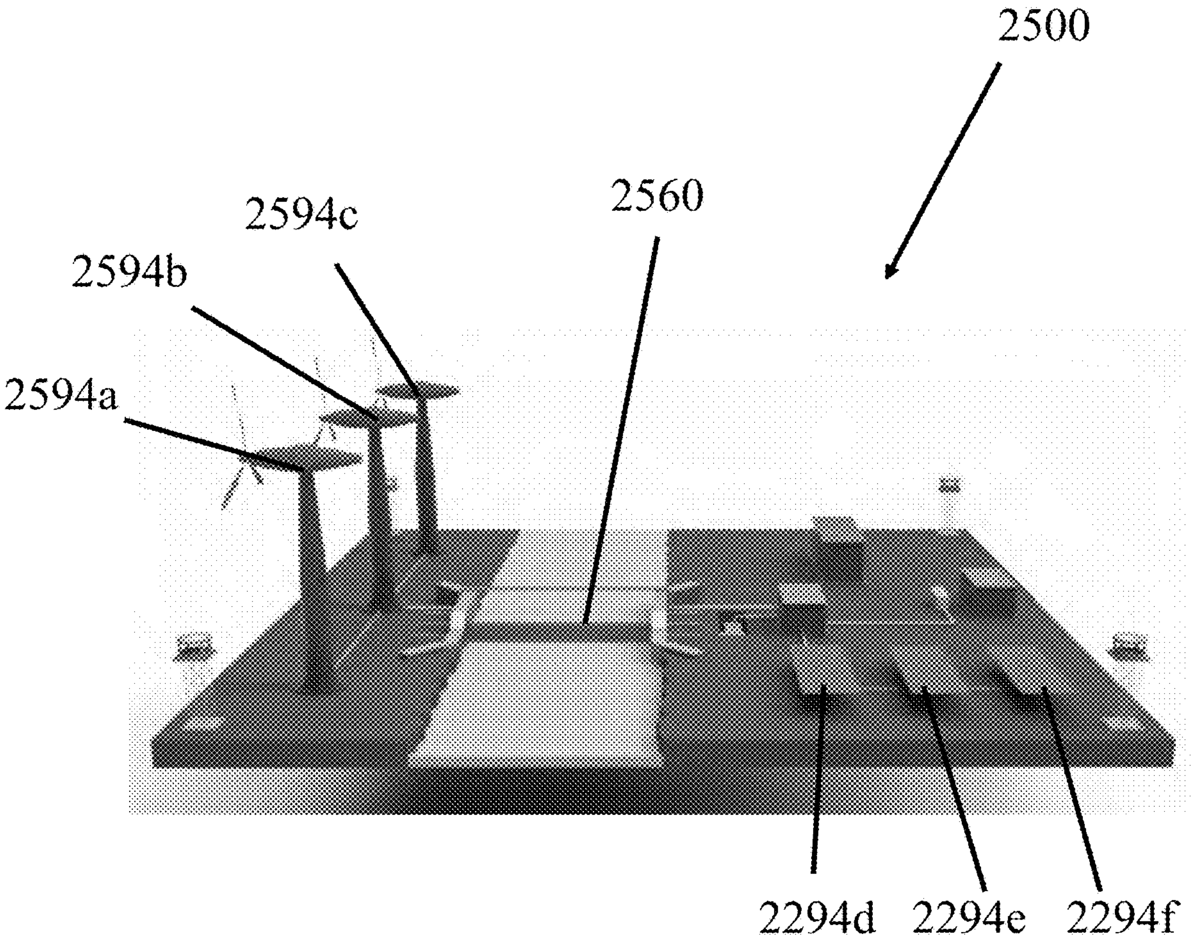
FIG. 25 is a perspective view of an example embodiment of a power generation system comprising a dam, a powerhouse (not shown), and auxiliary power systems.

FIG. 25 is a perspective view of an example embodiment of a power generation system 2500 comprising a dam 2560, a powerhouse (not shown), and auxiliary power systems 2594*a*-2594*f*. Auxiliary power systems, such as wind turbines, solar collectors, thermal systems, or gasoline or diesel-powered electrical generators may be employed to provide for power availability at a dam or powerhouse during times of auxiliary power support is of use. Similarly, energy storage systems may be co-located with the dam or powerhouse to store energy from the auxiliary power sources or to store power generated by turbines in the dam or powerhouse or portion of power that is otherwise transmitted offsite via a power grid, for example.

The embodiment shown in FIG. 25 includes multiple auxiliary power systems. In alternative embodiments there may be a different number of auxiliary power systems. In alternative embodiments, the power generation system may not include an auxiliary power system. The power generation system may comprise at least one energy storage system.

Figures 26A, 26B:
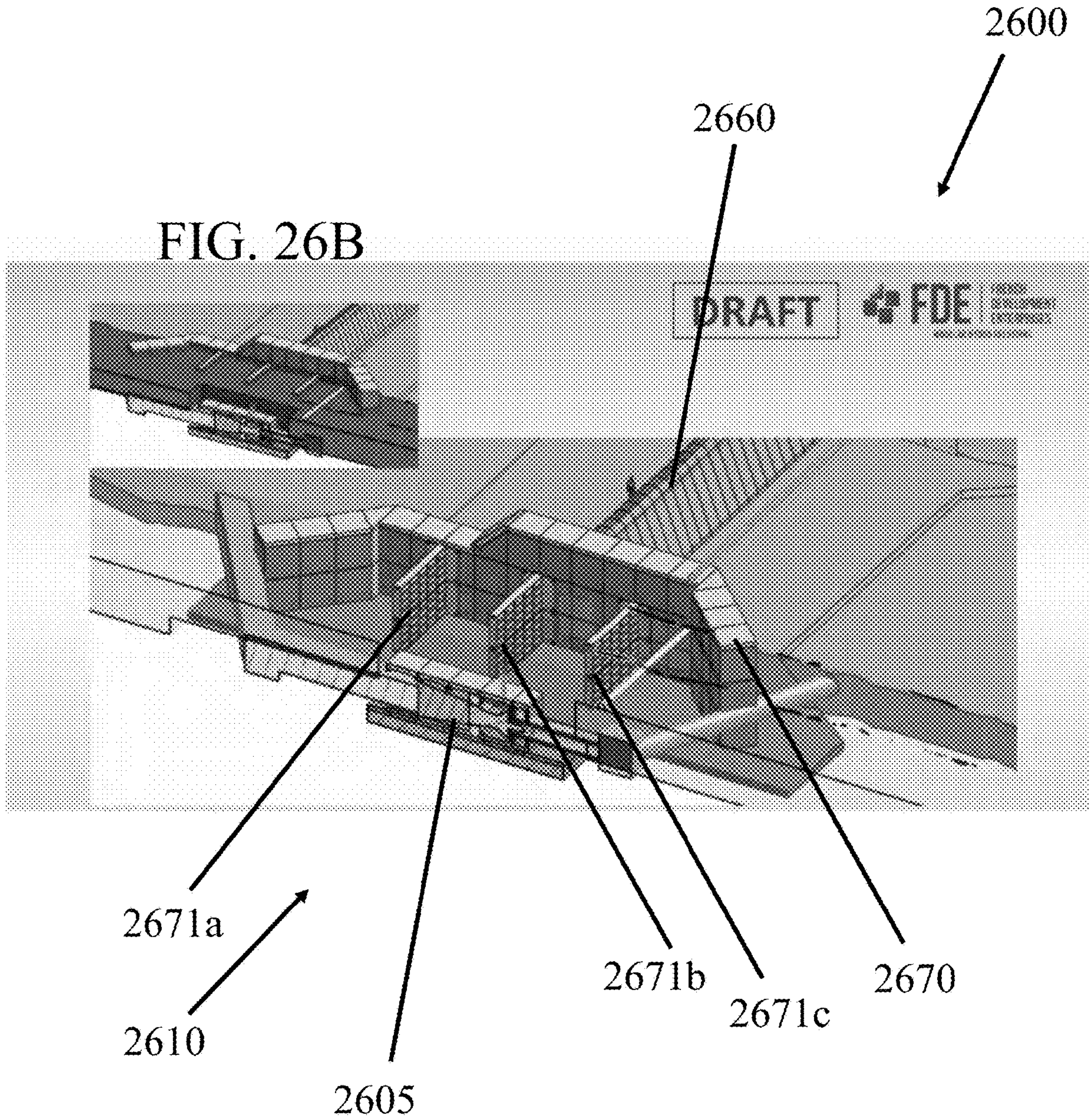
FIG. 26A is a perspective view of an example embodiment of a power generation system comprising a dam and a powerhouse.
FIG. 26B is a zoomed-out view of the example embodiment shown in FIG. 26A.

FIG. 26A is a perspective view of an example embodiment of a power generation system 2600 comprising a dam 2660 and a powerhouse 2610. In the embodiment shown in FIG. 26 the dam 2660 is coupled to an abutment wall 2670. In the embodiment shown in FIG. 26 the abutment wall 2670 is coupled to three support abutment walls 2671*a*-2671*c*. In some embodiments, such as the one shown in FIG. 26A, a portion of the fluid from the waterway is directed to a powerhouse 2610. The powerhouse 2610 comprises a power generator 2605 configured to convert the fluid flow into electrical power.

FIG. 26B is a zoomed-out view of the example embodiment shown in FIG. 26A.

Figure 27:
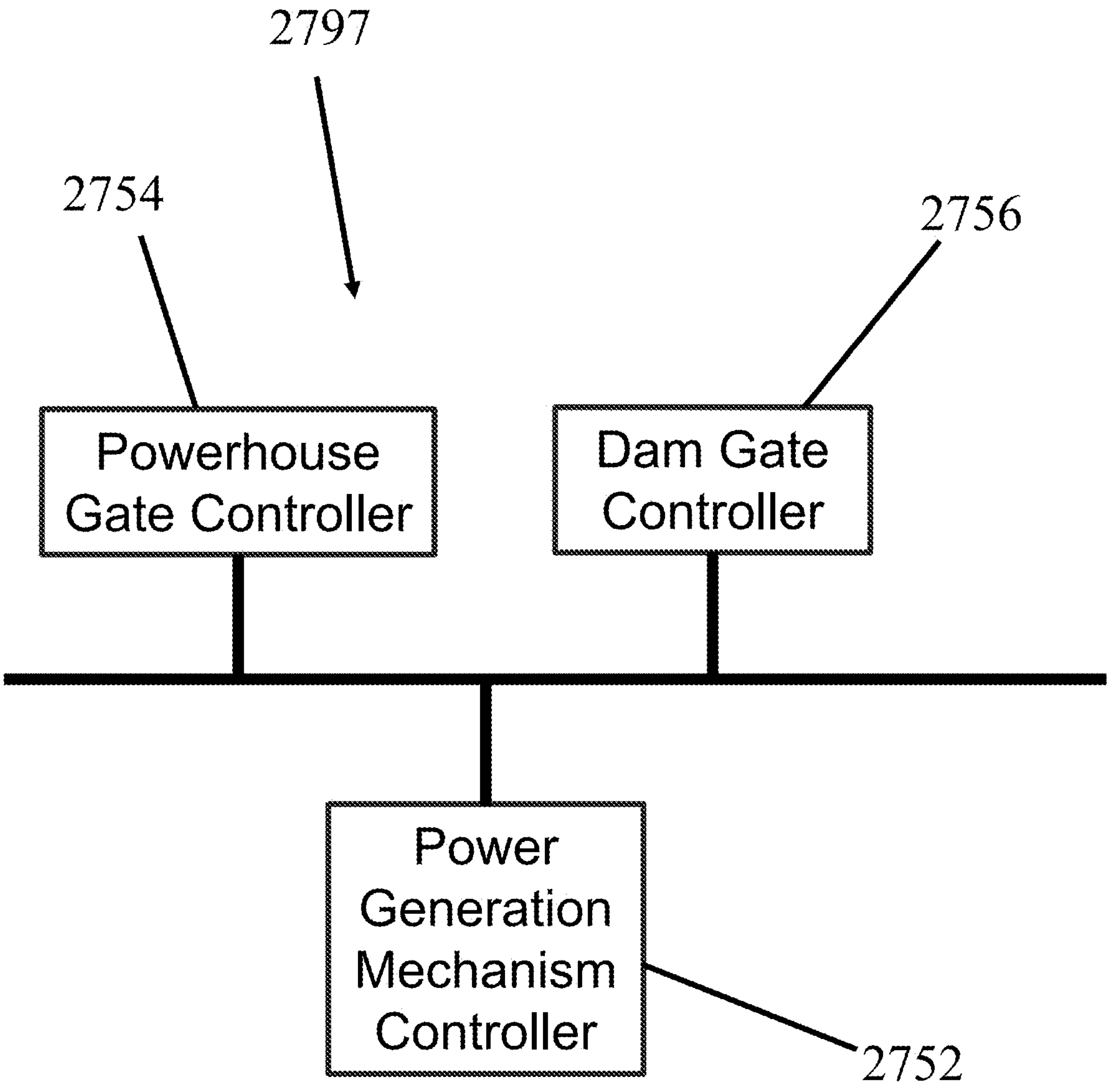
FIG. 27 shows an example embodiment a control system configured to coordinate activity between a dam and a powerhouse of a power generator.

FIG. 27 shows an example embodiment a control system 2797 configured to coordinate activity between a dam and a powerhouse of a power generator. In some embodiments, the control system includes a power generator controller 2752 in communication with a powerhouse gate controller 2754 and a dam gate controller 2756. The power generator controller 2752 may be coupled to one or more sensors that detect activity in a waterway and coordinate actions with the powerhouse gate controller 2754 and/or the dam gate controller 2756. For example, if a larger than normal flow of fluid is detected, the powerhouse controller 2754 and/or the dam gate controller 2756 may be instructed to open additional gates.

If a power generator is damaged or otherwise offline, the powerhouse gate controller 2754 may communicate with the power generator controller 2752 and/or the dam gate controller 2756 to adjust accordingly by, for example, opening additional control gates at the dam.

In some example embodiments, the control system 2797 may coordinate with the power generator controller 2752, powerhouse gate controller 2754, and/or the dam gate controller to calculate and/or arrange a bypass flow path from input the port to the output port or within a flow path to enable fluid flow to circumvent the power generator.

In some example embodiments, the control system 2797 may coordinate with the power generator controller 2752, powerhouse gate controller 2754, and/or the dam gate controller to calculate and/or arrange multiple flow paths.

In some example embodiments, the control system 2797 may coordinate with the power generator controller 2752, powerhouse gate controller 2754, and/or the dam gate controller to calculate and/or arrange multiple flow paths in combination with the operation of one or more flow control gates.

The power generation system of claim 5, wherein the powerhouse includes a flow control gate, and wherein the flow path structure defines multiple flow paths at least one of which is operably controllable in combination with operation of the flow control gate.

The power generator may include a water intake system or module that may be formed of precast forms that may be constructed as described immediately above. The intake system may be a "circular tower" system of precast forms that are constructed in layers with sufficient water intake at each layer to provide water flow to the compost through a flow path that may be above ground or beneath the ground, depending on certain factors, such as where a powerhouse is located relative to the location of the intake system. In some embodiments, the water intake system is functionally coupled to at least one of the powerhouse system or the dam system.

FIG. 28A shows a side view of an example embodiment of an intake module 2851.

FIG. 28B shows a perspective sectional view of an example embodiment of an intake module 2851.

FIG. 28C shows a perspective view of an example embodiment of a layer 2857 of an intake module 2851.

One or more of the intake modules 2851 may be constructed using precast components. In various embodiments, an intake module 2851 may comprise a support base 2853 and an at least one intake region 2855. In the embodiment shown in FIG. 28A, the intake module 2851 comprises one intake region 2855. In alternative embodiments, the intake module may comprise more than one intake region coupled to a support base.

In various embodiments, the intake region 2855 may comprise one or more layers 2857. One or more of the one or more layers 2857 may comprise precast segments. A portion of a layer may be a precast segment. An entire layer may be a precast segment. Multiple layers may together be a precast segment.

One or more of the one or more layers may comprise one or more apertures. In the embodiment shown in FIGS. 28A-28C, each layer 2857 comprises one circular central aperture 2858 and the circular aperture 2858 is positioned at the center of the layer 2857. In alternative embodiments, one or more of the layers may not comprise an aperture. In alternative embodiments, one or more of the layers may comprise more than one aperture. In alternative embodiments, one or more of apertures may comprise a different shape. In alternative embodiments, one or more of the apertures may be positioned off-center at the corresponding layer.

One or more apertures of the layers may form one or more axial channels 2859 through the intake region 2855 of the intake module 2851. In the embodiment shown in FIGS. 28A-28C, the intake region 2855 comprises one channel 2859. In alternative embodiments, the intake region may comprise more than one channel.

The axial channel of the intake region may be aligned with an axial channel of the support base. The axial channel of the support base may be aligned with a channel of a fluid conduit.

One or more of the one or more layers 2857 may comprise one or more protrusions 2867. In various embodiments, a first layer 2857*a* and a neighboring second layer 2857*b* may be arranged such that the arrangement of protrusions 2867 create apertures 2868 at the sides of the intake region 2855. These apertures 2868 are configured to allow fluid to enter the intake module 2851 and flow to an axial channel 2859. In various embodiments, the protrusions 2867 may be configured differently than the configuration shown in FIGS. 28A-28C.

In the embodiment shown in FIGS. 28A-28C, each layer 2857 comprises a circular shape. In alternative embodiments, one or more of the layers may comprises a different shape. In the embodiment shown in FIGS. 28A-28C each support base 2853 comprises a circular shape. In alternative embodiments, the support base may comprise a different shape.

In some embodiments, the top of the intake region comprises a cover 2869. In alternative embodiments, the top of the intake region may comprise at least one aperture. In various embodiments, at least one aperture of the at least one aperture at the top of the intake region may be aligned with at least one axial channel. In various embodiments, the cover of the intake region may comprise one or more precast components.

One more intake module may be located in or near an upper impoundment structure, a lower impoundment structure, an intermediary impoundment structure, a dam, or a natural water source (e.g. a river, lake, pond, etc.). In various embodiments, the intake module may be constructed using cast in place techniques.

FIGS. 29-39 show example embodiments of microgrid facilities. In some example embodiments, a microgrid may have black start capability to supply power to state and local first responders (for example, Department of Defense, Federal Emergency Management Agency, Cybersecurity and Infrastructure Security Agency, Department of Homeland Security). In some example embodiments, a microgrid may have the capability to supply power to local critical infrastructure, for example, hospitals, police, fire stations, wastewater treatment plants. In some example embodiments, a microgrid may may serve as a long-term emergency energy for critical loads supplied to life support facilities.

Figure 29A:
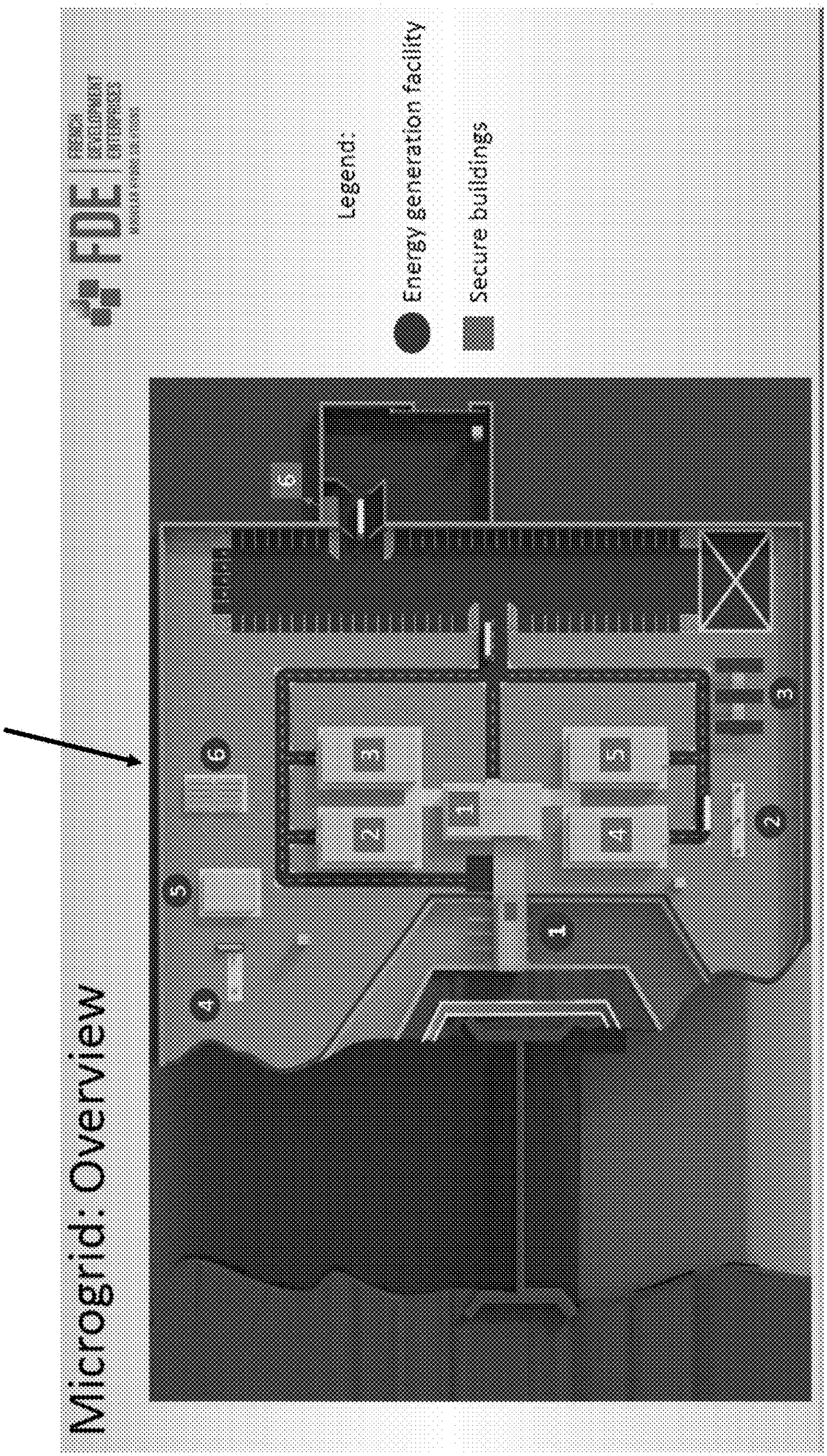
FIG. 29A shows an example embodiment of a microgrid facility.

FIG. 29A shows an example embodiment of a microgrid facility 2900. In some example embodiments, such as the one shown in FIG. 29A the microgrid facility 2900 includes six energy generation facilities (labelled with circles numbered 1-6). In alternative embodiments, the microgrid facility may have a different number of energy generation facilities.

In some example embodiments, such as the one shown in FIG. 29A the microgrid facility 2900 includes six secure buildings (labelled with squares numbered 1-6). In alternative embodiments, the microgrid facility may have a different number of energy generation facilities.

Figure 29B:
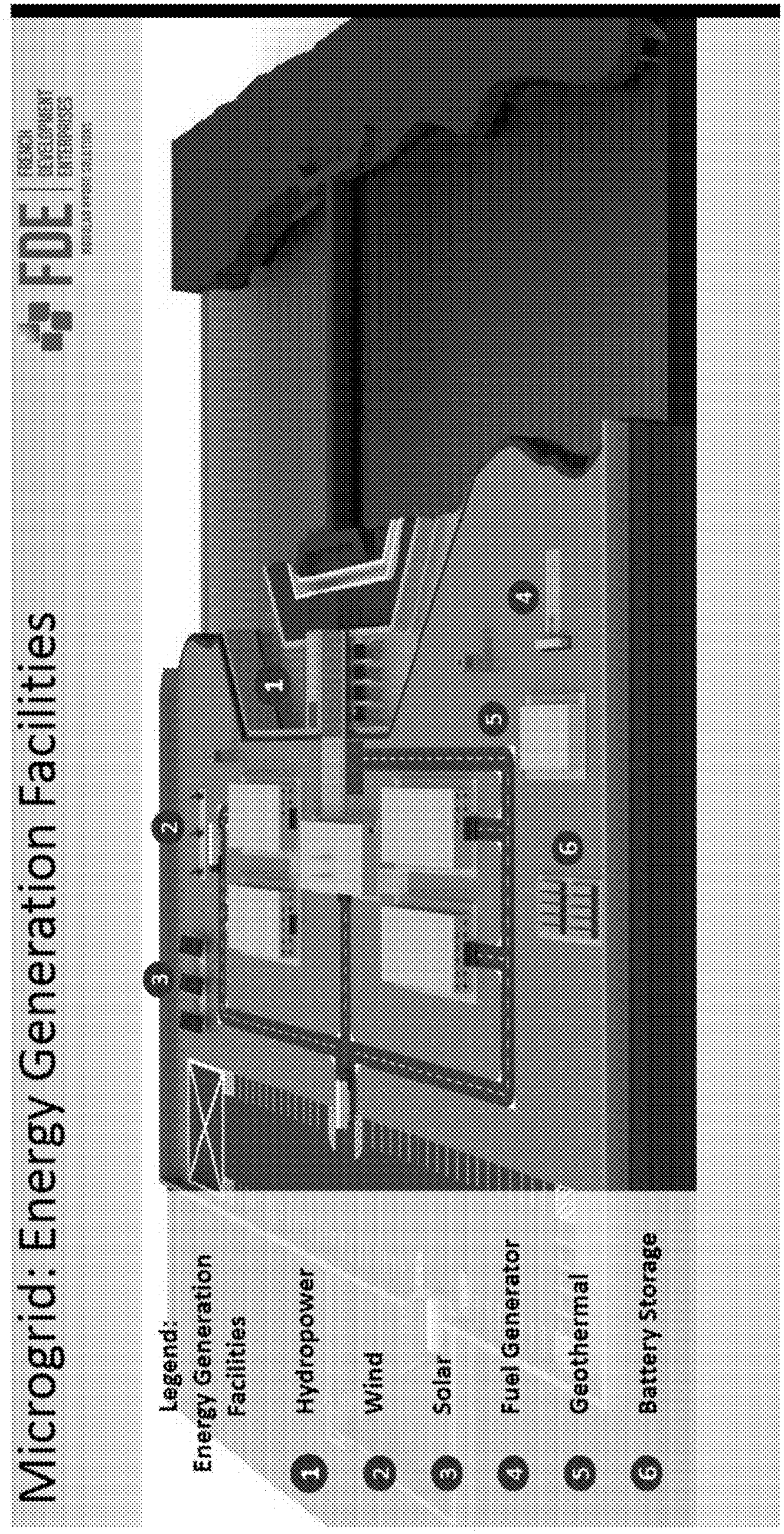
FIG. 29B shows example embodiments of energy generation facilities at an example microgrid facility.

FIG. 29B shows example embodiments of energy generation facilities at an example microgrid facility 2900. In some example embodiments, such as the one shown in FIG. 29B the microgrid facility 2900 includes different types of energy generation facilities, including: hydropower, wind power, solar power, fuel generator, geothermal, battery storage. In alternative embodiments, the microgrid facility 2900 may have a subset of these energy generation facilities. In alternative embodiments, the microgrid facility may have additional types of energy generation facilities.

Figure 29C:
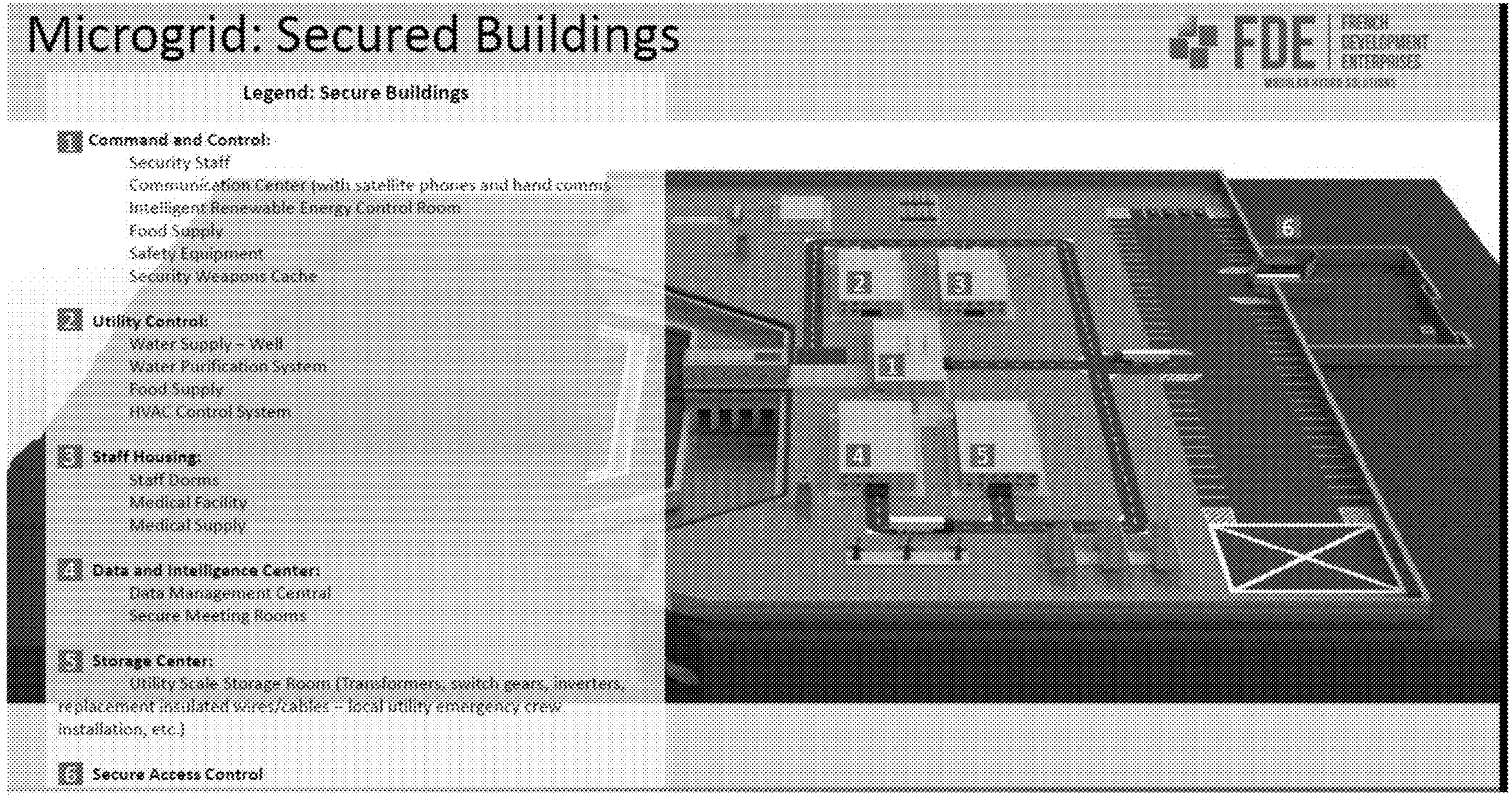
FIG. 29C show an example embodiment of secure buildings at an example microgrid facility.

FIG. 29C show an example embodiment of secure buildings at an example microgrid facility 2900. In alternative embodiments, a microgrid facility may have different types of secure buildings. In alternative embodiments, the different types of secure buildings may be at different locations.

Figure 29D:
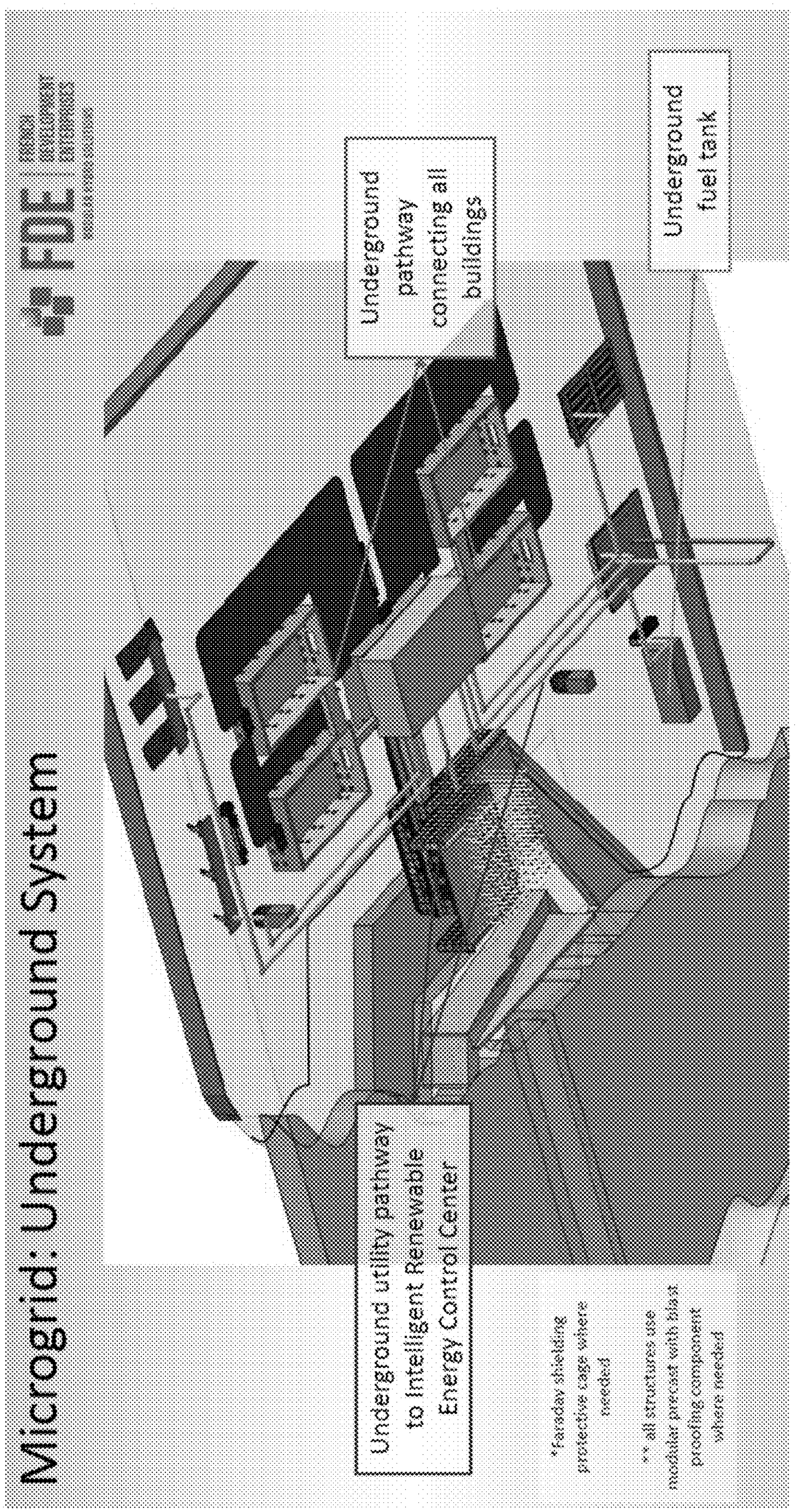
FIG. 29D shows an example embodiment of an underground system associated with an example microgrid facility.

FIG. 29D shows an example embodiment of an underground system associated with an example microgrid facility 2900.

Figure 30:
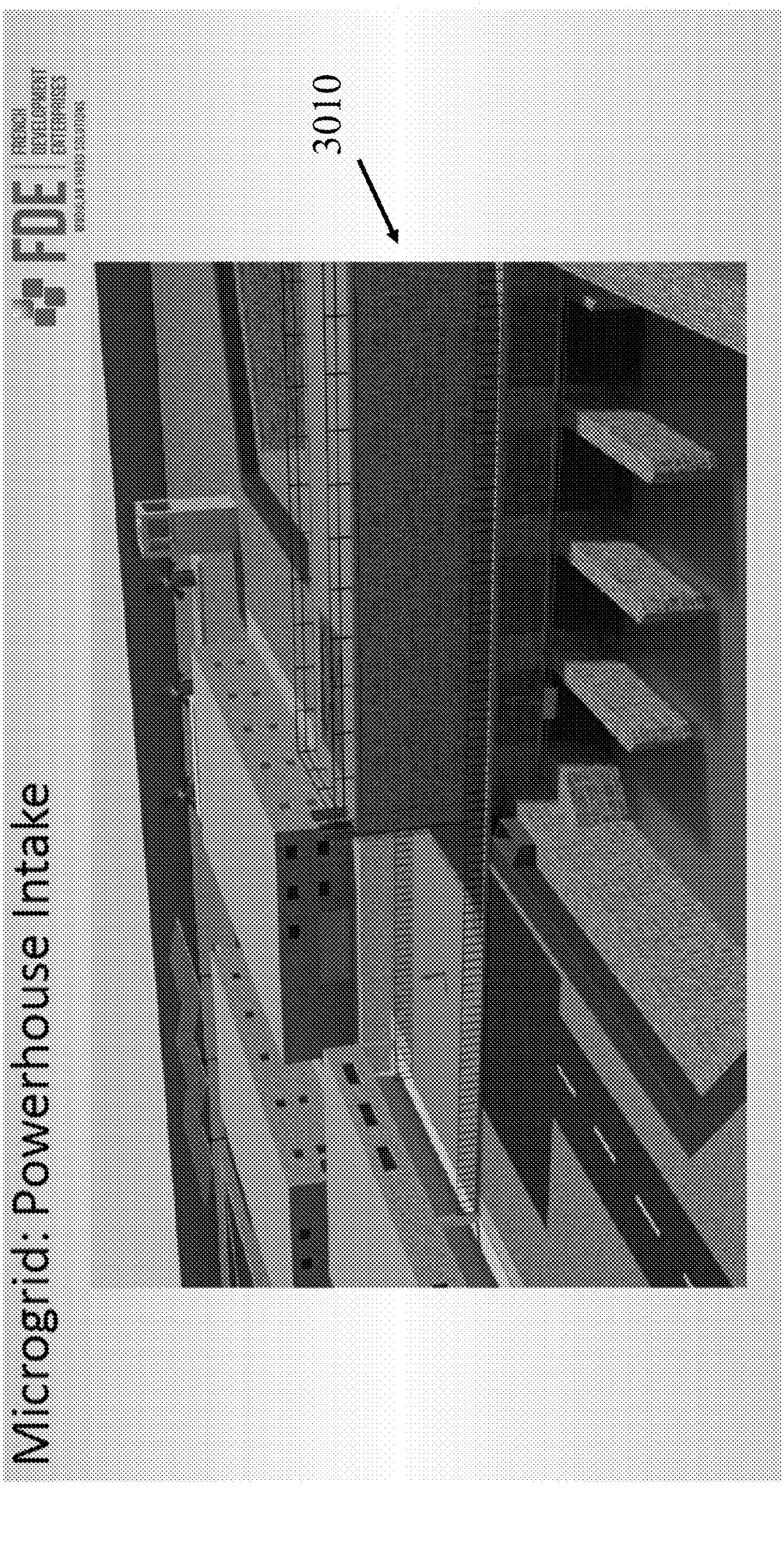
FIG. 30 shows an example embodiment of a powerhouse.

FIG. 30 shows an example embodiment of a powerhouse 3010.

Figure 31:
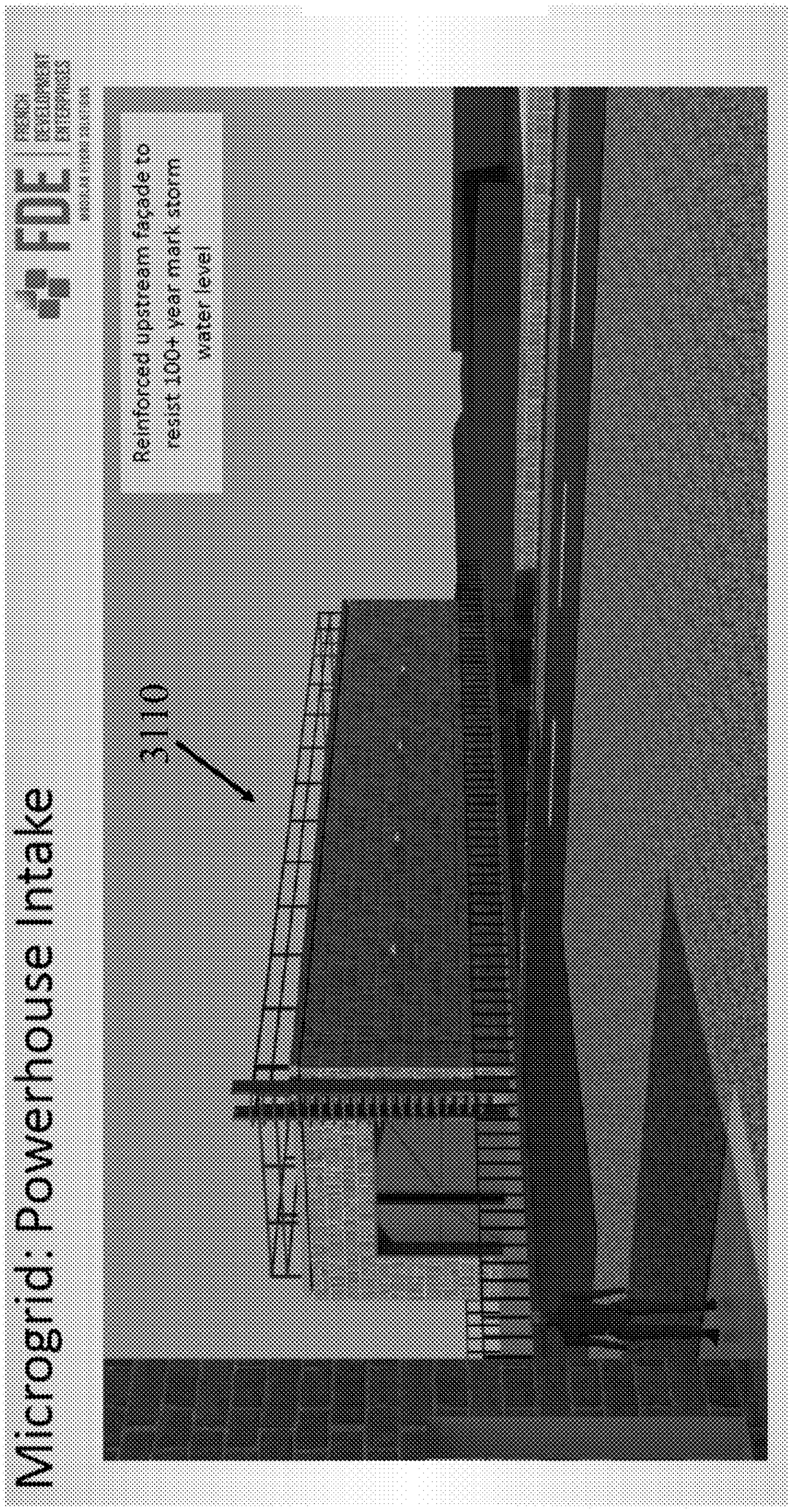
FIG. 31 shows an example embodiment of a powerhouse.

FIG. 31 shows an example embodiment of a powerhouse 3110. As shown in FIG. 31, the powerhouse may include a reinforced upstream façade to resist 100+ year mark storm water level.

Figure 32A:
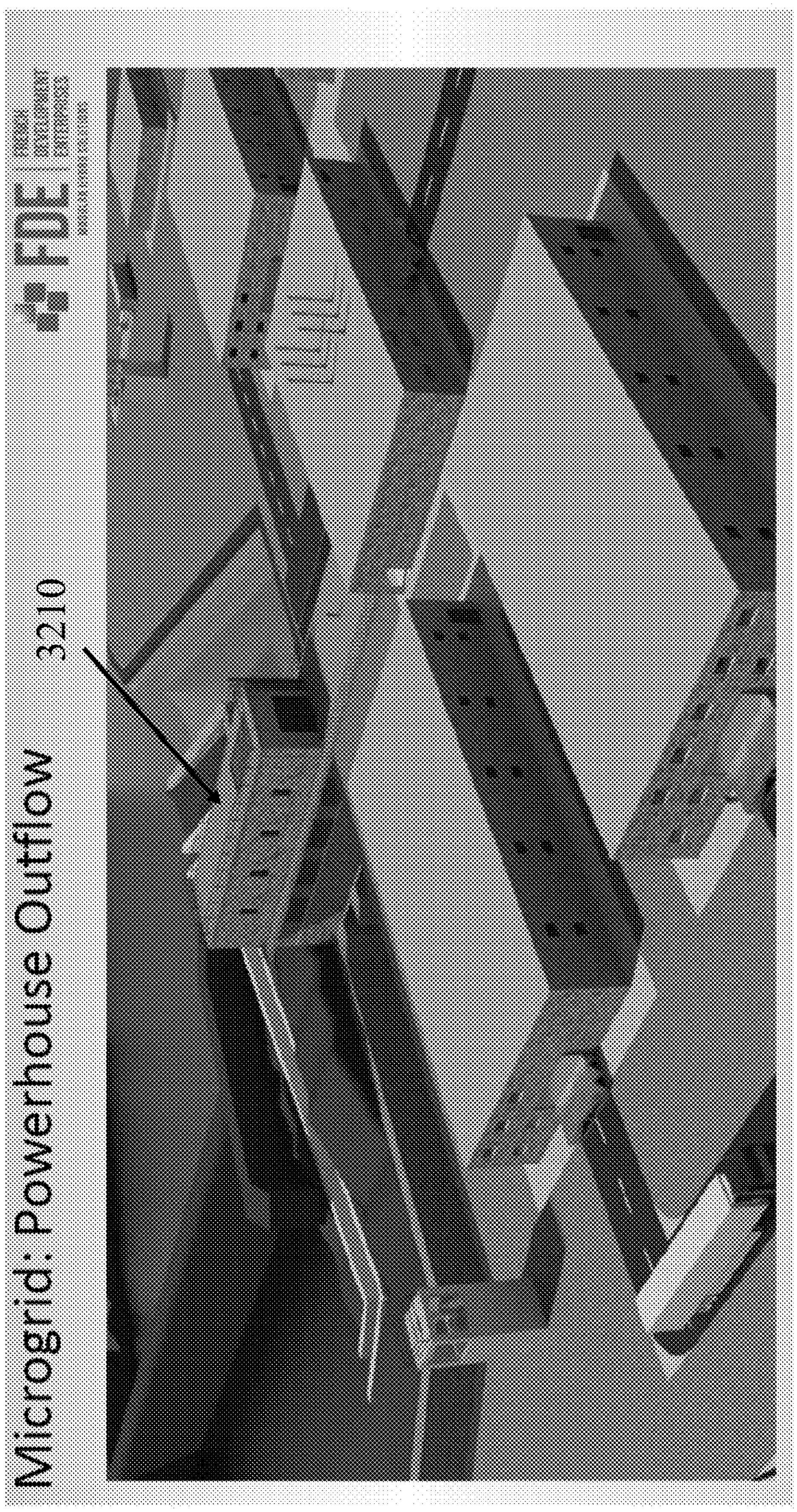
FIG. 32A shows an example embodiment of a powerhouse outflow.

FIG. 32A shows an example embodiment of a powerhouse 3210 outflow.

Figure 32B:
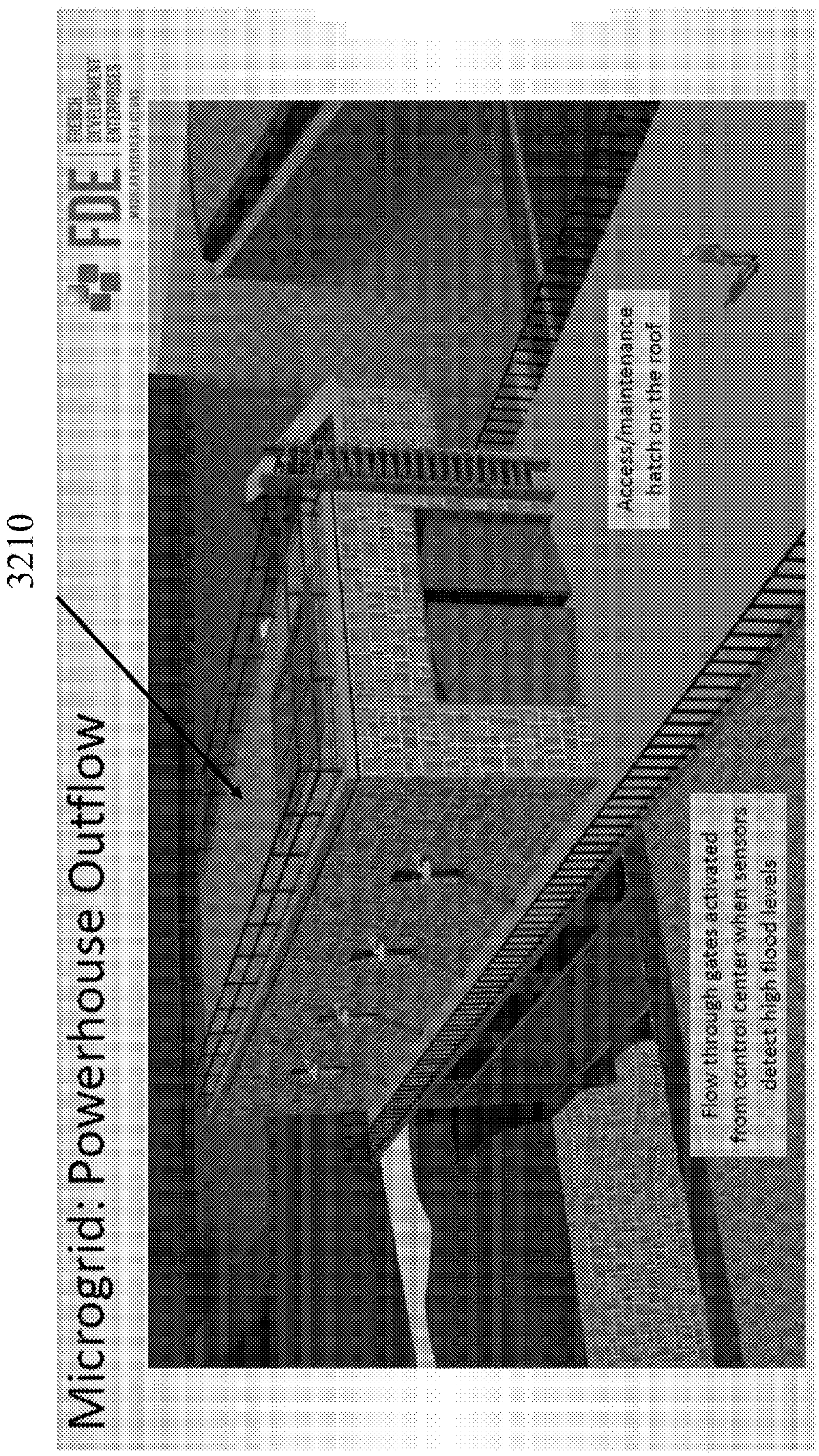
FIG. 32B shows a close-up of the example powerhouse shown in FIG. 32A.

FIG. 32B shows a close-up of the example powerhouse 3210 shown in FIG. 32A.

Figure 33:
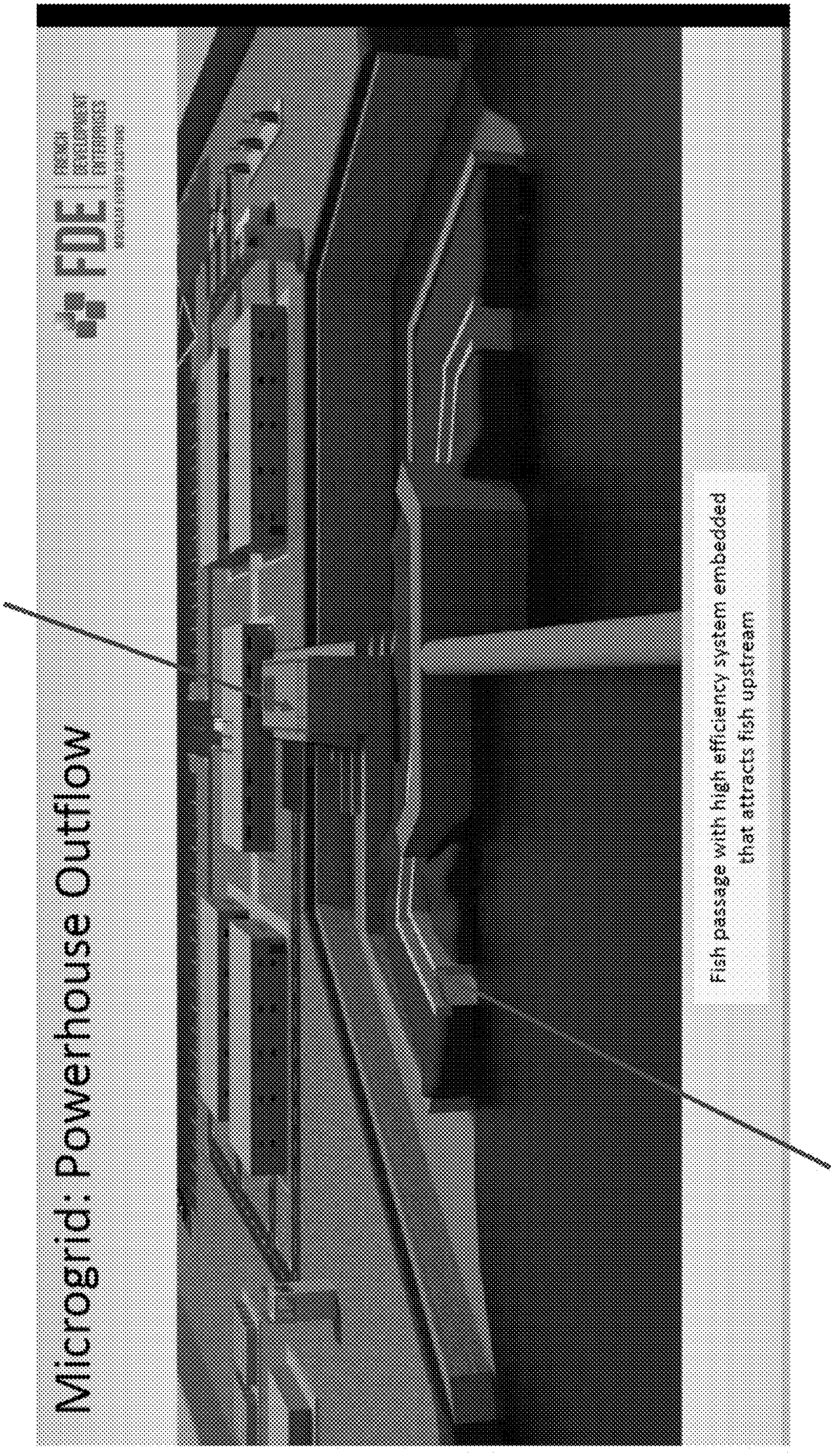
FIG. 33 shows a perspective view of an example powerhouse coupled to a fish passage.

FIG. 33 shows a perspective view of an example powerhouse coupled to a fish passage 3398. In this example embodiment the fish passage includes a system that attracts fish upstream.

Figure 34:
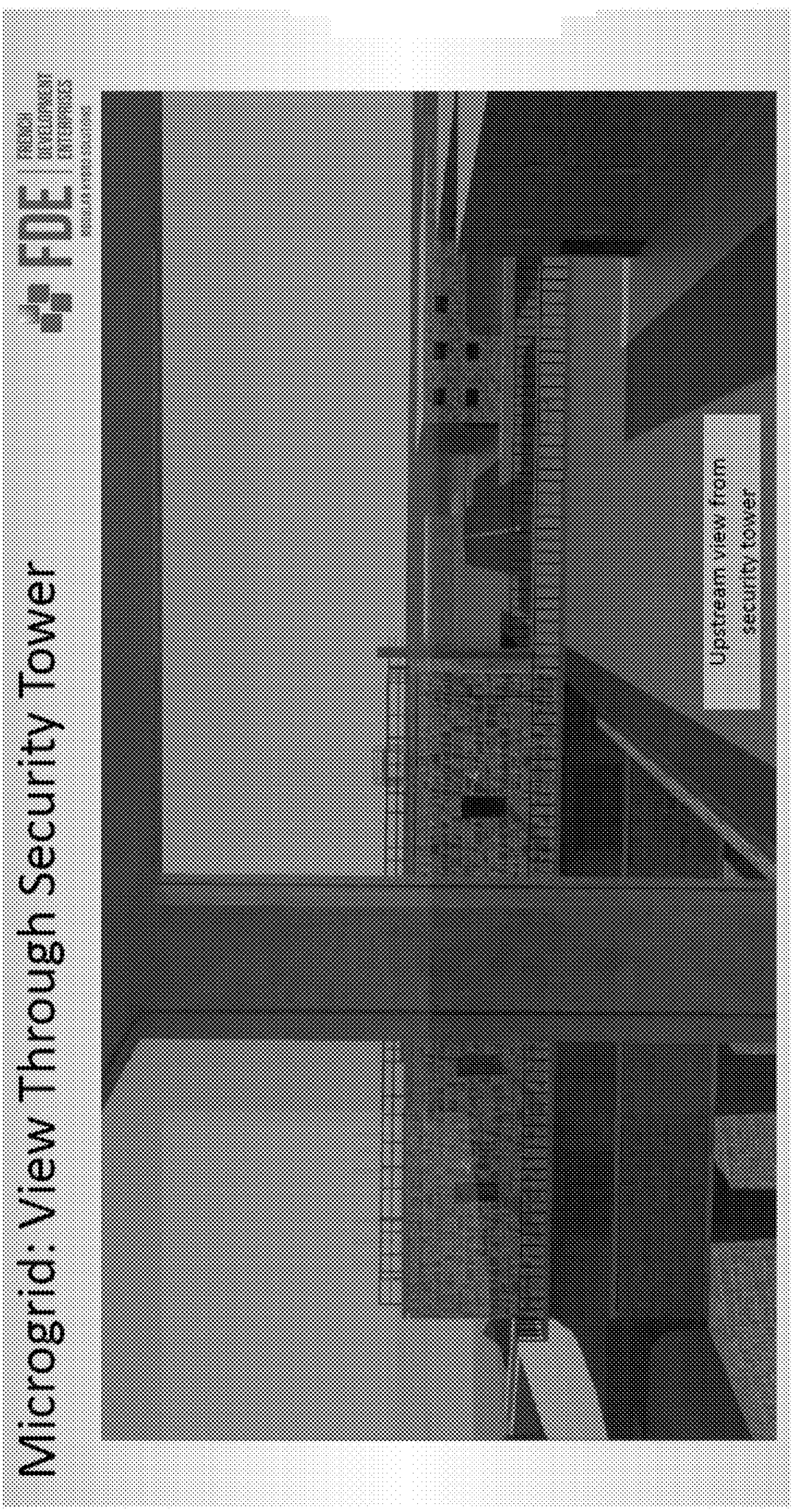
FIG. 34 shows an example view through a security tower at a microgrid facility.

FIG. 34 shows an example view through a security tower at a microgrid facility.

Figure 35:
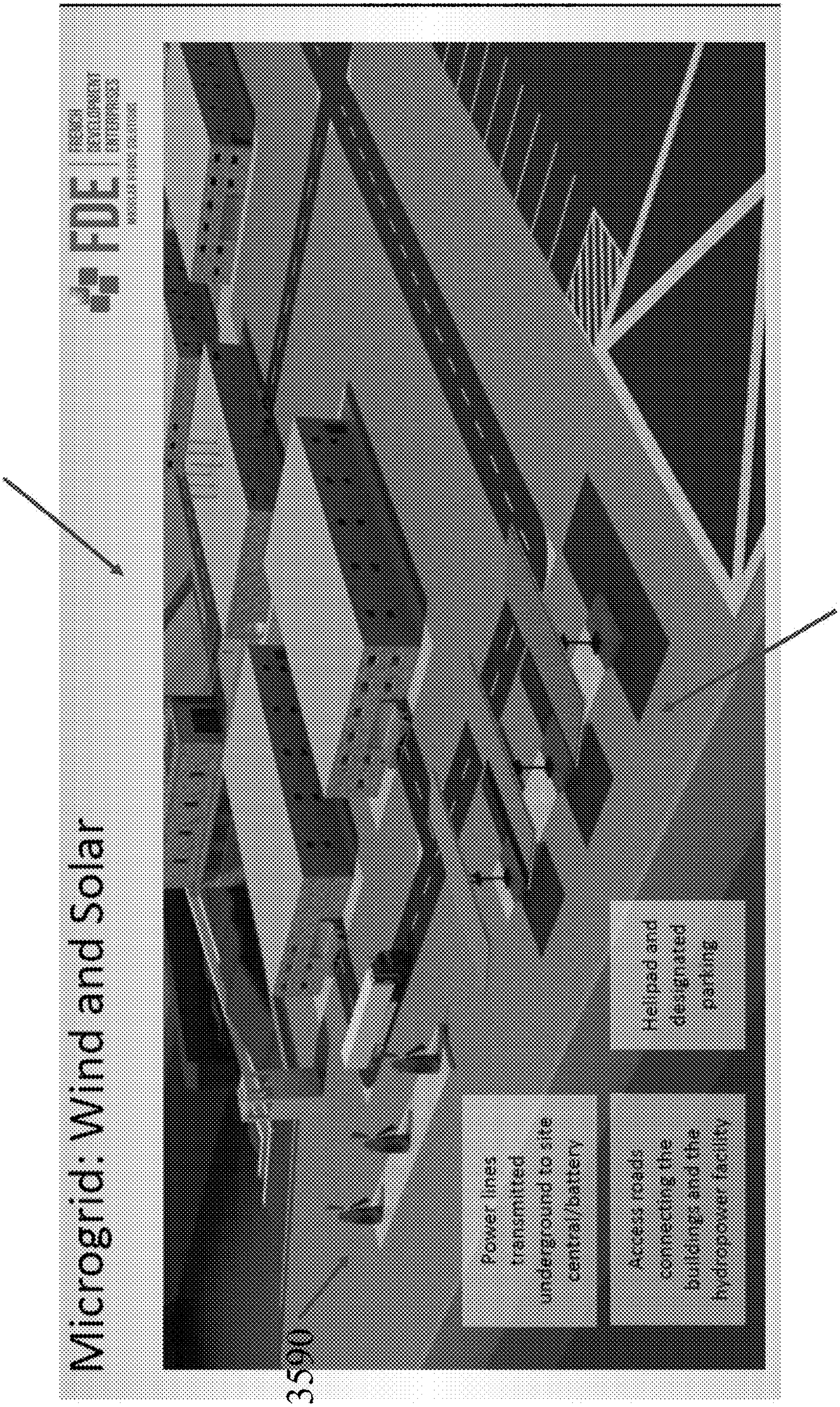
FIG. 35 shows an example embodiment of a microgrid power generation facility that includes wind power generation systems and solar power generation system.

FIG. 35 shows an example embodiment of a microgrid power generation facility 3500 that includes wind power generation systems 3590 and solar power generation system 3591. In alternative embodiments, the microgrid power generation facility may not include wind power generation system. In alternative embodiments, the microgrid power generation facility may not include solar power generation system.

In the embodiment shown in FIG. 35 the wind power generation system 3590 includes three turbines. In alternative embodiments, the wind power generation system 3590 includes a different number of turbines.

In the embodiment shown in FIG. 35 the solar power generation system 3591 includes three solar panels. In alternative embodiments, the solar power generation system 3591 includes a different number of solar panels.

In some example embodiments, the microgrid facility 3500 may include underground power lines. In some example embodiments, the microgrid facility may include underground power lines to the central battery.

In some example embodiments the microgrid facility 3500 may include access roads connecting buildings and the hydropower facility. In some example embodiments the microgrid facility 3500 may include at least one helipad and/or designated parking.

Figure 36:
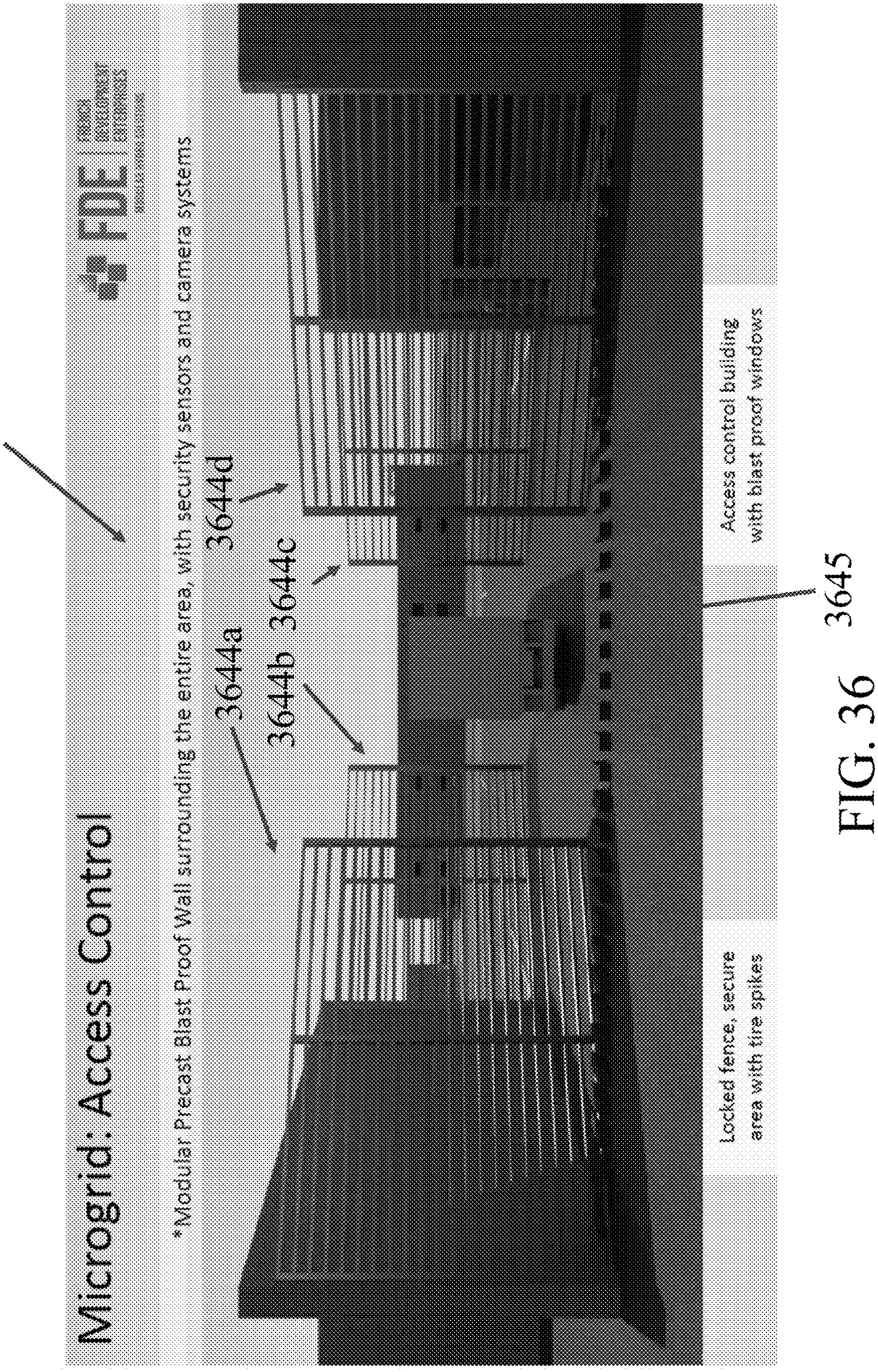
FIG. 36 shows example embodiments of aspects of an access control system at a microgrid facility.

FIG. 36 shows example embodiments of aspects of an access control system 3643 at a microgrid facility. The access control system may include a blast-proof wall around the microgrid facility. The blast-proof wall may include precast segments.

The access control system may include security sensors. The access control system may include camera systems. The access control systems may include one or more locked fences 3644. Four fences 3644*a*-3644*d* are shown in FIG. 36. The access control system may include a different number of fences.

The access control systems may include one or more tire spikes 3645. The access control system may include at least one access control building. At least one access control building may include blast-proof windows.

Figure 37:
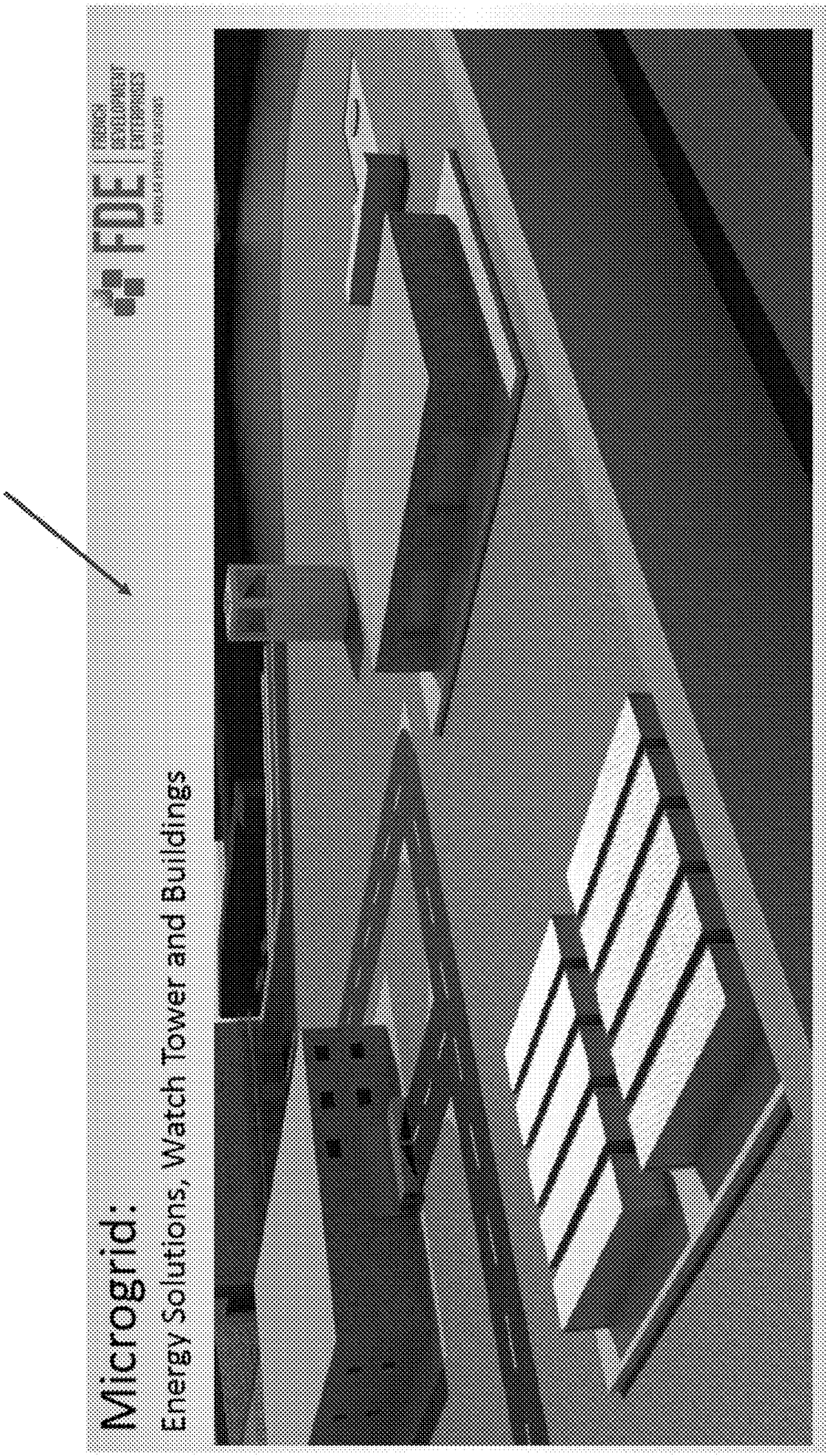
FIG. 37 shows an example embodiment of a microgrid power generation facility that includes energy solutions, a watch tower, and buildings.

FIG. 37 shows an example embodiment of a microgrid power generation facility that includes energy solutions, a watch tower, and buildings. In some embodiments, the microgrid facility may not include a watch tower.

Figure 38:
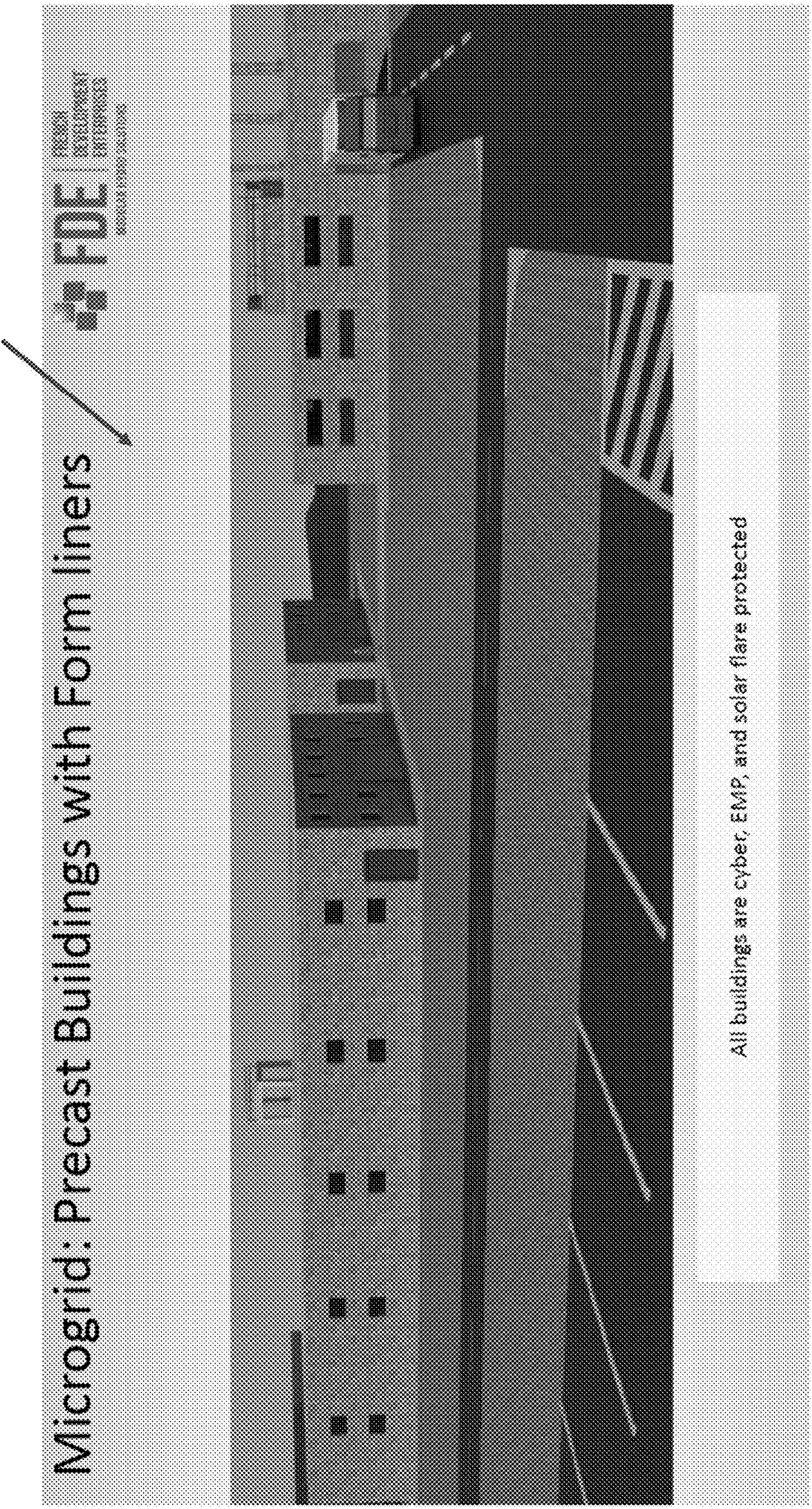
FIG. 38 shows an example embodiment of a microgrid facility with precast buildings with form liners.

FIG. 38 shows an example embodiment of a microgrid facility with precast buildings with form liners. In some embodiments, one or more of the buildings at the microgrid facility include precast segments. In some embodiments, one or more of the buildings are cyber protected. In some embodiments, one or more of the buildings are EMP (electromagnetic pulse) protected. In some embodiments, one or more of the buildings are flare protected.

Figure 39:
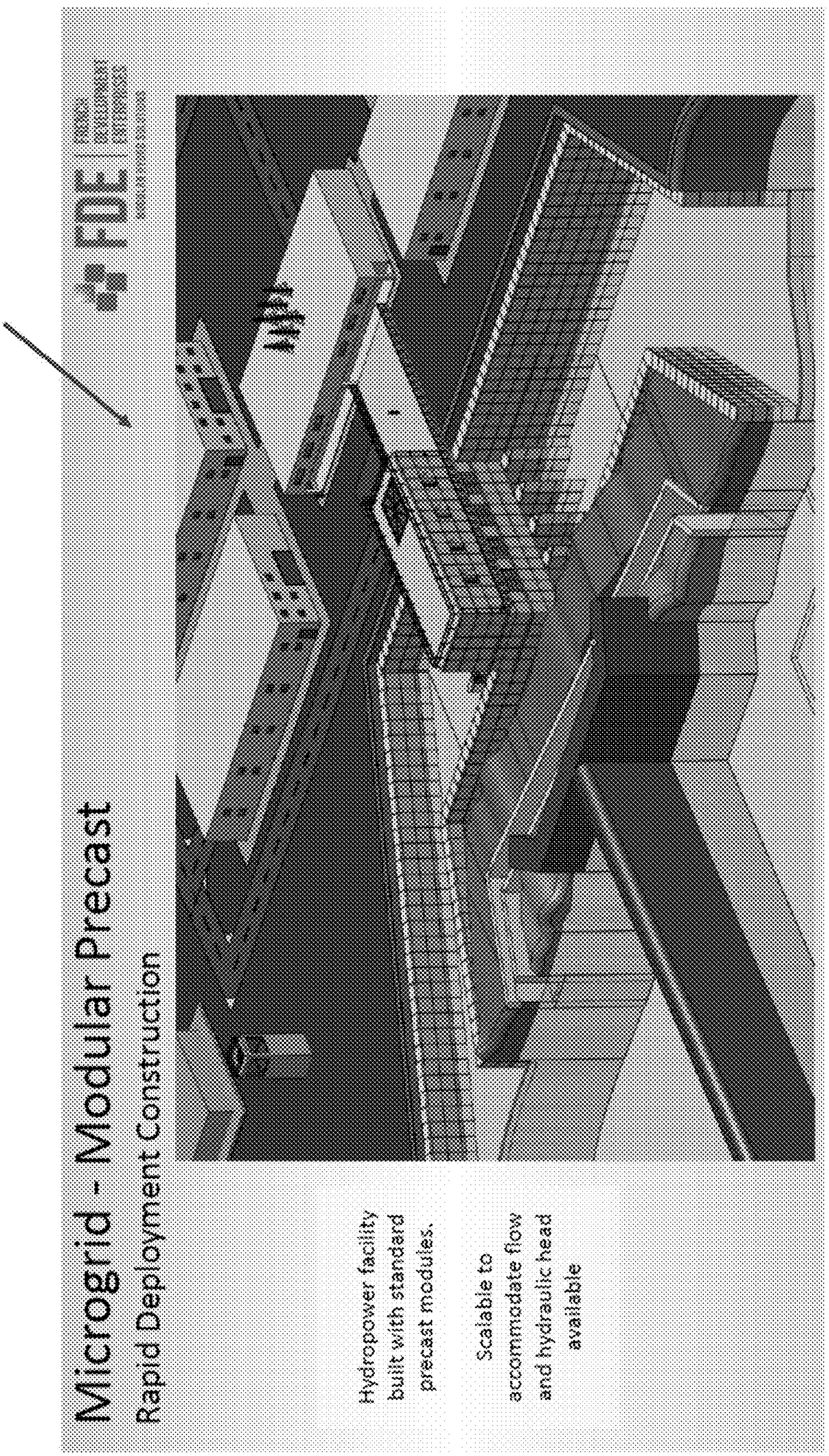
FIG. 39 shows an example embodiment of a microgrid power generation facility 3900 that includes a hydropower facility, the hydropower facility including at least one precast segment.

FIG. 39 shows an example embodiment of a microgrid power generation facility 3900 that includes a hydropower facility, the hydropower facility including at least one precast segment.

In various embodiments, one or more of the precast segments may be coupled using at least one dowel, at least one bolt, at least one keyway, at least one re-rod, or at least one port. In various embodiments, one or more of the modular blocks may be coupled using at least one expandable linkage, at least one automatic linkage (that locks itself), at least one prestressed cable (vertical configuration, horizontal configuration, or other configuration), at least one linkage port, or any other mechanism suitable for connecting items.

In some embodiments, the power generation system may comprise at least one icebreaker. An icebreaker may include sharpened assemblies facing upstream that are intended to break ice flows to prevent damage to the dam or powerhouse. In some example embodiments, an icebreaker may include one or more precast balls that float.

In various example embodiments, spaces between neighboring precast segments may be filled with concrete, grout, liners, or water stopping agents. In various example embodiments, spaces between precast segments and other elements (for example, fluid conduits) may be filled with concrete, grout, liners, or water stopping agents. In various example embodiments, spaces within precast forms may be filled with concrete, grout, liners, or water stopping agents. In various example embodiments, spaces between any elements associated with a powerhouse or dam may be filled with concrete, grout, liners, or water stopping agents.

In various example embodiments, one or more hydrophobic coatings (for example, nanotech coatings) may be applied to seals or filler materials between neighboring precast segments. In various example embodiments, one or more hydrophobic coatings (for example, nanotech coatings) may be applied to seals or filler materials between precast segments and other elements (for example, fluid conduits). In various example embodiments, one or more hydrophobic coatings (for example, nanotech coatings) may be applied to seals or filler materials between spaces or filler material within precast forms. In various example embodiments, one or more hydrophobic coatings (for example, nanotech coatings) may be applied to seals or filler materials associated with a powerhouse or dam.

In some example embodiments, one or more precast segments may be sized and/or shaped to couple with a working platform.

The foregoing are example embodiments and features of embodiments that are disclosed herein. Additional description can be found in U.S. Pat. No. 11,708,674, the entire teachings of which are incorporated herein by reference in their entirety.

The teachings of all patents, published applications, and references cited herein are incorporated by reference in their entirety.

The features and/or dimensions shown and/or described in this application are not necessarily to scale. Features and/or dimensions may be any size and/or any shape. Example dimensions may be provided herein. In alternative embodiments, one or more of the example dimensions may be different. In some embodiments, one or more characteristics described in connection with an embodiment described herein may be used with any other embodiment described herein.

While example embodiments have been particularly shown and described, it will be understood by those skilled in the art that various changes in form and details may be made therein without departing from the scope of the embodiments encompassed by the appended claims.

What is claimed is:

1. A power generation system, comprising:

a powerhouse, comprising:

a flow path structure defining at least a portion of a flow path, the flow path structure configured to accept fluid at an input port to enter the powerhouse and direct the fluid to exit the powerhouse at an output port;

a power generator support structure, at least partially constructed of precast segments, configured to support weight of a power generator in an arrangement operably disposed within the flow path, at least some of the precast segments being positioned below the power generator for supporting said weight, wherein the power generation support structure includes precast forms and filler that define the precast segments and wherein the precast forms are filled with the filler on a layer-by-layer basis during a process of arranging the precast segments in vertical layers to define the power generation support structure; and an access port different from the input port, the access port aligned to enable removable coupling of the power generator to and from the power generation support structure.

2. The power generation system of claim 1, wherein the precast forms include a port through a surface of the precast form that enables filler to flow from a given layer to a lower adjacent layer in a vertical direction.

3. The power generation system of claim 1, wherein the power generation support structure defines a lowest layer having a pattern of vertically offset portions or further comprising a layer, having a pattern of vertically offset portions.

4. The power generation system of claim 1, further comprising a dam functionally coupled with the powerhouse in a manner that maintains or discontinues fluid flow to the input port.

5. The power generation system of claim 4, wherein the powerhouse is arranged in a vertical configuration, in which the power generator is arranged vertically; or a horizontal configuration, in which the power generator is arranged horizontally.

6. The power generation system of claim 4, wherein the flow path structure defines a bypass flow path from input port to output port or within a flow path to enable fluid flow to circumvent the power generator.

7. The power generation system of claim 4, wherein the powerhouse includes a flow control gate, and wherein the flow path structure defines multiple flow paths at least one of which is operably controllable in combination with operation of the flow control gate.

8. The power generation system of claim 1, wherein the flow path structure defines multiple flow paths, at least a subset of the multiple flow paths being selectably configurable to enable fluid flow.

9. The power generation system of claim 8, wherein the powerhouse includes an icebreaker arranged to break ice prior to flowing into the input port.

10. The power generation system of claim 1, further comprising a superstructure positioned above at least a portion of the powerhouse, wherein the superstructure is configured to support a functional element to perform maintenance at the powerhouse.

11. The power generation system of claim 10, wherein the superstructure comprises at least one rail, located on or within the superstructure that enables coupling with the functional element.

12. The power generation system of claim 10, wherein the functional element comprises a crane configured to be mechanically powered.

13. The power generation system of claim 10, wherein the functional element is a crane assembly configured to raise or lower at least one flow control gate in order to control a height of a reservoir.

14. The power generation system of claim 13, wherein the crane comprises a combination of crane elements to lift the at least one waterflow restriction gate from multiple points to reduce a likelihood that a gate will cantilever during raising and lowering operations.

15. The power generation system of claim 10, wherein the superstructure comprises an enclosure positioned around the access port.

16. The power generation system of claim 1, wherein the powerhouse further comprises a Faraday shield room or a room shielded with radiation hardened material.

17. The power generation system of claim 1, further comprising at least one auxiliary power system.

18. The power generation system of claim 1, further comprising at least one energy storage system.

19. The power generation system of claim 1, wherein at least one of the precast segments is removably coupled with the power generation support structure.

20. The power generation system of claim 1, wherein the powerhouse further comprises an access channel, one end of the access channel being coupled to the access port.

21. The power generation system of claim 1, wherein the access port is defined by at least one precast segment.

22. The power generation system of claim 1, wherein the flow path structure is configured to accept fluid at an input port to enter the powerhouse in a first direction and the access port is oriented in a second direction, the second direction being different from the first direction.

23. The power generation system of claim 1, wherein the power generator comprises at least one turbine.

24. The power generation system of claim 1, wherein at least one of the precast forms comprises at least one divider to define two or more compartments.

25. The power generation system of claim 1, further comprising at least one water intake system comprising at least one precast segment, the water intake system being functionally coupled to at least one of the powerhouse system or a dam system functionally coupled with the powerhouse.

26. The power generation system of claim 1, wherein the powerhouse comprises a flow control gate configured to communicate with the power generator.

27. The power generation system of claim 1, wherein the power generation support structure includes at least one precast form having disposed therein at least one precast infill block.

28. A power generation system, comprising:

a powerhouse, comprising:

a flow path structure defining at least a portion of a flow path, the flow path structure configured to accept fluid at an input port to enter the powerhouse and direct the fluid to exit the powerhouse at an output port;

a power generator support structure, at least partially constructed of precast segments, configured to support weight of a power generator in an arrangement operably disposed within the flow path, at least some of the precast segments being positioned below the power generator for supporting said weight, wherein the power generation support structure includes at least one precast form having disposed therein at least one precast infill block; and an access port different from the input port, the access port aligned to enable removable coupling of the power generator to and from the power generation support structure.

29. The power generation system of claim 28, wherein the power generation support structure defines a lowest layer having a pattern of vertically offset portions or further comprising a layer, having a pattern of vertically offset portions.

30. The power generation system of claim 28, further comprising a dam functionally coupled with the powerhouse in a manner that maintains or discontinues fluid flow to the input port.

31. The power generation system of claim 30, wherein the powerhouse is arranged in a vertical configuration, in which the power generator is arranged vertically; or a horizontal configuration, in which the power generator is arranged horizontally.

32. The power generation system of claim 30, wherein the flow path structure defines a bypass flow path from input port to output port or within a flow path to enable fluid flow to circumvent the power generator.

33. The power generation system of claim 30, wherein the powerhouse includes a flow control gate, and wherein the flow path structure defines multiple flow paths at least one of which is operably controllable in combination with operation of the flow control gate.

34. The power generation system of claim 28, wherein the flow path structure defines multiple flow paths, at least a subset of the multiple flow paths being selectably configurable to enable fluid flow.

35. The power generation system of claim 34, wherein the powerhouse includes an icebreaker arranged to break ice prior to flowing into the input port.

36. The power generation system of claim 28, further comprising a superstructure positioned above at least a portion of the powerhouse, wherein the superstructure is configured to support a functional element to perform maintenance at the powerhouse.

37. The power generation system of claim 36, wherein the superstructure comprises at least one rail, located on or within the superstructure that enables coupling with the functional element.

38. The power generation system of claim 36, wherein the functional element comprises a crane configured to be mechanically powered.

39. The power generation system of claim 36, wherein the functional element is a crane assembly configured to raise or lower at least one flow control gate in order to control a height of a reservoir.

40. The power generation system of claim 39, wherein the crane comprises a combination of crane elements to lift the at least one waterflow restriction gate from multiple points to reduce a likelihood that a gate will cantilever during raising and lowering operations.

41. The power generation system of claim 36, wherein the superstructure comprises an enclosure positioned around the access port.

42. The power generation system of claim 28, wherein the powerhouse further comprises a Faraday shield room or a room shielded with radiation hardened material.

43. The power generation system of claim 28, further comprising at least one auxiliary power system.

44. The power generation system of claim 28, further comprising at least one energy storage system.

45. The power generation system of claim 28, wherein at least one of the precast segments is removably coupled with the power generation support structure.

46. The power generation system of claim 28, wherein the powerhouse further comprises an access channel, one end of the access channel being coupled to the access port.

47. The power generation system of claim 28, wherein the access port is defined by at least one precast segment.

48. The power generation system of claim 28, wherein the flow path structure is configured to accept fluid at an input port to enter the powerhouse in a first direction and the access port is oriented in a second direction, the second direction being different from the first direction.

49. The power generation system of claim 28, wherein the power generator comprises at least one turbine.

50. The power generation system of claim 28, wherein at least one of the precast forms comprises at least one divider to define two or more compartments, wherein at least one of the two or more compartments includes a precast infill block disposed therein.

51. The power generation system of claim 28, further comprising at least one water intake system comprising at least one precast segment, the water intake system being functionally coupled to at least one of the powerhouse system or a dam system functionally coupled with the powerhouse.

52. The power generation system of claim 28, wherein the powerhouse comprises a flow control gate configured to communicate with the power generator.

53. A power generation system, comprising:

a powerhouse, comprising:

a flow path structure defining at least a portion of a flow path, the flow path structure configured to accept fluid at an input port to enter the powerhouse and direct the fluid to exit the powerhouse at an output port;

a power generator support structure, at least partially constructed of precast segments, configured to support weight of a power generator in an arrangement operably disposed within the flow path, at least some of the precast segments being positioned below the power generator for supporting said weight, wherein the power generation support structure includes precast forms and filler that define the precast segments, wherein the precast forms include a port through a surface of the precast form that enables the filler to flow from a given layer to a lower adjacent layer in a vertical direction; and an access port different from the input port, the access port aligned to enable removable coupling of the power generator to and from the power generation support structure.

* * * * *